(12) United States Patent
Kumano et al.

(10) Patent No.: US 11,710,294 B2
(45) Date of Patent: Jul. 25, 2023

(54) APPARATUS FOR ESTIMATING ROAD PARAMETER

(71) Applicant: DENSO CORPORATION, Kariya (JP)

(72) Inventors: Shunya Kumano, Nisshin (JP); Shunsuke Suzuki, Kariya (JP); Ryota Yamamoto, Nisshin (JP)

(73) Assignee: DENSO CORPORATION, Kariya (JP)

( * ) Notice: Subject to any disclaimer, the term of this patent is extended or adjusted under 35 U.S.C. 154(b) by 161 days.

(21) Appl. No.: 17/174,289

(22) Filed: Feb. 11, 2021

(65) Prior Publication Data

US 2021/0256274 A1    Aug. 19, 2021

(30) Foreign Application Priority Data

Feb. 14, 2020 (JP) .................................. 2020-023609

(51) Int. Cl.
| | |
|---|---|
| G06V 20/56 | (2022.01) |
| G06V 10/44 | (2022.01) |
| G06N 20/00 | (2019.01) |
| G06V 10/764 | (2022.01) |
| G06V 10/82 | (2022.01) |

(52) U.S. Cl.
CPC ............. G06V 10/44 (2022.01); G06N 20/00 (2019.01); G06V 10/764 (2022.01); G06V 10/82 (2022.01); G06V 20/588 (2022.01)

(58) Field of Classification Search
CPC ...... G06V 10/44; G06V 20/588; G06V 10/82; G06V 10/764; G06N 20/00
See application file for complete search history.

(56) References Cited

U.S. PATENT DOCUMENTS

| | | | |
|---|---|---|---|
| 10,102,435 B2* | 10/2018 | Yang | ........................ G06F 18/22 |
| 11,113,544 B2* | 9/2021 | Lee | ........................ G08G 1/167 |
| 2010/0250064 A1 | 9/2010 | Ota et al. | |
| 2011/0063097 A1 | 3/2011 | Naka et al. | |
| 2011/0222732 A1 | 9/2011 | Higuchi et al. | |
| 2011/0261168 A1 | 10/2011 | Shima et al. | |
| 2012/0185167 A1 | 7/2012 | Higuchi et al. | |
| 2014/0118504 A1 | 5/2014 | Shima et al. | |

(Continued)

FOREIGN PATENT DOCUMENTS

| | | |
|---|---|---|
| JP | 2011-198110 A | 10/2011 |
| JP | 2012-022574 A | 2/2012 |

(Continued)

*Primary Examiner* — Shaghayegh Azima
(74) *Attorney, Agent, or Firm* — Maschoff Brennan

(57) ABSTRACT

In a road parameter estimation apparatus, a marker-based estimator extracts, based on markers extracted by a marker extractor, at least one lane line that demarcates a road into plural regions in a width direction of the road, and estimates, based on the extracted at least one lane line, a value of at least one feature parameter of the road as a maker-based estimation result. The at least one feature parameter of the road represents at least one feature of the road. A model-based estimator estimates, based on the at least one model-based demarcation line, a value of the at least one feature parameter of the road parameter as a model-based estimation result. A determiner compares the at least one lane line with the model-based demarcation line to accordingly determine whether to use the marker-based estimation result or the model-based estimation result.

12 Claims, 25 Drawing Sheets

(56) References Cited

U.S. PATENT DOCUMENTS

| | | |
|---|---|---|
| 2015/0269447 A1 | 9/2015 | Kumano et al. |
| 2016/0148059 A1* | 5/2016 | Kawano .............. G06V 20/588 |
| | | 382/104 |
| 2018/0046867 A1* | 2/2018 | Yang ...................... G06F 18/22 |
| 2018/0181819 A1 | 6/2018 | Kawano et al. |
| 2019/0034740 A1* | 1/2019 | Kwant .............. G06F 18/24143 |
| 2019/0220011 A1* | 7/2019 | Della Penna ........ G05D 1/0212 |
| 2020/0223433 A1* | 7/2020 | Koshizen ............ G08G 1/0112 |

FOREIGN PATENT DOCUMENTS

| | | |
|---|---|---|
| JP | 2014-157429 A | 8/2014 |
| JP | 2018-067236 A | 4/2018 |
| JP | 2018-181093 A | 11/2018 |

\* cited by examiner

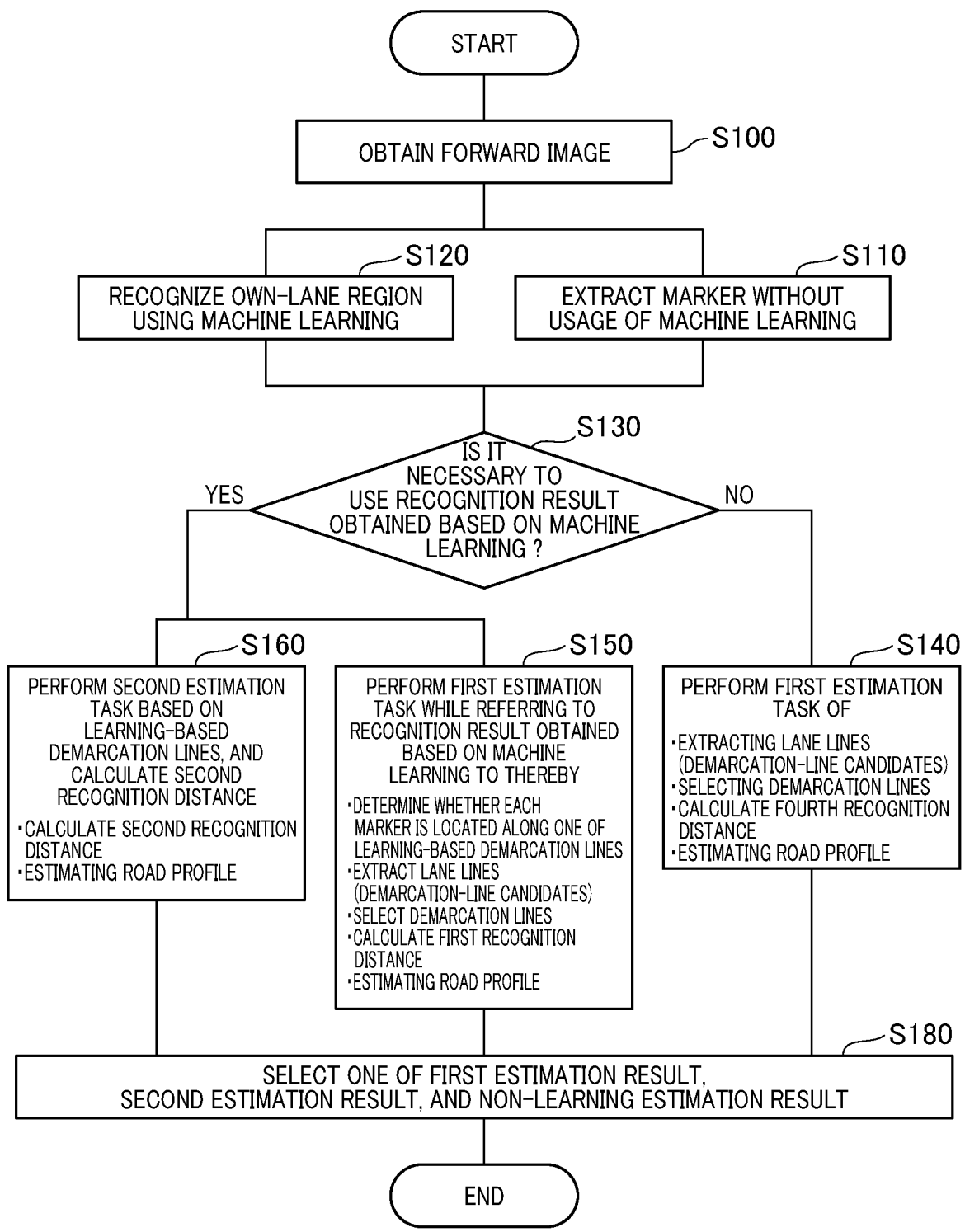

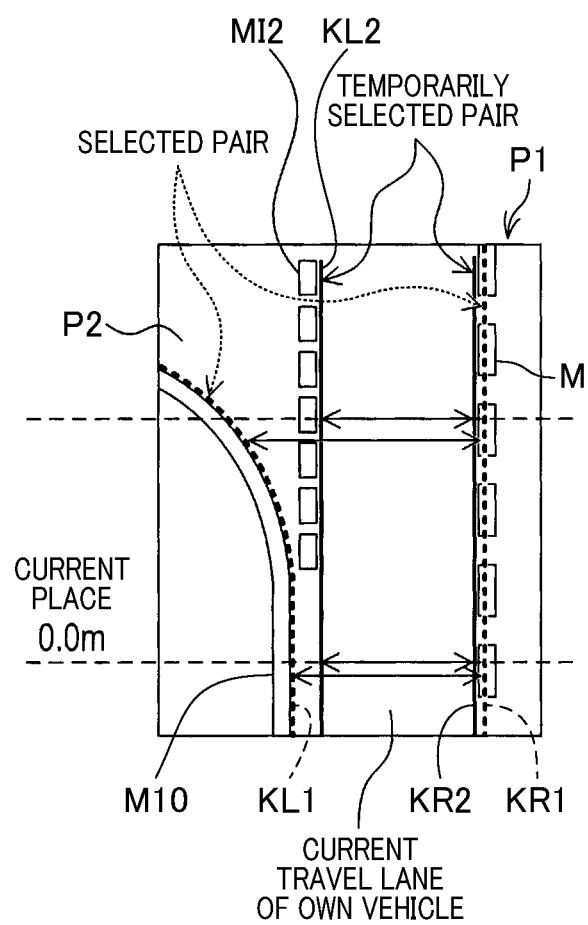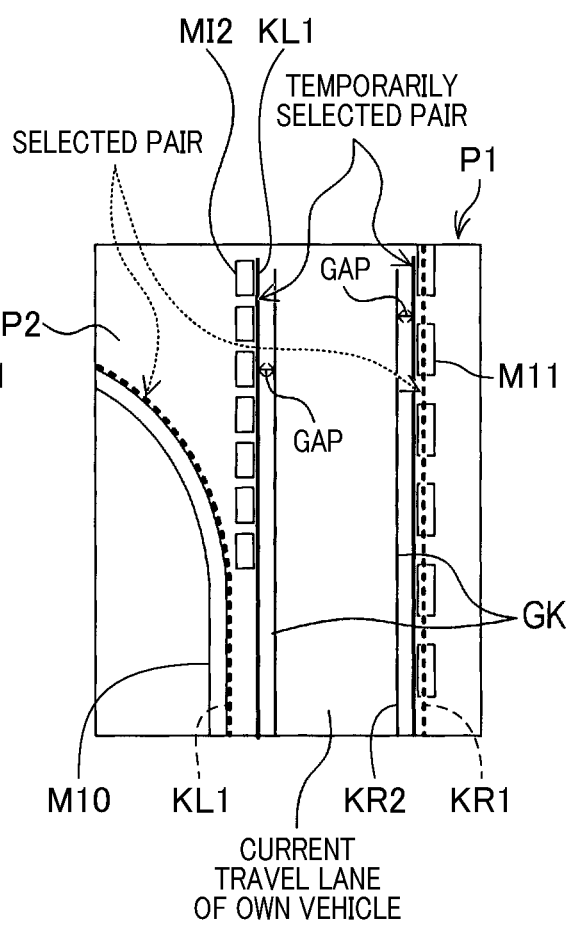

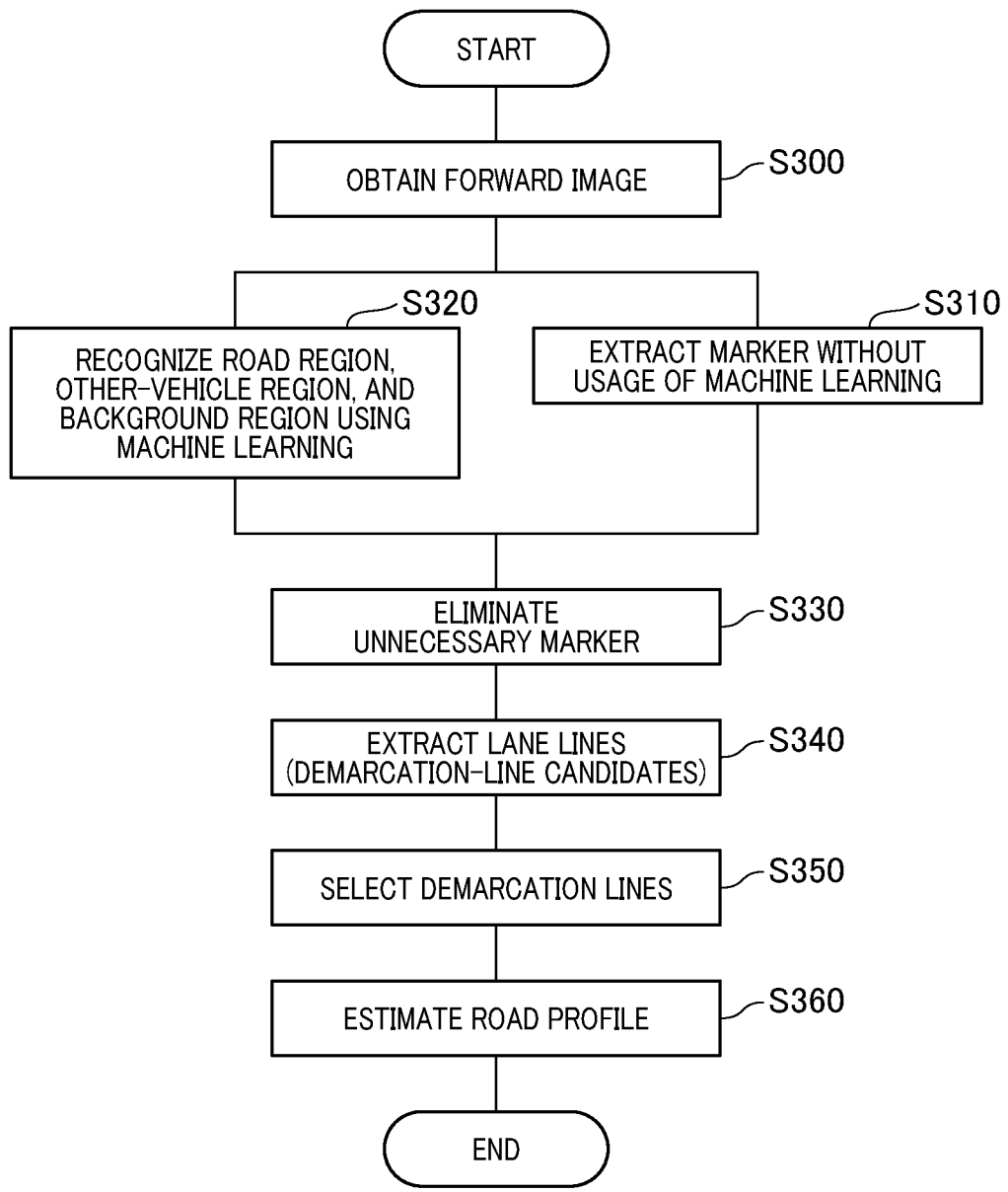

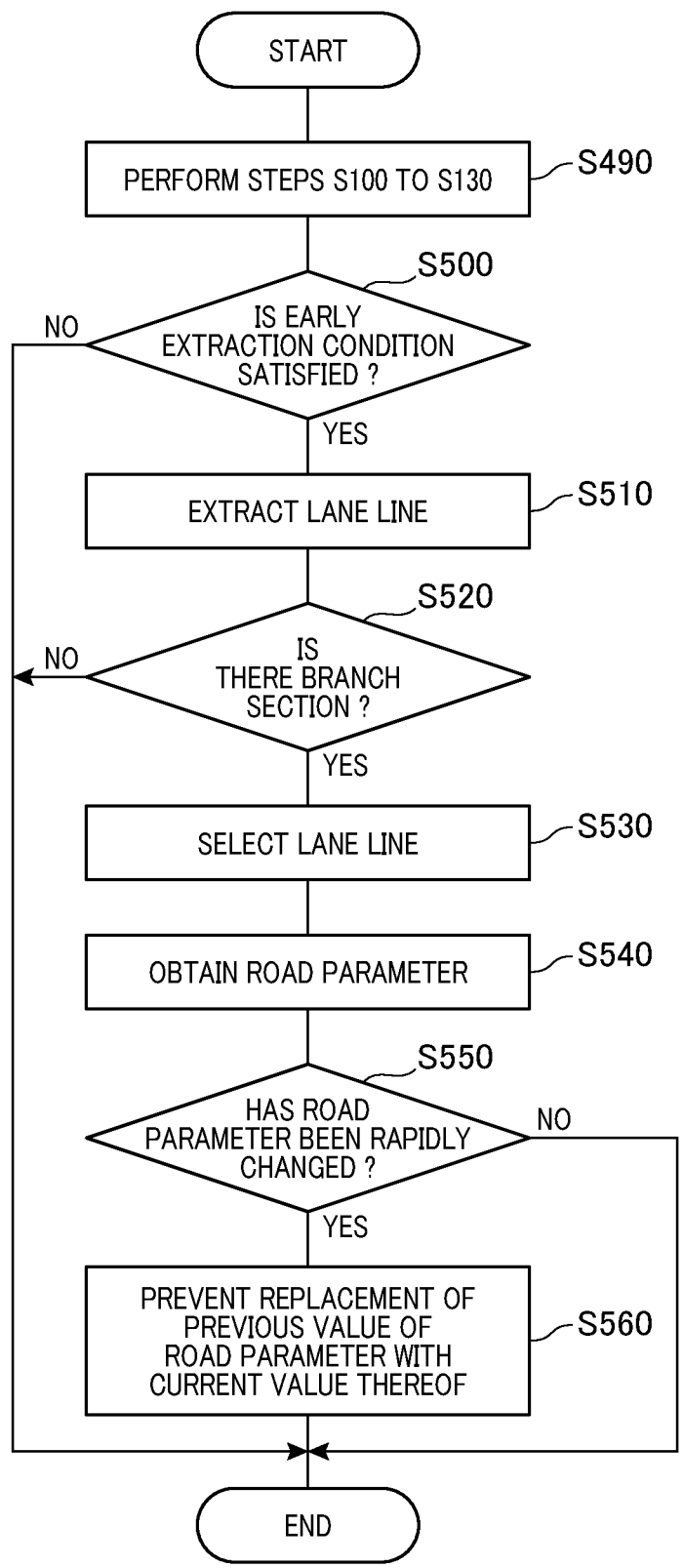

APPARATUS FOR ESTIMATING ROAD PARAMETER

CROSS REFERENCE TO RELATED APPLICATIONS

This application is based on and claims the benefit of priority from Japanese Patent Application No. 2020-023609 filed on Feb. 14, 2020, the disclosure of which is incorporated in its entirety herein by reference.

TECHNICAL FIELD

The present disclosure relates to technologies for estimating, based on one or more images captured from a vehicle, at least one parameter of a road in front of the vehicle.

BACKGROUND

There is a technology that captures an image of a view of a region in front of an own vehicle, and analyzes the captured image to thereby detect, in the captured image, a road region.

SUMMARY

A road parameter estimation apparatus includes a marker-based estimator that extracts, based on markers extracted by a marker extractor, at least one lane line that demarcates a road into plural regions in a width direction of the road, and estimates, based on the extracted at least one lane line, a value of at least one feature parameter of the road as a maker-based estimation result. The at least one feature parameter of the road represents at least one feature of the road. The road parameter estimation apparatus includes a model-based estimator that estimates, based on the at least one model-based demarcation line, a value of the at least one feature parameter of the road parameter as a model-based estimation result. The road parameter estimation apparatus includes a determiner that compares the at least one lane line with the model-based demarcation line to accordingly determine whether to use the marker-based estimation result or the model-based estimation result.

BRIEF DESCRIPTION OF THE DRAWINGS

Other aspects of the present disclosure will become apparent from the following description of embodiments with reference to the accompanying drawings in which:

FIG. 15 is a flowchart schematically illustrating a road parameter estimation routine according to a first modification of the first embodiment;

FIGS. 16A and 16B are a joint view schematically illustrating how to determine a branch section according to the second embodiment of the present disclosure;

FIG. 20 is a flowchart schematically illustrating a road parameter estimation routine according to the third embodiment;

FIG. 28 is a flowchart schematically illustrating a road parameter estimation routine according to the fifth embodiment.

DETAILED DESCRIPTION OF EMBODIMENT

Figure 1:
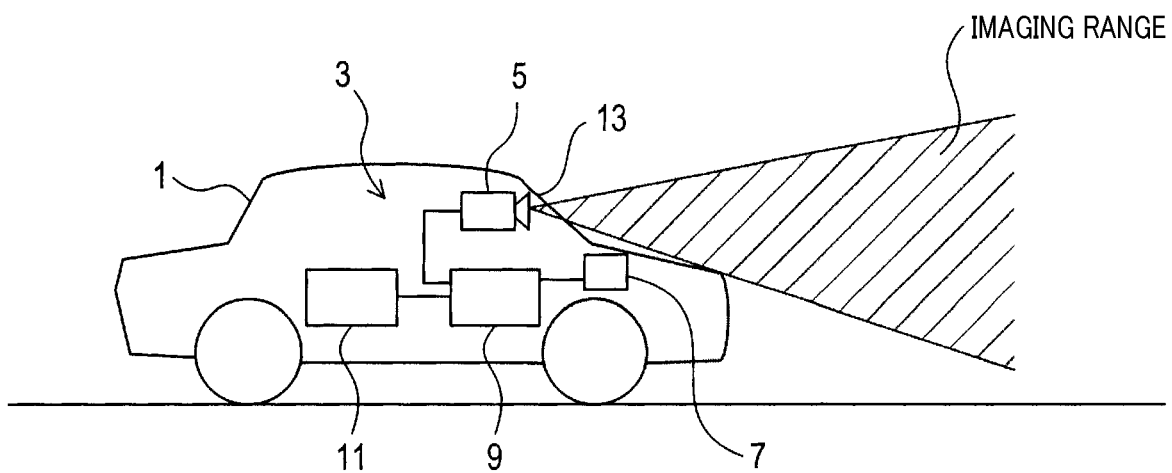
FIG. 1 is a block diagram schematically illustrating an example of the overall configuration of a vehicular system according to the first embodiment of the present disclosure.

Japanese Patent Application Publication No. 2011-28659 discloses a technology that captures an image of a view of a region in front of an own vehicle, and analyzes the captured image to thereby detect, in the captured image, a road region. The technology then analyzes the detected road region to thereby estimate the profile of a road in front of the own vehicle.

In particular, the technology disclosed in the above patent publication uses a stereo camera apparatus equipped with a pair of a left camera and a right camera to capture, using the left camera, a left image of the view of the region in front of the own vehicle, and capture, using the right camera, a right image of the view of the region in front of the own vehicle. Then, the technology analyzes the left and right images to thereby detect, in one of the left and right images, a road region that has a surface characteristic of asphalt.

More specifically, the technology obtains a series of correlation pixel values between the left image and the right image, and detects, based on the obtained series of correlation pixel values, a road region in one of the left image and the right image. Then, the technology recognizes, based on the road region in one of the left image and the right image, lane information about each of left and right lane markers, thus estimating, based on the recognized lane information, the profile of a road in front of the own vehicle.

Unfortunately, the above technology may not recognize the lane information with high accuracy, so that the above technology may not detect, based on the lane information, a road shape with high accuracy. That is, the above technology may not detect the profile of a road with a lane on which the own vehicle is traveling.

For addressing the above issue, the inventors of this application have been developing technologies of machine learning for obtaining the conditions of, for example, a road.

In view of the circumstances set forth above, an aspect of the present disclosure seeks to provide apparatuses for estimating, with higher accuracy, a parameter of a road on which a vehicle is located.

According to a first exemplary aspect of the present disclosure, there is provided a road parameter estimation apparatus. The road parameter estimation apparatus includes an image obtainer configured to obtain a forward image of a vehicle captured by a vehicular camera, and a recognizer configured to use a trained recognition model and the forward image to accordingly recognize, as a recognition result, a lane region and at least one model-based demarcation line indicative of a corresponding boundary of the lane region. The lane region represents a forward portion of a lane in a road on which the vehicle is located. The road parameter estimation apparatus includes a marker extractor configured to extract, from the forward image, markers painted on the road, and a marker-based estimator configured to extract, based on the markers extracted by the marker extractor, at least one lane line that demarcates the road into plural regions in a width direction of the road, and estimate, based on the extracted at least one lane line, a value of at least one feature parameter of the road as a maker-based estimation result, the at least one feature parameter of the road representing at least one feature of the road. The road parameter estimation apparatus includes a model-based estimator configured to estimate, based on the at least one model-based demarcation line, a value of the at least one feature parameter of the road parameter as a model-based estimation result. The road parameter estimation apparatus includes a determiner configured to compare the at least one lane line with the model-based demarcation line to accordingly determine whether to use the marker-based estimation result or the model-based estimation result.

According to a second exemplary aspect of the present disclosure, there is provided a road parameter estimation apparatus. The road parameter estimation apparatus includes an image obtainer configured to obtain a forward image of a vehicle captured by a vehicular camera, and includes a recognizer configured to use a trained recognition model and the forward image to accordingly recognize, as a recognition result, (i) a lane region representing a forward portion of a lane in a road on which the vehicle is located, and (ii) at least one of an other-vehicle region and a remaining region. The other-vehicle region represents at least one other vehicle in the forward image, and the remaining region is except for the lane region and the other region. The road parameter estimation apparatus includes a marker extractor configured to extract, from the forward image, markers painted on the road, at least one marker in the extracted markers constituting at least one lane line that demarcates the road into plural regions in a width direction of the road; and a marker eliminator configured to eliminate, based on the recognition result obtained by the recognizer, one or more markers from the extracted markers.

According to a third exemplary aspect of the present disclosure, there is provided a road parameter estimation apparatus. The road parameter estimation apparatus includes an image obtainer configured to obtain a forward image of a vehicle captured by a vehicular camera, and a recognizer configured to use a trained recognition model and the forward image to accordingly recognize, as a recognition result, a lane region and at least one model-based demarcation line indicative of a corresponding boundary of the lane region. The lane region represents a forward portion of a lane in a road on which the vehicle is located. The road parameter estimation apparatus includes a use determiner configured to determine whether to use the recognition result for estimating at least one feature parameter of the road, the at least one feature parameter of the road representing a feature of the road. The road parameter estimation apparatus includes a lane information obtainer configured to obtain, from the forward image, lane information about the lane of the road. The road parameter estimation apparatus includes an estimator configured to (i) estimate, based on the recognition result, a value of the at least one feature parameter of the road in response to determination to use the recognition result; and (ii) estimate, based on the lane information about the lane of the road, a value of the at least one feature parameter of the road in response to determination not to use the recognition result.

The road parameter estimation apparatus of the first exemplary aspect compares the at least one lane line with the model-based demarcation line to accordingly determine whether to use the marker-based estimation result or the model-based estimation result.

This configuration therefore makes it possible to select one of the marker-based estimation result or the model-based estimation result, which is suitable for estimation of the feature parameter of the road. This therefore enables the feature parameter of the road to be estimated with higher accuracy.

The road parameter estimation apparatus of the second aspect is configured to eliminate one or more unnecessary markers, from all the markers extracted by the marker extractor. This configuration therefore achieves a technical benefit of estimating the lane line with higher accuracy.

The road parameter estimation apparatus of the third aspect is configured to (i) estimate, based on the recognition result, a value of the at least one feature parameter of the road in response to determination to use the recognition result; and (ii) estimate, based on the lane information about the lane of the road, a value of the at least one feature parameter of the road in response to determination not to use the recognition result.

This therefore makes it possible to estimate the feature of the forward portion of the road with higher accuracy in accordance with the various road conditions and/or traffic environments around the vehicle.

The following describes exemplary embodiments of the present disclosure with reference to the accompanying drawings. In the embodiments, like parts between the embodiments, to which like reference characters are assigned, are omitted or simplified to avoid redundant description.

First Embodiment 1-1. Overall Configuration

The following describes an example of the overall configuration of a vehicular system 3, which incorporates therein a road profile estimation apparatus 9 according to the first embodiment of the present disclosure.

Referring to FIG. 1, the vehicular system 3, which is for example installed in a vehicle 1 according to the first embodiment, includes a vehicular camera 5, a vehicular sensor group 7, the road profile estimation apparatus 9, and a vehicular controller 11. The vehicle 1 can also be referred to as an own vehicle 1.

Figure 2:
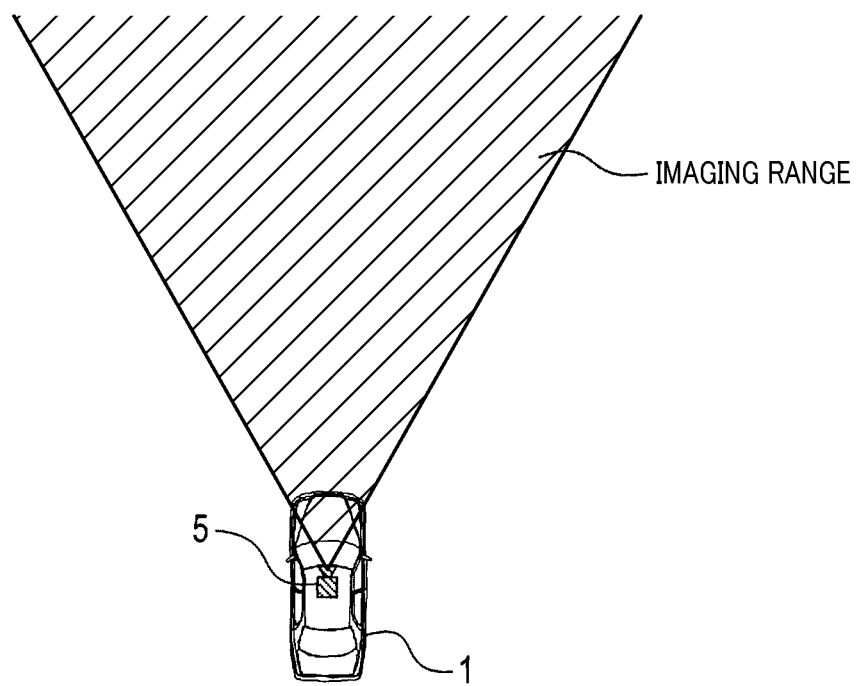
FIG. 2 is a schematic plan of a vehicle illustrated in FIG. 1 for illustrating an imaging range of a vehicular camera illustrated in FIG. 1.

The vehicular camera 5 is comprised of, for example, a known CCD camera. As illustrated in FIGS. 1 and 2, the vehicular camera 5 is mounted to, for example, the top of the inner surface of a front windshield 13 of the own vehicle 1.

The vehicular camera 5 is configured to capture a forward view from the own vehicle 1 every predetermined period, and generate, every predetermined period, a forward image, i.e. a forward frame image, of the forward view with a digital format.

As illustrated in FIG. 2, the forward view from the own vehicle 1 has a substantially sector imaging range centering around the vehicular camera 5 in a horizontal direction corresponding to a width direction of the own vehicle 1. For example, the sector imaging range has a predetermined height in a vertical direction corresponding to a height direction of the own vehicle 1. The vehicular camera 5 is capable of generating color forward images as forward images.

For example, each forward image is comprised of pixels, i.e. pixel data items, two-dimensionally arranged in both the vertical and horizontal directions corresponding to the respective height direction and width direction of the own vehicle 1. In other words, the pixels of each forward image, i.e. each forward frame image, are arranged in rows and columns; each row corresponds to the horizontal direction, and each column corresponds to the vertical direction.

Each pixel of a forward image represents an intensity level or a luminance level of a corresponding received light component of the forward image.

The vehicular camera 5, which is communicably connected to the road profile estimation apparatus 9, is configured to output the forward image to the road profile estimation apparatus 9 each time the vehicular camera 5 generates the forward image.

The vehicular sensor group 7 includes various sensors for measuring operating conditions of the own vehicle 1. For example, the vehicular sensor group 7 includes a vehicle speed sensor, a yaw rate sensor, a pitch angle sensor, and a steering angle sensor.

The vehicle speed sensor is configured to measure a speed of the own vehicle 1 every predetermined period, and send, to the road profile estimation apparatus 9 every predetermined period, a measurement parameter indicative of the measured speed of the own vehicle 1.

The yaw rate sensor is configured to measure an angular velocity of the own vehicle 1 around its vertical axis every predetermined period, and send, to the road profile estimation apparatus 9 every predetermined period, a measurement parameter indicative of the angular velocity of the own vehicle 1 as a yaw rate.

The pitch angle sensor is configured to measure a pitch angle of the own vehicle 1 around its horizontal axis every predetermined period, and send, to the road profile estimation apparatus 9 every predetermined period, a measurement parameter indicative of the pitch angle of the own vehicle 1. The steering angle sensor is configured to measure a steering angle of the steering wheel of the own vehicle 1 every predetermined period, and send, to the road parameter estimation apparatus 9 every predetermined period, a measurement parameter indicative of the steering angle to the road parameter estimation apparatus 9.

These measurement parameters serve as operating condition parameters of the own vehicle 1, which represent the operating conditions of the own vehicle 1.

That is, each of the sensors belonging to the vehicular sensor group 7 is configured to send, to the road parameter estimation apparatus 9, a corresponding one of the operating condition parameters each time the corresponding one of the sensors measures the corresponding one of the operating condition parameters.

The vehicular sensor group 7 can include a known navigation system. The navigation system is for example configured to receive, via one or more antennas mounted to the own vehicle 1, global positioning system (GPS) signals, which are sent from GPS satellites constituting a global navigation satellite system (GNSS), and estimate the current position of the own vehicle 1 in accordance with the received GPS signals.

For example, the navigation system is also configured to store, in its large-capacity storage, various road information items and map information items about many roads that the own vehicle 1 can travel. The map information for example includes the profile of each road that the own vehicle 1 can travel.

The navigation system is for example configured to continuously display a road map on its display around the current position of the own vehicle 1, and display, on the road map, a selected route from the current position of the own vehicle 1 to a destination in response to when a driver of the own vehicle 1 inputs the destination using its input unit.

The vehicular controller 11 is comprised of a processor, such as a CPU, an output device, and a storage unit including, for example, non-transitory tangible storage media, such as a random-access memory (RAM), a read only memory (ROM), a flash memory, and other types of memory.

The processor of the vehicular controller 11 is programmed to execute, in accordance with information outputted from the road parameter estimation apparatus 9, instructions included in at least one program stored in the storage unit to thereby implement various control tasks of the own vehicle 1, which include a warning output task and a travel control task.

The warning task is to visibly and/or audibly output warning information via the output unit in response to, for example, the processor of the vehicular controller 11 detecting that there is a possibility of the own vehicle 1 deviating from a lane of a road on which the own vehicle 1 is traveling; the lane of the road on which the own vehicle 1 is traveling will also be referred to as a current travel lane, and the road on which the own vehicle 1 is traveling will also be referred to as a current travel road.

The travel control task is to control, for example, the steering wheel of the own vehicle 1 and/or a brake system installed in the own vehicle 1 in response to the processor of the vehicular controller 11 detecting that there is a possibility of the own vehicle 1 deviating from the current travel lane.

The road parameter estimation apparatus 9 is comprised of a processor 9a, such as a CPU, and a storage unit 9b including, for example, non-transitory tangible storage media, such as a random-access memory (RAM), a read only memory (ROM), a flash memory, and other types of memory.

Figure 3:
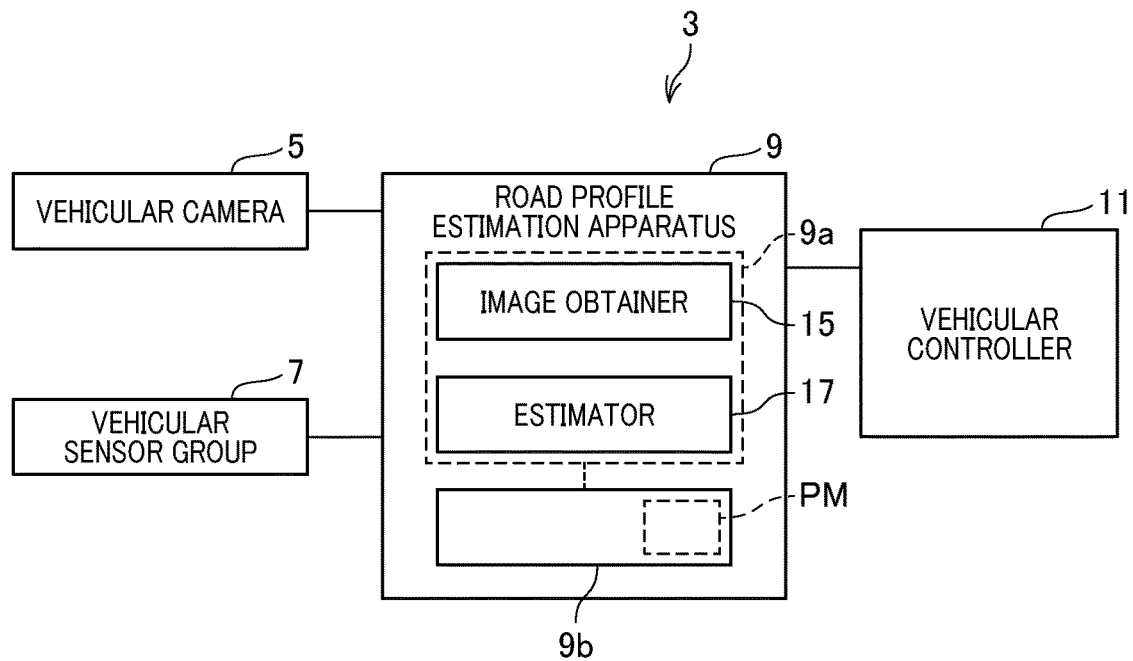
FIG. 3 is a block diagram schematically illustrating a functional configuration of the vehicular system illustrated in FIG. 1.
Figure 4:
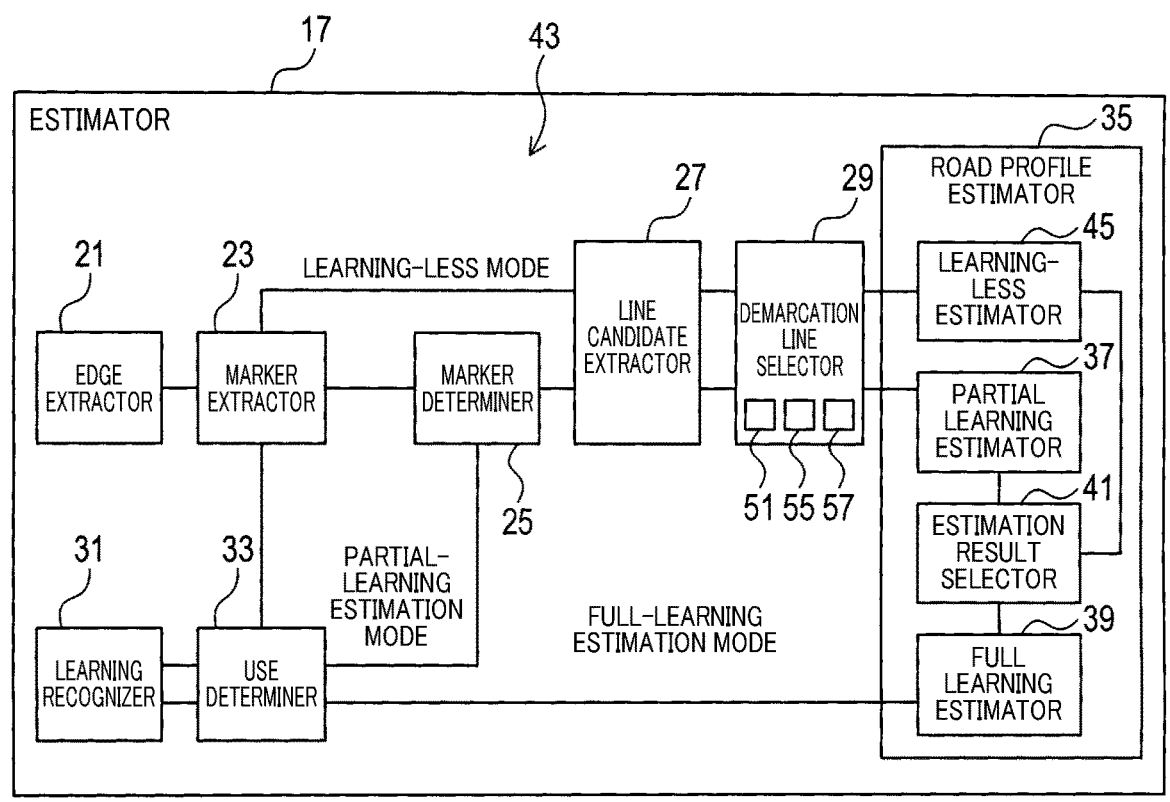
FIG. 4 is a block diagram schematically illustrating a functional configuration of an estimator illustrated in FIG. 3.

The processor 9a of the road parameter estimation apparatus 9 is configured to execute instructions included in at least one program stored in the storage unit 9b to accordingly implement various functions disclosed in, for example, FIGS. 3 and 4.

As described above, each of the vehicular controller 11 and the road parameter estimation apparatus 9 is designed as a computer circuit comprised of at least a processor and a storage unit, and configured to execute instructions of at least one program stored in the storage unit to thereby implement various functions and/or various tasks. Each of the apparatuses 9 and 11 can be comprised of two or more computer circuits or a computer circuit comprised of two or more processors.

Each of the apparatuses 9 and 11 may be comprised of another type of processor, such as an application specific integrated circuit (ASIC).

At least one of various functions and/or tasks to be installed in each of the apparatuses 9 and 11 can be implemented by at least one hardware device, or at least one programmed logic circuit, or the combination of them.

As illustrated in FIG. 3, the road parameter estimation apparatus 9 functionally includes an image obtainer 15 and an estimator 17.

The image obtainer 15 is configured to obtain a forward image each time the forward image is sent from the vehicular camera 5; the forward image represents a forward view from the own vehicle 1.

As illustrated in FIG. 4, the estimator 17 is functionally configured to estimate, based on the frame image obtained by the image obtainer 15, the profile of at least one lane on the current travel road.

1-2. Configuration of Estimator

Next, the following describes an example of the functional configuration of the estimator 17.

The estimator 17, as illustrated in FIG. 4, functionally includes an edge extractor 21, a marker extractor 23, a marker determiner 25, a line candidate extractor 27, a demarcation line selector 29, a learning recognizer 31, a use determiner 33, and a road parameter estimator 35. The road parameter estimator 35 functionally includes a partial learning estimator 37, a full learning estimator 39, and an estimation result selector 41.

The estimator 17 functionally configured set forth above is capable of estimating, based on the forward image for example stored in the storage unit 9b, the profile of at least one lane of the current travel road in a selected one of the following procedures A, B, and C.

The procedure A is designed as an estimation procedure without using deep machine learning. Specifically, the procedure A includes a step of extracting, in the forward image captured by and obtained from the vehicular camera 5, markers on the current travel road, and a step of estimating, based on the markers, the profile of at least one lane on the current travel road. For example, the phrase "NON-LEARNING ESTIMATION MODE (NON-MODEL MODE)" represents that the procedure A is performed by the estimator 17.

Markers painted on a road represent dashed lines or solid lines extending on the road, which have predetermined color of, for example, white or yellow, some of which demarcate a region of the road into one or more lanes aligned in a width of the road.

In particular, the procedure A, which is known by skilled persons in the art, is designed to obtain, based on the markers, plural lane lines as demarcation-line candidates extending on the current travel road; the plural lane lines demarcate the current travel road into plural regions in the width direction of the current travel road. The procedure A is also designed to analyze the obtained plural lane lines, i.e. demarcation-line candidates, to thereby recognize a pair of left and light demarcation lines that define at least one lane on the current travel road. The procedure A is further designed to analyze the profile of each of the left and right demarcation lines of the at least one lane to thereby estimate the profile of the at least one lane on the current travel road. For example, the procedure A estimates the profile of a forward section of the current travel lane as the at least one lane.

The procedure B includes a step of extracting, in the forward image captured by and obtained from the vehicular camera 5, lane markers painted on the current travel road without using deep machine learning, and a step of estimating, based on the lane markers, the profile of at least one lane on the current travel road using deep machine learning. For example, the phrase "PARTIAL-LEARNING ESTIMATION MODE" represents that the procedure B is performed by the estimator 17.

The procedure C is designed to estimate the profile of at least one lane on the current travel road mainly using deep machine learning. For example, the phrase "FULL-LEARNING ESTIMATION MODE" represents that the procedure C is performed by the estimator 17.

Next, the following describes, in detail, each of the functional components 21 to 35 illustrated in FIG. 4.

The edge estimator 21 extracts, from the forward image captured by the vehicular camera 5, edges, i.e. edge points, each of which is a pixel having a pixel value that has significantly changed as compared with that of at least one adjacent pixel in the forward image.

Because various methods for extracting, from a captured image, edge points are known, the following simply describes one of the various methods.

Specifically, the edge extractor 21 scans the first row of the captured image from the leftmost-edge pixel to the rightmost-edge pixel to thereby search for pixels from the first row of the captured image; the pixel value of each of the extracted pixels has changed by at least threshold value from an adjacent left pixel or an adjacent right pixel of the first row of the captured image. Then, the edge extractor 21 extracts, as a result of the search, one or more up-edge points and/or one or more down-edge points in the first row of the captured image.

Each of the one or more up-edge points represents a pixel whose pixel value has increased from a lower pixel value of an adjacent right or left pixel by the at least threshold value. Similarly, each of the one or more down-edge points represents a pixel whose pixel value has decreased from a higher pixel value of an adjacent right or left pixel by the at least threshold value.

The edge extractor 21 repeats the above scanning operation to thereby extract up-edge points and/or down-edge points for each of the second row to the lowermost row while sequentially shifting the scanning row from the second row to the lowermost row. This enables up-edge and down-edge points to be extracted from the whole area of the captured image.

Figure 5:
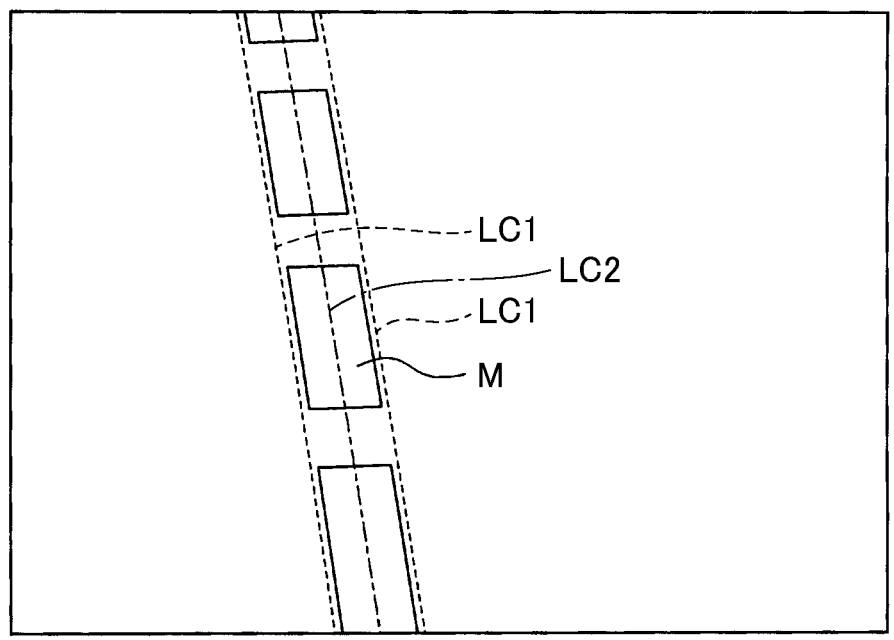
FIG. 5 is an enlarged view indicative of a relationship between markers and a lane line on a road.

The marker extractor 23, as illustrated in solid lines in FIG. 5, selects plural groups of edge points in all the extracted edge points, and links the edge points in each of the selected groups to thereby extract the respective linked groups as markers.

For example, the marker extractor 23 selects, as each group of edge points, a substantially rectangular-shaped group of edge points in all the extracted edge points, and links the selected edge points in each rectangular-shaped group to thereby extract markers from the forward image.

More specifically, the marker extractor 23 selects each up-edge point in all the extracted edge points, and selects, from the remaining edge points, a down-edge point for each up-edge point; the down-edge point for each up-edge point is located right-hand adjacent, i.e. right-hand closest, to the corresponding up-edge point.

Thereafter, the marker extractor 23 pairs each up-edge point with the selected corresponding down-edge point to thereby obtain pairs of up-edge points and down-edge points respectively as up-down edge-point pairs.

Then, the marker extractor 23 extracts, from all the up-down edge-point pairs, plural groups of up-down edge-point pairs such that the up-down edge-point pairs of each extracted group are arranged in the traveling direction of the own vehicle 1 at predetermined intervals; the length of each interval is set to be within a predetermined threshold length. Thereafter, the marker extractor 23 links the up-down edge-point pairs in each of the extracted group to accordingly extract, from the forward image, linked up-down edge-point pairs in each extracted group as a marker. That is, the marker extractor 23 extracts, from the forward image, markers for the respective extracted groups. In FIG. 5, the markers are illustrated with reference character M.

The line candidate extractor 27 is configured to extract, based on the extracted markers, lane lines as demarcation-line candidates from the forward image, each of which extends in the traveling direction of the own vehicle 1 to partition the forward portion of the current travel road in its width direction. Specifically, the line candidate extractor 27 selects, in all the extracted markers, plural groups of markers such that the markers of each group are aligned in the traveling direction of the own vehicle 1. Then, the line candidate extractor 27 links the selected markers of each group to thereby create, on the forward image, a virtual lane line for the corresponding group as illustrated by dashed lines, to which reference character LC1 is assigned.

If an extracted marker has a linear shape extending in the traveling direction of the own vehicle 1, the line candidate extractor 27 directly creates, based on the linear shaped marker, a virtual lane line as a demarcation-line candidate.

Note that, because each lane line based on the linked markers has a substantially constant width, the line candidate extractor 27 can be configured to virtually draw a line on the markers of a selected group such that the line passes through the middle of each marker in its width direction, thus creating the drawn line as a lane line for the selected group. As another example, the line candidate extractor 27 can be configured to virtually draw a line on one side edge, such as the right edge, or the other side edge, such as the left edge, of each marker of a selected group in its width direction, thus creating the drawn line as a lane line for the selected group. In particular, the line candidate extractor 27 can be configured to virtually draw a line on one side edge of each marker of a selected group, which is closer to the own vehicle 1, thus creating the drawn line as a lane line for the selected group.

The demarcation line selector 29 is configured to select, from the lane lines extracted by the line candidate extractor 27, at least one pair of lane lines suitable for at least one pair of left and right marker-based demarcation lines that define a left boundary and a right boundary of at least one target lane, such as the current travel lane. The demarcation line selector 29 is also configured to set the selected at least one pair of lane lines as the at least one pair of left and right marker-based demarcation lines for the at least one target lane.

For example, the demarcation line selector 29 can select, from the lane lines extracted by the line candidate extractor 27, a pair of lane lines that have a minimum interval longer than a predetermined threshold distance; one of the selected lane lines is the closest to the own vehicle 1 in the left side of the own vehicle 1, and the other of the selected lane lines is the closest to the own vehicle 1 in the right side of the own vehicle 1. Then, the demarcation line selector 29 can determine a pair of the selected lane lines as a pair of marker-based demarcation lines of the current travel lane of the own vehicle 1.

The demarcation line selector 29 also can select, from the lane lines extracted by the line candidate extractor 27, a pair of lane lines as a pair of marker-based demarcation lines of the current travel lane of the own vehicle 1 in accordance with information about the conditions of the current travel road.

The learning recognizer 31 includes at least one prediction model PM, and has been provided with many test forward images as updatable datasets to be used to train the at least one prediction model PM for recognition of road regions, which are stored in, for example, the storage unit 9b.

The learning recognizer 31 is configured to use the at least one recognition model RM, which has been deeply trained in a deep learning mode based on the many test forward images, to recognize, upon a target forward image being inputted to the at least one recognition model RM, a region of a forward portion of the current travel lane of the own vehicle 1 in the inputted target forward image.

That is, the learning recognizer 31 is configured to periodically train the at least one recognition model RM based on many test forward images previously stored in the storage unit 9b and/or captured by, for example, the vehicular camera 5 in the deep learning mode. This enables the at least one recognition model RM to have higher accuracy of recognizing the region of the forward portion of the current travel lane of the own vehicle 1 in the inputted target forward image.

The following describes an example of how the learning recognizer 31 trains the at least one recognition model RM in the deep learning mode. Because how the learning recognizer 31 trains the at least one recognition model RM in the deep learning mode is well known, the following describes it only simply.

As described above, the learning recognizer 31 is operative, in the deep learning mode, to 1. Obtain many test forward images captured by, for example, vehicular camera 5
2. Partition, in each of the test forward images, at least one road region, at least one other-vehicle region, at least one other-object region except for the at least one road region and the at least one other-vehicle region
3. Partition, in the road region of each of the test forward images, a region of the current travel region of the own vehicle 1, and the remaining region except for the region of the current travel region to thereby obtain the partitioned test forward images as labelled training data items, i.e., labelled training forward images
4. Train the at least one recognition model RM based on the obtained training forward images As the at least one recognition model RM, a multi-layer neural network model, which is an example of a multi-layer model, can be preferably used.

Note that the number of test forward images, the configuration of the at least one recognition model RM, and the number of multi-layers of the neural network model can be freely determined in accordance with, for example, the conventional technologies.

For example, the neural network model serving as the at least one recognition model RM is comprised of multi-layers including many hidden layers, each of which is comprised of one or more units; each unit, also called a node or neuron, is implemented by, for example, a functional module, such as a hardware module, a software module, or a combination of hardware and software modules. Each unit in one layer in the neutral network is connected to all units in a layer next thereto. The neural network can have several tens to several hundreds of hidden layers.

That is, the neural network model set forth above is called as a deep neural network model, and the learning recognizer 31 can be configured to train the deep neural network model using the labelled training forward images. A known convolutional neural network model can be preferably used as the deep neural network model.

Figure 6:
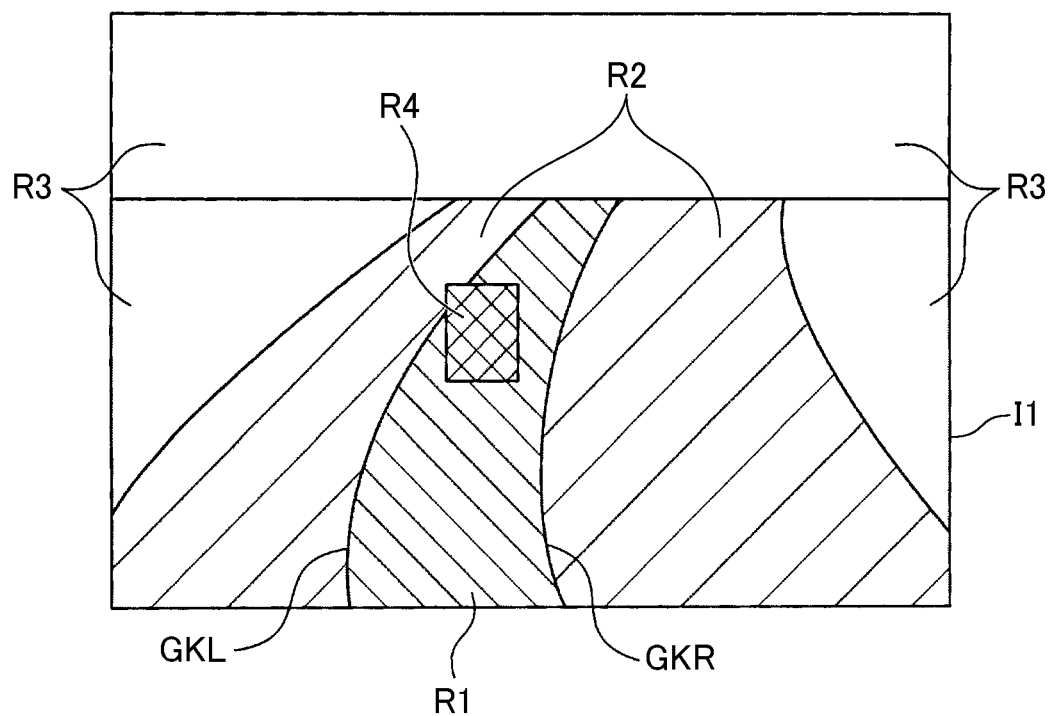
FIG. 6 is a view schematically illustrating a learning-based image generated by a learning recognizer illustrated in FIG. 4.

Specifically, as described above, the learning recognizer 31 is configured to use the trained convolution neural network as the at least one trained recognition model RM, to recognize, upon a target forward image currently captured by the vehicular camera 5 (see I1 in FIG. 6) being inputted to the trained convolutional neural network, 1. An own-lane region (see reference character R1 in FIG. 6), which represents a region of the forward portion of the current travel lane of the current travel road in the inputted target forward image
2. A current-travel road region (see reference character R2 in FIG. 6), which represents a region of the current travel road of the own vehicle 1 except for the own-lane region in the inputted target forward image 3. At least one non-road region (see reference character R3 in FIG. 6), which represents a region in the inputted target forward image except for the current-travel road region
4. At least one other-vehicle region (see reference character R4) indicative of at least one other vehicle in the inputted target forward image In FIG. 6, the own-lane region R1 is illustrated as a first hatched region, the at least one remaining road region R2 is illustrated as a second hatched region whose direction of each hatch is different from the direction of each hatch in the first hatched region. In FIG. 6, the at least one non-road region R3 is illustrated as a non-hatched white region, and the at least one other-vehicle region R4 is illustrated as a cross-hatched region.

Hereinafter, the target forward image in which the own-lane region (see R1 in FIG. 6) and the other regions (see R2 to R4 in FIG. 6) are partitioned will also be referred to as a learning-based image.

That is, the learning recognizer 31 makes it possible to obtain a recognition result including the learning-based image that represents the location of the own-lane region in the inputted target forward image.

As illustrated in FIG. 6, the own-lane region has a pair of learning-based demarcation lines GK, i.e. a pair of left and right learning-based demarcation lines GKL and GKR, which define a left-side boundary of the own-lane region, and a right-side boundary of the own-lane region in the inputted target forward image.

The use determiner 33 is configured to determine whether the road parameter estimator 35 should use the recognition result obtained by the learning recognizer 31 for estimating the profile of the forward portion of the current travel lane of the own vehicle 1.

The road parameter estimator 35 is configured to use the recognition result obtained by the learning recognizer 31 to thereby estimate, as at least one road parameter indicative at least one feature of the current travel road, the profile of the forward portion of the current travel lane of the own vehicle 1 in response to determination that the use determiner 33 determines that the road parameter estimator 35 should use the recognition result obtained by the learning recognizer 31.

Otherwise, the road parameter estimator 35 is configured to use information about the current travel lane of the own vehicle 1, which is obtained by a non-learning obtainer 43, in a non-learning mode for estimating the profile of the forward portion of the current travel lane of the own vehicle 1 in response to determination that the use determiner 33 determines that the road parameter estimator 35 should not use the recognition result obtained by the learning recognizer 31.

The non-learning obtainer 43 set forth above is configured to obtain, based on the forward image obtained by the image obtainer 15, the information about the current travel lane of the own vehicle 1 in the non-learning mode without using the recognition result obtained by the learning recognizer 31.

That is, the non-learning obtainer 43 is for example comprised of the edge extractor 21, the marker extractor 23, the line candidate estimator 27, and the demarcation line selector 29.

The marker determiner 25 is configured to perform a marker determination task in response to determination that the road parameter estimator 35 should use the recognition result obtained by the learning recognizer 31.

The marker determination task is designed to determine whether each of the markers extracted by the marker extractor 23 is located along one of the learning-based demarcation lines GKL and GKR.

For example, in response to determination that plural markers are each located along the left learning-based demarcation line GKL, the line candidate extractor 27 links each pair of adjacent markers of the plural markers in the traveling direction of the own vehicle 1 with one another to thereby extract, based on the linked markers, a left lane line from the forward image; the left lane line extends in the traveling direction of the own vehicle 1 along the left learning-based demarcation line GKL.

Similarly, in response to determination that plural markers are each located along the right learning-based demarcation line GKR, the line candidate extractor 27 links each pair of adjacent markers of the plural markers in the traveling direction of the own vehicle 1 with one another to thereby extract, based on the linked markers, a right lane line from the forward image; the right lane line extends in the traveling direction of the own vehicle 1 along the right learning-based demarcation line GKR.

This enables the demarcation line selector 29 to easily select a pair of the left and right lane lines as the pair of the left and right demarcation lines. The demarcation line selector 29 is also configured to delete, in the forward image, the remaining lane lines that are unselected as demarcation lines.

The road parameter estimator 35 is configured to perform one of

1. A first estimation task of estimating, based on the pair of the left and right marker-based demarcation lines currently selected by the demarcation line selector 29, the profile of the forward portion of the current travel road, which includes the forward portion of the current travel lane, of the own vehicle 1

2. A second estimation task of estimating, based on the learning-based demarcation lines GKL and GKR obtained by the learning recognizer 31, the profile of the forward portion of the current travel road, which includes the forward portion of the current travel lane, of the own vehicle 1

Specifically, the road parameter estimator 35 estimates, as at least one road parameter indicative at least one feature of the current travel road, such as the profile of the current travel road, various road parameters including, for example, the location of the current travel lane, the gradient, i.e. slope, of the current travel lane, the curvature of the current travel lane, and the width of the current travel lane.

The lane width represents a minimum interval between the pair of the left and right marker-based demarcation lines or the left and right learning-based demarcation lines GKL and GKR.

The location of the current travel lane represents a minimum distance from the center of gravity of the own vehicle 1 to a center position of the current travel lane; the center position of the current travel lane represents a center of the current travel lane in its width direction.

The gradient of the current travel lane represents the gradient of a tangent line with respect to the traveling direction of the own vehicle 1; the tangent line is of a virtual center line, which is located between the left and right demarcation lines of the current travel lane, at the center position thereof. The curvature of the current travel lane represents a curvature of the virtual center line of the current travel lane.

The various road parameters each representing a corresponding feature of the current travel road, which are estimated by the road parameter estimator 35, are outputted from the road parameter estimator 35 to the vehicle controller 11.

In particular, as described above, the road parameter estimator 35 includes the partial learning estimator 37 and the full learning estimator 39.

The partial learning estimator 37 performs the first estimation task of estimating, based on the pair of the left and right demarcation lines currently selected by the demarcation line selector 29, the profile of the forward portion of the current travel road in response to determination that the markers extracted by the marker extractor 23 are located along one of the learning-based demarcation lines GKL and GKR.

That is, the partial learning estimator 37 is capable of estimating, as a first estimation result, the profile of the current travel road of the own vehicle 1 based on the pair of the left and right demarcation lines that are obtained by cooperation of the edge extractor 21, the marker extractor 23, the marker determiner 25, the line candidate extractor 27, and the demarcation line selector 29 set forth above.

The full learning estimator 39 is configured to estimate, based on the learning-based demarcation lines GKL and GKR indicative of the boundaries of the current travel lane obtained by the learning recognizer 31, the profile of the current travel road.

That is, the full learning estimator 39 is capable of estimating, as a second estimation result, the profile of the current travel road of the own vehicle 1 based on (i) the recognition result obtained by the learning recognizer 31 and (ii) a result of the determination by the use determiner 33.

The estimation result selector 41 is configured to calculate

1. A first recognition distance for the left and right marker-based demarcation lines of the current travel lane estimated by the partial learning estimator 37 based on the markers 2. A second recognition distance for the left and right image-based demarcation lines GKL and GKR obtained by the full learning estimator 39

The estimation result selector 41 is also configured to (1) Perform a comparison between the first recognition distance and the second recognition distance (2) Analyze information about the comparison to thereby select one of the first estimation result obtained by the partial learning estimator 37 and the second estimation result obtained by the full learning estimator 39; the selected one of the first estimation result and the second estimation result matches a longer one of the first recognition distance and the second recognition distance The first recognition distance is defined as a minimum distance of the farthest point on one of the left and right marker-based demarcation lines, which are used by the partial learning estimator 37 and selected by the demarcation line selector 29 from the lane lines. The second recognition distance is defined as a minimum distance of the farthest point on one of the learning-based demarcation lines GKL and GKR, which are used by the full learning estimator 39 and obtained by the learning recognizer 31.

Accordingly, the estimation result selector 41 compares the first recognition distance with the second recognition distance to thereby select one of the first estimation result obtained by the partial learning estimator 37 and the second estimation result obtained by the full learning estimator 39; the selected one of the first estimation result and the second estimation result matches a longer one of the first recognition distance and the second recognition distance.

In addition, the road parameter estimator 35 includes a non-learning estimator 45. The non-learning estimator 45 is configured to perform the first estimation task of estimating, based on the pair of the left and right marker-based demarcation lines currently selected by the demarcation line selector 29, the profile of the forward portion of the current travel road, which includes the forward portion of the current travel lane, of the own vehicle 1.

1-3. Conditions for Determination by Use Determiner

Next, the following describes, in detail, conditions of determination carried out by the use determiner 33.

The use determiner 33 is configured to determine whether the road parameter estimator 35 should use the recognition result obtained by the learning recognizer 31 in accordance with a selected one of the following conditions A to E.

The following describes the conditions A to E.

The Condition A

The Condition a Uses

1. A plurality of boundary points BP located on one of the left and right learning-based demarcation lines GKL and GKR, each of which represents a boundary of the own-lane region R1 in its width direction (see FIG. 7)

2. A fitting curve FC drawn to fit the arrangement of the boundary points BP located on one of the left and right learning-based demarcation lines GKL and GKR 3. Fitting errors FE, each of which represents an absolute deviation between the fitting curve FC and a corresponding one of the boundary points BP located on one of the left and right learning-based demarcation lines GKL and GKR.

That is, the use determiner 33 is configured to calculate the fitting error FE for each boundary point BP, and determine whether the road parameter estimator 35 should use the recognition result obtained by the learning recognizer 31 as a function of the fitting error FE for each boundary point BP.

In accordance with a result of the determination, the use determiner 33 is configured to determine whether the road parameter estimator 35 should use the recognition result obtained by the learning recognizer 31.

The following describes, in detail, how the use determiner 33 determines whether the road parameter estimator 35 should use the recognition result obtained by the learning recognizer 31 in accordance with the condition A.

Figure 7:
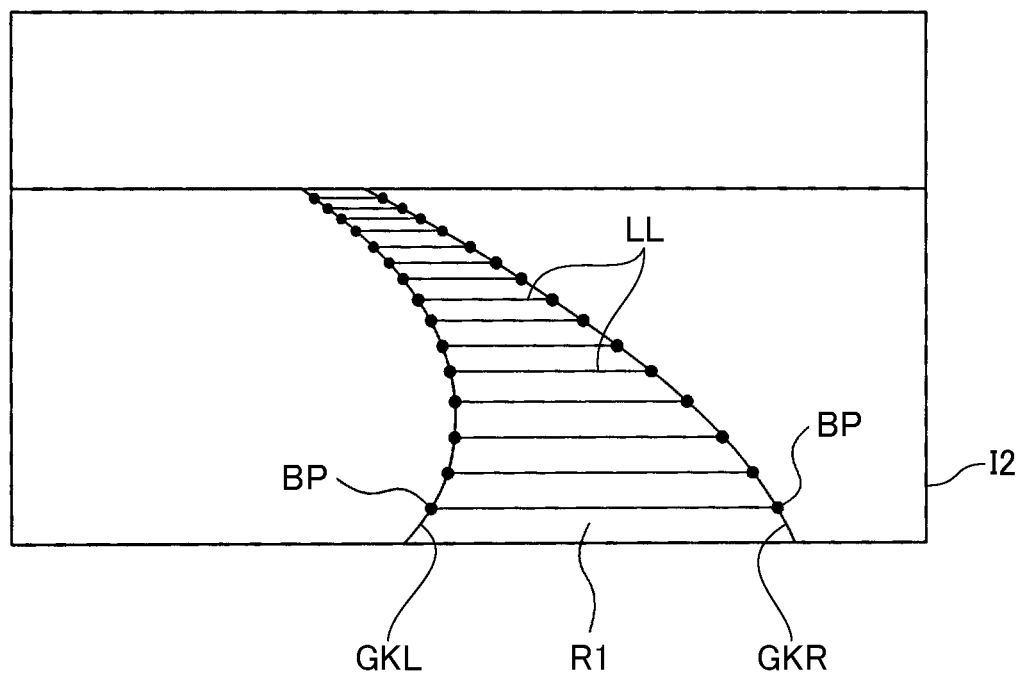
FIG. 7 is a view schematically illustrating a relationship between an own-lane region and boundary points on the learning-based image.

FIG. 7 schematically illustrates a target forward image 12, currently captured by the vehicular camera 5, in which the own-lane region R1 and the other regions except for the own-lane region R1 are partitioned. Hereinafter, the partitioned forward image will also be referred to as a learning-based image.

As illustrated in FIG. 7, the use determiner 33 draws, on the own-lane region R1 of the learning-based image, linear lines LL at regular intervals in the vertical direction; each linear line LL extends in the width direction of the own-lane region R1. Next, the use determiner 33 sets intersection points between the respective linear lines LL and the left learning-based demarcation line GKL as boundary points BP, and also sets intersection points between the respective linear lines LL and the right learning-based demarcation line GKR as boundary points BP.

Figure 8:
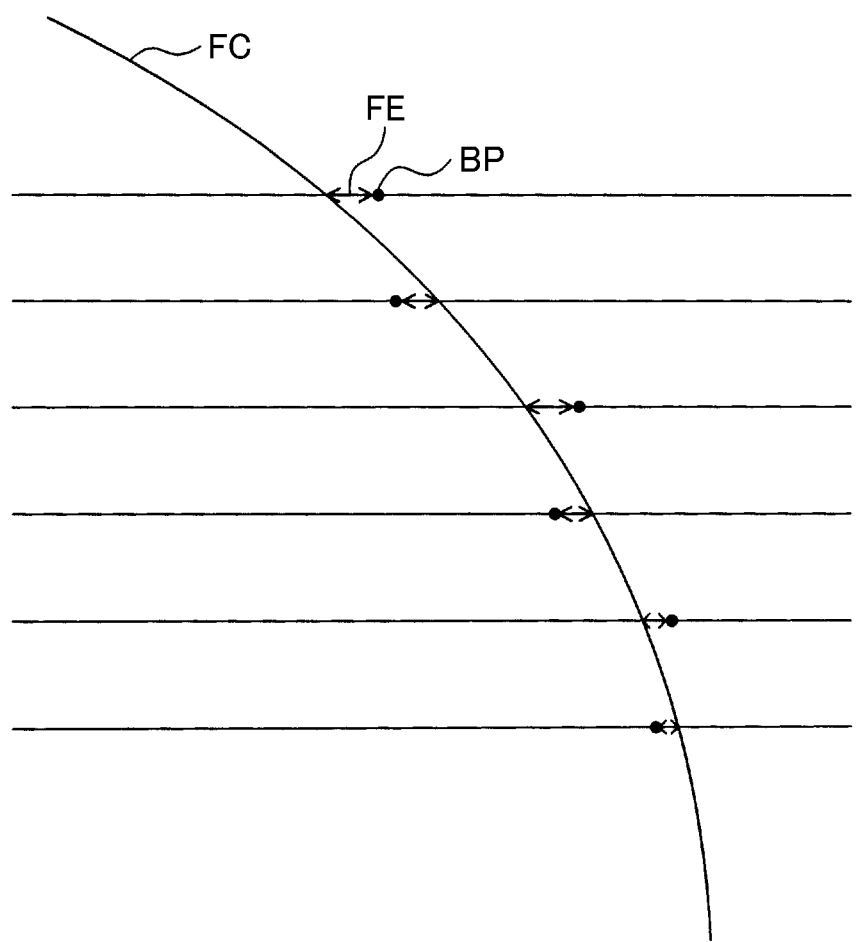
FIG. 8 is an enlarged view schematically illustrating a relationship between a fitting curve and the boundary points.

Next, as illustrated in FIG. 8, the use determiner 33 draws, based on the boundary points BP on one of the left and right demarcation lines GK, a fitting curve, i.e. an approximation curve, FC that approximately fits the arrangement of the boundary points BP on one of the left and right demarcation lines GKL and GKR (for example, the right demarcation line GKR in FIG. 8). As one of known typical examples, the use determiner 33 obtains the fitting curve FC using the least-squares approach.

Next, the use determiner 33 calculates a minimum distance between each boundary point BP and the fitting curve FC in the width direction, i.e. in the left-right direction, of the own-lane region (see FIG. 8). The calculated minimum distance for each boundary point BP represents a fitting error FE between the corresponding boundary point BP and the fitting curve FC. Then, the use determiner 33 performs one of the following first to third determination approaches:

The first determination approach is to determine whether the number of boundary points BP whose fitting errors FE are each larger than a predetermined reference value is larger than a predetermined first threshold value.

The second determination approach is to determine whether the average of the fitting errors FE is larger than a predetermined second threshold value.

The third determination approach is to determine whether the sum of the fitting errors FE is larger than a predetermined third threshold value.

Each of the first to third determination approaches enables the degree of the fitting errors FE between the fitting curve FE and the boundary points BP to be comprehensively determined.

In response to determination that the number of boundary points BP whose fitting errors FE are each larger than the predetermined reference value is larger than the first threshold value, the use determiner 31 determines that the road parameter estimator 35 should not use the recognition result obtained by the learning recognizer 31. Otherwise, in response to determination that the number of boundary points BP whose fitting errors FE are each larger than the predetermined reference value is smaller than or equal to the first threshold value, the use determiner 31 determines that the road parameter estimator 35 should use the recognition result obtained by the learning recognizer 31.

Similarly, in response to determination that the average of the fitting errors FE is larger than the second threshold value or the sum of the fitting errors FE is larger than the third threshold value, the use determiner 31 determines that the road parameter estimator 35 should not use the recognition result obtained by the learning recognizer 31. Otherwise, in response to determination that the average of the fitting errors FE is smaller than or equal to the second threshold value or the sum of the fitting errors FE is smaller than or equal to the third threshold value, the use determiner 31 determines that the road parameter estimator 35 should use the recognition result obtained by the learning recognizer 31.

The Condition B

The Condition B Uses

1. The fitting curve FC for the boundary points BP located on, for example, the right learning-based demarcation line GKR obtained based on the recognition result of the learning recognizer 31 set forth above 2. The selected lane line for the right marker-based demarcation line (or the right marker-based demarcation line), which is obtained without using the recognition result by the learning recognizer 31

3. Positional gap information between the fitting curve FC and the selected lane line for the right marker-based demarcation line That is, the use determiner 33 is configured to calculate the positional gap information between the fitting curve FC and the selected lane line for the right marker-based demarcation line, and determine whether the road parameter estimator 35 should use the recognition result obtained by the learning recognizer 31 as a function of the positional gap information between the fitting curve FC and the selected lane line for the right marker-based demarcation line.

The following describes, in detail, how the use determiner 33 determines whether the road parameter estimator 35 should use the recognition result obtained by the learning recognizer 31 in accordance with the condition B.

Figure 9:
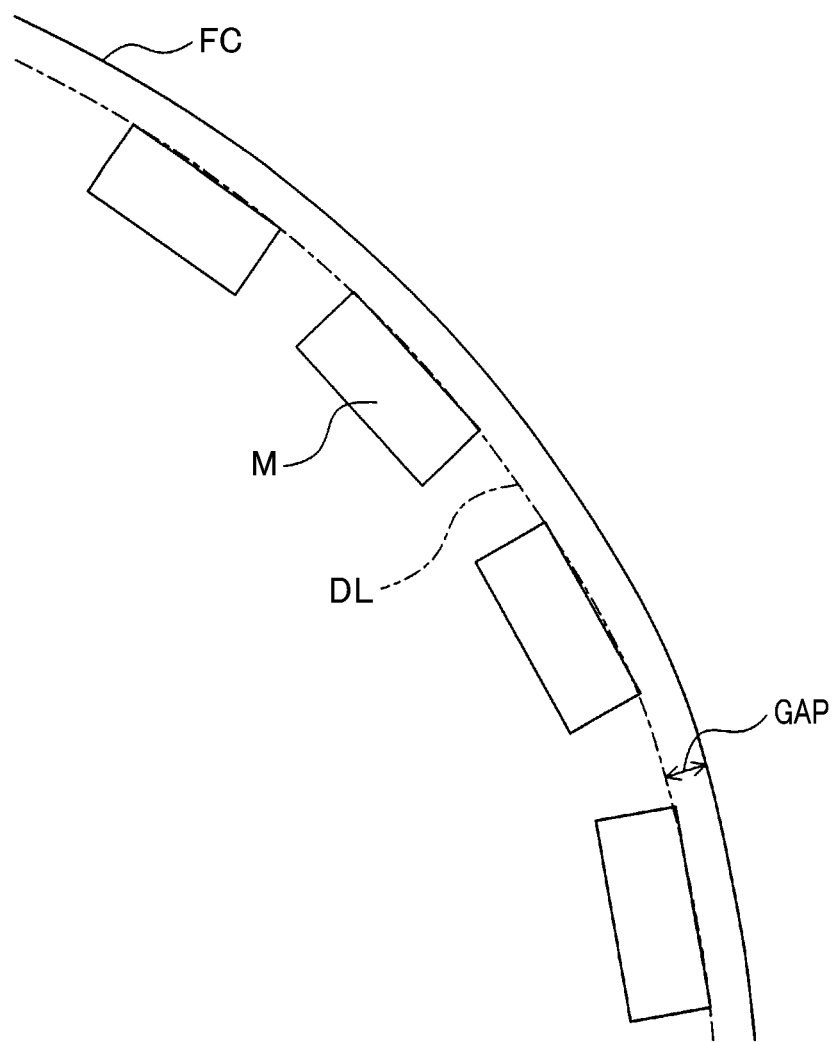
FIG. 9 is an enlarged view schematically illustrating a relationship between the fitting curve and a lane line obtained based on markers.

As illustrated FIG. 9, the use determiner 33 draws the fitting curve that approximately fits the arrangement of the boundary points on, for example, the learning-based right demarcation line GKR as described above.

In addition, as described above, the line candidate extractor 27 links the markers extracted by the marker extractor 23, which are close to the learning-based right demarcation line GKR, to thereby create, on the forward image, a virtual lane line serving as a marker-based right lane-line, i.e. a marker-based right demarcation line, DL. For example, the line candidate extractor 27 draws a line on the right-side edge of each extracted marker to thereby create the drawn line as the marker-based right lane-line DL (see a dashed-dotted line in FIG. 9).

Next, the use determiner 33 calculates a positional gap between the fitting curve FC and the marker-based right lane-line DL. For example, the use determiner 33 samples plural points on the fitting curve FE in the traveling direction of the own vehicle 1 corresponding to the vertical direction in FIG. 9, and calculates, as a gap, a minimum distance, i.e. a minimum interval, between each sampled point on the fitting curve FE and the marker-based right lane-line DL. The use determiner 33 can calculate the minimum distance between each sampled point on the fitting curve FE and the marker-based right lane-line DL using a normal line to the fitting curve FE or to the marker-based right lane-line, which passes through the corresponding sampled point.

Then, the use determiner 33 calculates the average or the sum of the calculated minimum distances between the respective sampled points on the fitting curve FE and the marker-based right lane-line DL. The calculated average or sum of the minimum distances between the respective sampled points on the fitting curve FE and the marker-based right lane-line DL represents a deviation between the fitting curve FE and the marker-based right lane-line DL.

The use determiner 33 therefore determines whether the average or the sum of the calculated minimum distances is larger than a corresponding threshold length.

In response to determination that the average or the sum of the calculated minimum distances is larger than the corresponding threshold length, the use determiner 31 determines that the road parameter estimator 35 should not use the recognition result obtained by the learning recognizer 31. Otherwise, in response to determination that the average or the sum of the calculated minimum distances is smaller than or equal to the corresponding threshold length, the use determiner 31 determines that the road parameter estimator 35 should use the recognition result obtained by the learning recognizer 31.

The Condition C

The condition C is that the use determiner 31 performs a scene recognition task based on the forward image captured by the vehicular camera 5 to thereby recognize that a forward scene recognized by the scene recognition task includes at least one of predetermined specific roads that are unsuitable for using the recognition result obtained by the learning recognizer 31.

The predetermined specific roads, which are unsuitable for using the recognition result obtained by the learning recognizer 31, may cause the recognition result of the profile of the current travel lane obtained based on the deep machine learning of the learning recognizer 31 to be likely to be incorrect.

That is, the use determiner 31 determines whether the forward scene recognized by the scene recognition task includes at least one of the predetermined specific road situations, and determines that the road parameter estimator 35 should not use the recognition result obtained by the learning recognizer 31 in response to determination that the forward scene recognized by the scene recognition task includes at least one of the predetermined specific road situations. Otherwise, in response to determination that the forward scene recognized by the scene recognition task does not include at least one of the predetermined specific road situations, the use determiner 31 determines that the road parameter estimator 35 should use the recognition result obtained by the learning recognizer 31.

The specific road situations, which are unsuitable for using the recognition result obtained by the learning recognizer 31, include 1. A first road situation that includes multiple marking lines located at one side of the road in its width direction
2. A second road situation that includes a temporary service road
3. A third road situation that includes a carpool lane
4. A fourth road situation that following the forward portion of the current travel road will result in the own vehicle 1 traveling over a lane marker The use determiner 33 can be configured to determine whether the forward scene recognized by the scene recognition task includes the first road situation using one of known technologies, an example of which is disclosed in Japanese Patent Publication NO. 4207935.

The use determiner 33 can be configured to determine whether the forward scene recognized by the scene recognition task includes the second road situation or the third road situation using one of known technologies, an example of which is disclosed in Japanese Patent Application Publication NO. 2014-164492.

The use determiner 33 can be configured to determine whether the forward scene recognized by the scene recognition task includes the fourth road situation using one of known technology, an example of which is disclosed in Japanese Patent Application Publication NO. 2015-174494.

The disclosure of each of these patent publications NO. 4207935, NO. 2014-164492, and NO. 2015-174494 is incorporated in its entirety herein by reference.

The Condition D

The condition D uses the fitting curve FC for the boundary points BP located on, for example, the right learning-based demarcation line GKR obtained based on the recognition result of the learning recognizer 31 set forth above.

Figure 10:
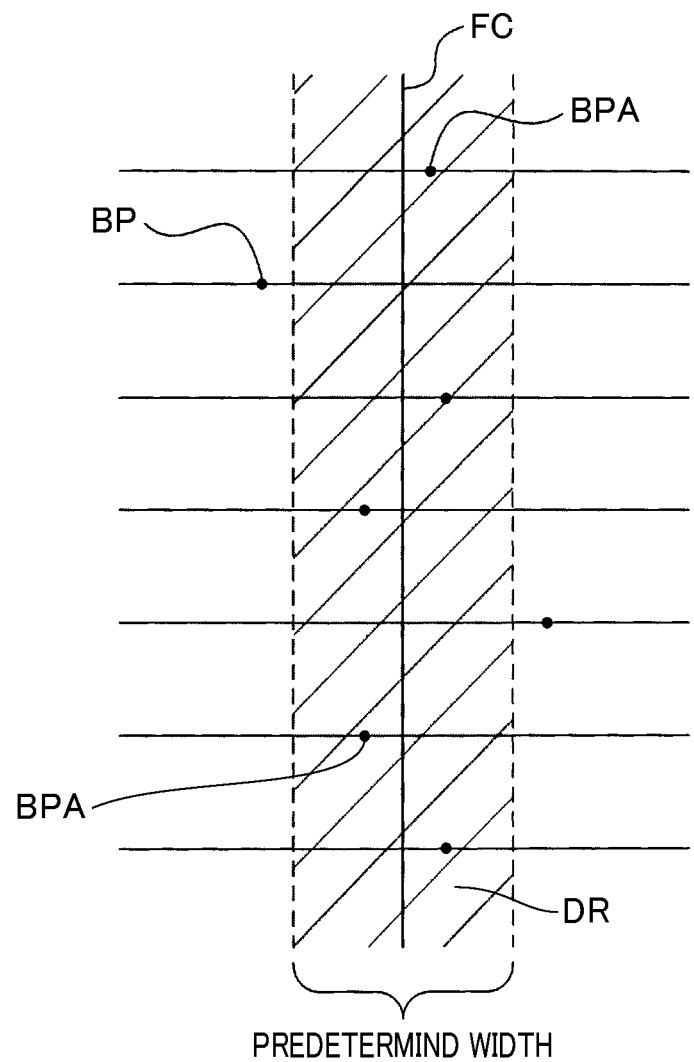
FIG. 10 is an enlarged view schematically illustrating a relationship between the fitting curve and closer boundary points.

The condition D also uses a selected one of (i) The number of closer boundary points BPA that are closer to the fitting curve FE within a predetermined determination region DR that encloses a part of the fitting curve FE and has a predetermined length in the traveling direction of the own vehicle 1, which corresponds to the vertical direction in FIG. 10, and a predetermined width across the fitting curve FE in its width direction perpendicular to the traveling direction (ii) The percentage of the number of closer boundary points BPA to the total number of boundary points BP That is, the use determiner 33 is configured to 1. Calculate the number of closer boundary points BPA that are closely approximated to the fitting curve FE within the predetermined region that encloses the fitting curve FE and has the predetermined width across the fitting curve FE 2. Determine whether the calculated number of closer boundary points BPA is larger than a predetermined threshold number 3. Determine that the road parameter estimator 35 should use the recognition result obtained by the learning recognizer 31 in response to determination that the calculated number of closer boundary points BPA is larger than the predetermined threshold number 4. Determine that the road parameter estimator 35 should not use the recognition result obtained by the learning recognizer 31 in response to determination that the calculated number of closer boundary points BPA is smaller than or equal to the predetermined threshold number Alternatively, the use determiner 33 may be configured to 1. Calculate the percentage of the number of closer boundary points BPA to the total number of boundary points BP 2. Determine whether the calculated percentage of the number of closer boundary points BPA to the total number of boundary points BP is larger than a predetermined threshold percentage 3. Determine that the road parameter estimator 35 should use the recognition result obtained by the learning recognizer 31 in response to determination that the calculated percentage of the number of closer boundary points BPA to the total number of boundary points BP is larger than the predetermined threshold percentage 4. Determine that the road parameter estimator 35 should not use the recognition result obtained by the learning recognizer 31 in response to determination that the calculated percentage of the number of closer boundary points BPA to the total number of boundary points BP is smaller than or equal to the predetermined threshold percentage For example, as illustrated in FIG. 10, the larger the number of closer boundary points BPA within the determination region DR, the higher the fitting accuracy of the fitting curve FC to the arrangement of the boundary points BP. Similarly, as illustrated in FIG. 10, the larger the percentage of the number of closer boundary points BPA to the total number of boundary points BP, the higher the fitting accuracy of the fitting curve FC to the arrangement of the boundary points BP.

The use determiner 33 therefore determines whether the road parameter estimator 35 should use the recognition result obtained by the learning recognizer 31 in accordance with a result of comparison either between the number of closer boundary points BPA within the determination region DR and the threshold number or between the percentage of the number of closer boundary points BPA to the total number of boundary points BP and the threshold percentage.

That is, the use determiner 33 is capable of determining that the road parameter estimator 35 should use the recognition result obtained by the learning recognizer 31 in response to determination that either the number of closer boundary points BPA within the determination region DR is larger than the threshold number or the percentage of the number of closer boundary points BPA to the total number of boundary points BP is larger than the threshold percentage.

Otherwise, the use determiner 33 is capable of determining that the road parameter estimator 35 should not use the recognition result obtained by the learning recognizer 31 in response to determination that either the number of closer boundary points BPA within the determination region DR is smaller than or equal to the threshold number or the percentage of the number of closer boundary points BPA to the total number of boundary points BP is smaller than or equal to the threshold percentage.

The Condition E

The condition E uses the fitting curve FC for the boundary points BP located on, for example, the right learning-based demarcation line GKR obtained based on the recognition result of the learning recognizer 31 set forth above.

The Condition E Also Uses

1. A third recognition distance of the current travel road obtained based on the fitting curve FC 2. A fourth recognition distance of the current travel road obtained based on the lane lines from the forward image without usage of the recognition result obtained by the learning recognizer 31

The third recognition distance is defined as a minimum distance of the farthest point on the current travel road obtained based on the fitting curve FC. The fourth recognition distance is defined as a minimum distance of the farthest point on the current travel road obtained based on the lane lines without usage of the recognition result obtained by the learning recognizer 31.

That is, the use determiner 33 is configured to

1. Calculate the third recognition distance of the current travel road and the fourth recognition distance 2. Compare the third recognition distance with the fourth recognition distance to thereby determine whether the third recognition distance is longer than the fourth recognition distance 3. Determine that the road parameter estimator 35 should use the recognition result obtained by the learning recognizer 31 in response to determination that the third recognition distance is longer than the fourth recognition distance 4. Otherwise, the road parameter estimator 35 should not use the recognition result obtained by the learning recognizer 31 in response to determination that the third recognition distance is smaller than or equal to the fourth recognition distance 1-4. Road Profile Estimation Routine Next, the following describes a road profile estimation routine carried out by the road parameter estimation apparatus 9 with reference to FIG. 11. Specifically, the processor 9a of the road parameter estimation apparatus 9 is programmed to run instructions of a road profile estimation program stored in the storage unit 9b every predetermined interval to thereby perform the road profile estimation routine. One road profile estimation routine periodically performed by the processor 9a will also be referred to as a cycle.

When starting the road profile estimation program, the processor 9a of the estimation apparatus 9 serves as, for example, the image obtainer 15 to obtain a forward image currently captured by and sent from the vehicular camera 5 as, for example, a target forward image in step S100.

Next, the processor 9a of the estimation apparatus 9 serves as, for example, the edge extractor 21 and marker extractor 23 of the estimator 17 to extract markers from the target forward image without usage of deep machine learning in step S110 set forth above. Note that how the processor 9a extracts the markers from the target forward image is also disclosed in Japanese Patent Application Publication NO. 2018-181093. This patent publication is incorporated in its entirety herein by reference.

In parallel or sequential to the operation in step S110, the processor 9a of the estimation apparatus 9 serves as, for example, the learning recognizer 31 to use the at least one recognition model RM, which has been deeply trained in the deep learning mode based on the many test forward images, to generate, as the recognition result, the learning-based image in which the own-lane region (see R1 in FIG. 6) and the other regions (see R2 to R4 in FIG. 6) are partitioned in step S120. The processor 9a can perform the operation in step S120 first, and thereafter perform the operation in step S110.

After the operations in steps S110 and S120, the road profile estimation routine proceeds to step S130.

In step S130, the processor 9a of the estimation apparatus 9 serves as, for example, the use determiner 33 to determine whether the road parameter estimator 35 should use the recognition result obtained by the learning recognizer 31 for estimating the profile of the forward portion of the current travel lane of the own vehicle 1 in accordance with a selected one of the conditions A to E set forth above. That is, the processor 9a of the estimation apparatus 9 determines whether to use the deeply trained at least one recognition model RM for estimating the profile of the forward portion of the current travel lane of the own vehicle 1 in accordance with a selected one of the conditions A to E set forth above in step S130.

In response to determination that the road parameter estimator 35 should not use the recognition result obtained by the learning recognizer 31 for estimating the profile of the forward portion of the current travel lane of the own vehicle 1 (NO in step S130), the road profile estimation routine proceeds to step S140.

Otherwise, in response to determination that the road parameter estimator 35 should use the recognition result obtained by the learning recognizer 31 for estimating the profile of the forward portion of the current travel lane of the own vehicle 1 (YES in step S130), the road profile estimation routine proceeds to each of steps S150 and S160.

In step S140, the processor 9a of the estimation apparatus 9 serves as, for example, the non-learning obtainer 43, which includes the line candidate extractor 27, the demarcation line selector 29, and the non-learning estimator 45, to perform the first estimation task that estimates the profile of the forward portion of the current travel road, i.e. the various road parameters of the forward portion of the current travel road, without usage of the recognition result obtained by the learning recognizer 31, and thereafter terminates the road profile estimation routine.

Specifically, as described above, the processor 9a serves as, for example, the line candidate extractor 27 to select, in all the markers extracted in step S110, plural groups of markers such that the markers of each group are aligned in the traveling direction of the own vehicle 1. Then, the processor 9a serves as, for example, the line candidate extractor 27 to link the selected markers of each group to thereby create, on the target forward image, a virtual lane line for the corresponding group in step S110.

In particular, the processor 9a serves as, for example, the line candidate extractor 27 to select, in all the markers extracted in step S110, plural groups of markers such that the markers of each group satisfy a predetermined link condition that, for example, the positions of the respective markers are regarded as a linear or curved alignment in the traveling direction of the own vehicle 1.

The operation in step S140 implemented by, for example, the non-learning obtainer 43, which includes the line candidate extractor 27, the demarcation line selector 29, and the non-learning estimator 45, serve as, for example, both a marker-based estimator and a lane information obtainer.

Next, the processor 9a of the estimation apparatus 9 serves as, for example, the demarcation line selector 29 to select, from the lane lines extracted by the line candidate extractor 27, at least one pair of lane lines suitable for at least one pair of left and right marker-based demarcation lines that define the left boundary and the right boundary of the current travel lane. Then, the processor 9a serves as, for example, the demarcation line selector 29 to set the selected at least one pair of lane lines as the left and right marker-based demarcation lines for the current travel lane.

Thereafter, the processor 9a of the estimation apparatus 9 serves as, for example, the non-learning estimator 45 to perform the first estimation task of estimating, based on the pair of the left and right marker-based demarcation lines currently selected by the demarcation line selector 29, the profile of the forward portion of the current travel road, which includes the forward portion of the current travel lane, of the own vehicle 1.

On the other hand, in step S150, the processor 9a of the estimation apparatus 9 serves as, for example, the marker determiner 25, line candidate extractor 27, demarcation line selector 29, and partial learning estimator 37 to perform the first estimation task while referring to the recognition result of the learning recognizer 31.

Specifically, the processor 9a of the estimation apparatus 9 serves as, for example, the marker determiner 25 to determine whether each of the markers extracted in step S110 is located along one of the learning-based demarcation lines GKL and GKR in step S150.

Figure 12:
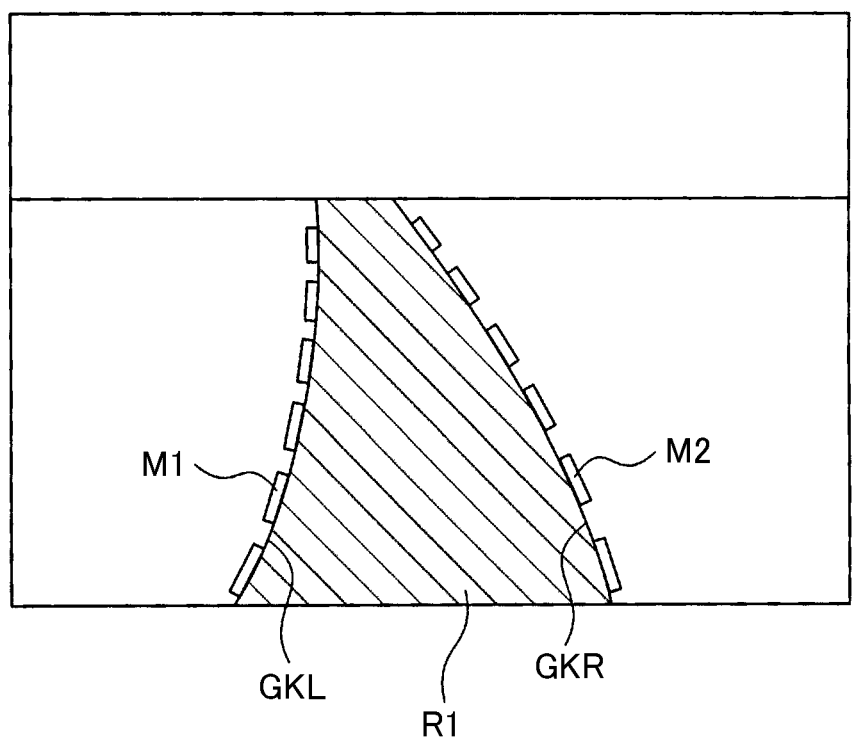
FIG. 12 is a view schematically illustrating a relationship between a learning-based demarcation line and markers on the learning-based image.

In response to determination that plural markers are each located along the left learning-based demarcation line GKL, the processor 9a serves as, for example, the line candidate extractor 27 to link each pair of adjacent markers (see markers M1 in FIG. 12) of the plural markers in the traveling direction of the own vehicle 1 with one another to thereby extract, based on the linked markers of one of the groups, a left lane line from the forward image in step S150.

Similarly, in response to determination that plural markers are each located along the right learning-based demarcation line GKR, the processor 9a serves as, for example, the line candidate extractor 27 to link each pair of adjacent markers (see markers M2 in FIG. 12) of the plural markers in the traveling direction of the own vehicle 1 with one another to thereby extract, based on the linked markers, a right lane line from the forward image in step S150.

For example, the processor 9a of the estimation apparatus 9 serves as, for example, the marker determiner 25 to determine whether each of the markers extracted in step S110 is located along one of the learning-based demarcation lines GKL and GKR in accordance with a minimum distance between each of the markers and one of the learning-based demarcation lines GKL and GKR in, for example, the width direction, i.e. the horizontal direction, of the own vehicle 1.

Figure 13:
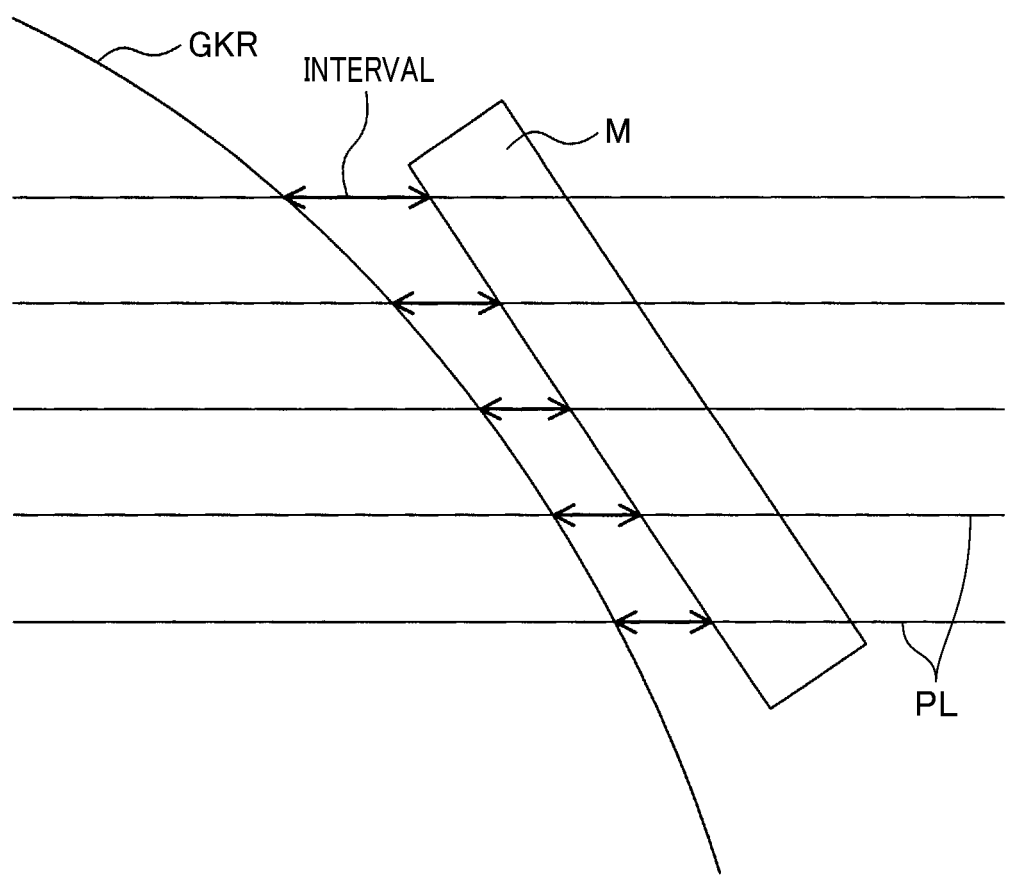
FIG. 13 is an enlarged view schematically illustrating a relationship between a learning-based demarcation line and markers.

Specifically, as illustrated in FIG. 13, the marker determiner 25 draws, on the learning-based image, plural parallel lines PL that pass through a selected marker (see reference M in FIG. 13) in the width direction of the own vehicle 1 at regular intervals in the longitudinal direction of the own vehicle 1, which corresponds to the vertical direction in FIG. 13.

Thereafter, the marker determiner 25 obtains the distance of an interval between the selected marker and one of the learning-based demarcation lines GKL and GKR and each marker along each of the drawn lines.

Then, the marker determiner 25 calculates the average of the obtained distances along the respective drawn lines, and determines whether the calculated average is smaller than or equal to a predetermined threshold value. In response to determination that the calculated average is smaller than or equal to the predetermined threshold value, the marker determiner 25 determines that the selected marker is located along one of the learning-based demarcation lines GKL and GKR. Otherwise, in response to determination that the calculated average is larger than the predetermined threshold value, the marker determiner 25 determines that the selected marker is not located along one of the learning-based demarcation lines GKL and GKR.

Figure 14:
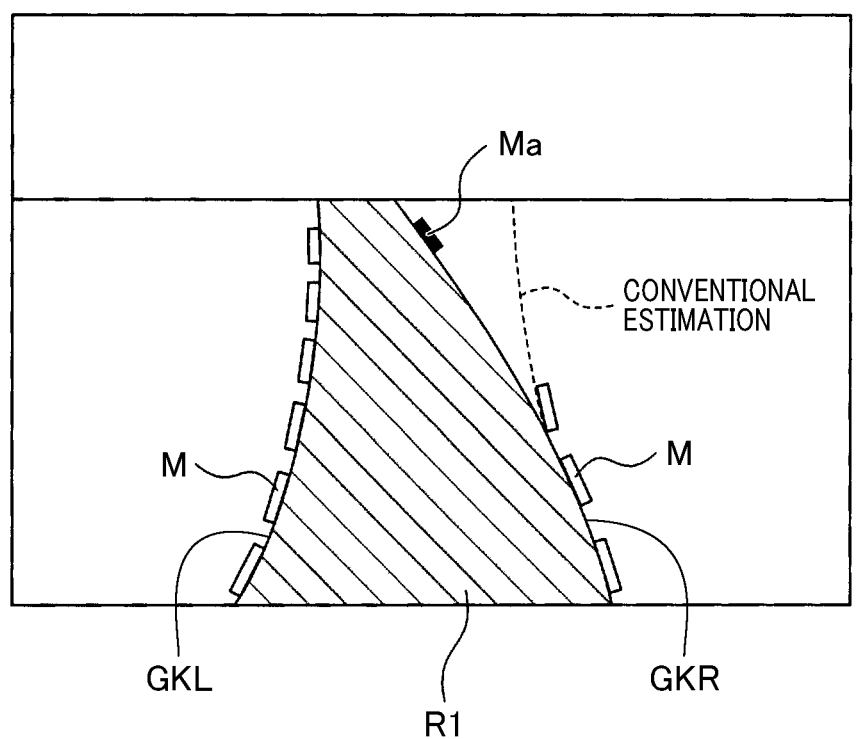
FIG. 14 is a view schematically illustrating how to link markers to generate a lane line using a learning-based demarcation line.

Note that, as illustrated in FIG. 14, if a black colored marker Ma, which is located along the right learning-based demarcation line GKR, is not extracted by the marker extractor 23 as a marker to be linked to adjacent markers, the marker determiner 25 is capable of extracting the black colored marker as a component of the right marker-based demarcation line, and linking the black colored marker Ma to the adjacent markers.

In step S150, the processor 9*a* of the estimation apparatus 9 serves as, for example, the demarcation line selector 29 select, from the lane lines extracted by the line candidate extractor 27, a pair of lane lines suitable for a pair of left and right marker-based demarcation lines that define the left boundary and the right boundary of the current travel lane.

In step S150, the processor 9*a* of the estimation apparatus 9 serves as, for example, the partial learning estimator 37 to estimate, as the first estimation result, the profile of the current travel road of the own vehicle 1 based on the pair of the left and right demarcation lines.

In step S150, the processor 9*a* of the estimation apparatus 9 serves as, for example, the estimation result selector 41 to calculate the first recognition distance for the left and right marker-based demarcation lines of the current travel lane; the first recognition distance is defined as the minimum distance of the farthest point on one of the left and right marker-based demarcation lines.

The operation in step S150 implemented by, for example, the line candidate extractor 27, the demarcation line selector 29, and the partial learning estimator 37 serve as, for example, the marker-based estimator.

In parallel to the operation in step S150, the processor 9*a* of the estimation apparatus 9 serves as, for example, the full learning estimator 39 to estimate, based on the learning-based demarcation lines GKL and GKR indicative of the boundaries of the current travel lane obtained by the learning recognizer 31, the profile of the current travel road as the second estimation result in step S160.

In step S160, the processor 9*a* of the estimation apparatus 9 serves as, for example, the full learning estimator 39 to calculate the second recognition distance for the left and right image-based demarcation lines GKL and GKR obtained by the full learning estimator 39; the second recognition distance is defined as the minimum distance of the farthest point on one of the learning-based demarcation lines GKL and GKR. The full learning estimator 39 serves as, for example, a model-based estimator.

After the parallel operations in steps S150 and S160, the processor 9*a* of the estimation apparatus 9 serves as, for example, the estimation result selector 41 to (1) Perform a comparison between the first recognition distance and the second recognition distance (2) Analyze information about the comparison to thereby select one of the first estimation result obtained in step S150 and the second estimation result obtained in step S160; the selected one of the first estimation result and the second estimation result matches a longer one of the first recognition distance and the second recognition distance in step S170.

After the operation in step S170, the processor 9*a* of the estimation apparatus 9 terminates the road profile estimation routine.

1-5. Technical Benefits

The road parameter estimation apparatus 9 configured set forth above makes it possible to achieve the following technical benefits.

Specifically, the road parameter estimation apparatus 9 is configured to

1. Perform a comparison between the first recognition distance for the left and right marker-based demarcation lines of the current travel lane estimated by the partial learning estimator 37 and the second recognition distance for the left and right image-based demarcation lines GKL and GKR obtained by the full learning estimator 39

2. Analyze information about the comparison to thereby determine whether to use the first estimation result of the current travel road obtained by the partial learning estimator 37 and the second estimation result of the current travel road obtained by the full learning estimator 39

This configuration therefore makes it possible to select one of the first estimation result of the current travel road and the second estimation result of the current travel road, which is suitable for estimation of the profile of the current travel road. This therefore enables the profile of the current travel road to be estimated with higher accuracy.

For example, the road parameter estimation apparatus 9 is configured to select one of the first estimation result of the current travel road and the second estimation result of the current travel road; the selected one of the first estimation result and the second estimation result matches a longer one of the first recognition distance and the second recognition distance. This enables the profile of the farther portion of the current travel road to be reliably estimated.

That is, the road parameter estimation apparatus 9 is capable of selecting one of the first estimation result without usage of deep machine learning, and the second estimation result based on deep machine learning, which is suitable for various road conditions and/or traffic environments around the own vehicle 1, one of which is a bad road condition that makes it difficult to recognize lane markers on the forward portion of the current travel lane.

The road parameter estimation apparatus 9 is also configured to determine whether to use the recognition result obtained by the learning recognizer 31 for estimating the profile of the forward portion of the current travel road.

This configuration enables the road parameter estimation apparatus 9 to use the recognition result obtained by the learning recognizer 31 for estimating the profile of the forward portion of the current travel road upon determination that it is preferable to use the recognition result obtained by the learning recognizer 31 in accordance with the road conditions and/or traffic environments around the own vehicle 1, and to estimate the profile of the forward portion of the current travel road without using the recognition result obtained by the learning recognizer 31 upon determination that it is preferable not to use the recognition result obtained by the learning recognizer 3 in accordance with the various road conditions and/or traffic environments around the own vehicle 1.

This therefore makes it possible to estimate the profile of the forward portion of the current travel road with higher accuracy in accordance with the various road conditions and/or traffic environments around the own vehicle 1.

The road parameter estimation apparatus 9 is further configured to determine whether to use the recognition result obtained by the learning recognizer 31 for estimating the profile of the forward portion of the current travel road of the own vehicle 1 in accordance with a selected one of the conditions A to E set forth above, making it possible to determine whether to use the recognition result obtained by the learning recognizer 31 with higher accuracy.

The road parameter estimation apparatus 9 is additionally configured to determine whether each of the markers extracted by the marker extractor 23 is located along one of the learning-based demarcation lines GKL and GKR obtained by the learning recognizer 31 in response to determination to use the recognition result obtained by the learning recognizer 31 for estimating the profile of the forward portion of the current travel road of the own vehicle 1.

This configuration therefore obtains, for example, a left lane line based on the markers determined to be located on the left learning-based demarcation line GKL, making it possible to obtain the left lane line with higher accuracy.

This configuration also makes it possible to use one or more markers, which are not extracted by the marker extractor 23, to obtain a lane line as long as the one or more markers are determined to be located on one of the learning-based demarcation lines GKL and GKR. This enables one or more lane lines to extend even further, thus increasing the first recognition distance based on the lane line. An increase in the first recognition distance based on the lane line enables estimation of the profile of a further forward portion of the current travel road, making it possible to control traveling of the own vehicle 1 more stably.

1-6. Example of Correspondence

Relationship Between Present Disclosure and First Embodiment

Next, the following describes a correspondence relationship between the present disclosure and the first embodiment.

The own vehicle 1 corresponds to, for example, a vehicle of the present disclosure, the vehicular camera 5 corresponds to, for example, a vehicular camera of the present disclosure, and the road parameter estimation apparatus 9 corresponds to, for example, a road parameter estimation apparatus of the present disclosure. The image obtainer 15 corresponds to, for example, an image obtainer of the present disclosure, the estimator 17 corresponds to, for example, an estimator of the present disclosure, and the marker extractor 23 corresponds to, for example, a marker extractor of the present disclosure.

The learning recognizer 31 corresponds to, for example, a recognizer of the present disclosure, and the use determiner 33 corresponds to, for example, a use determiner of the present disclosure.

The partial learning estimator 37 corresponds to, for example, a second estimator of the present disclosure, the full learning estimator 39 corresponds to, for example, a model-based estimator of the present disclosure, and the non-learning estimator 45 corresponds to, for example, a first estimator of the present disclosure. The marker extractor 23, the line candidate extractor 27, and demarcation line selector 29 serve as, for example, a lane information obtainer of the present disclosure.

1-7. First Modification

Next, the following describes a first modification of the first embodiment. Because the basic configuration of a road parameter estimation apparatus according to the first modification is substantially identical to the configuration of the road parameter estimation apparatus 9 according to the first embodiment except for the following different points. The following therefore mainly describes the different points.

Figure 11:
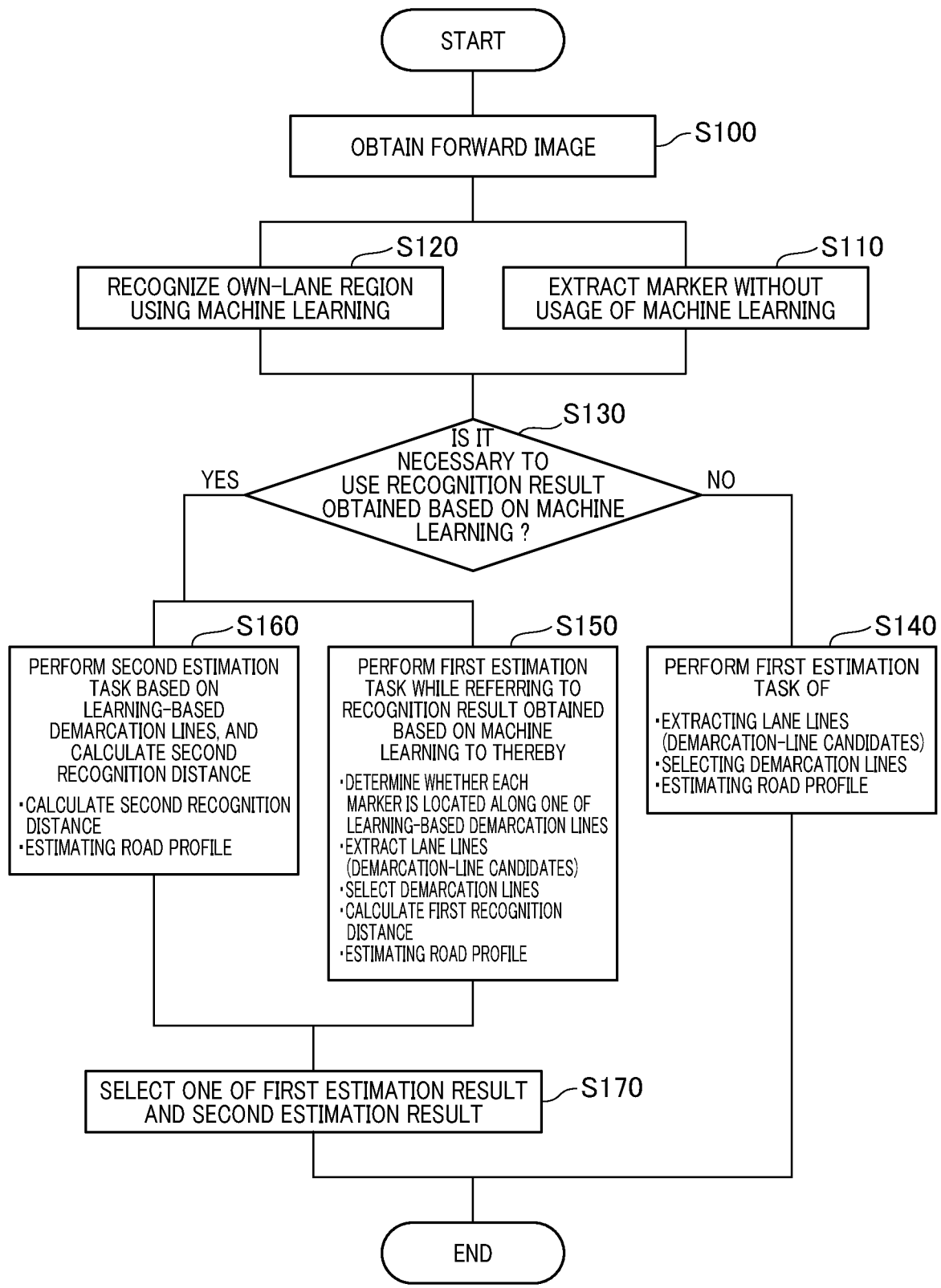
FIG. 11 is a flowchart schematically illustrating a road parameter estimation routine according to the first embodiment.

The road parameter estimation apparatus according to the first modification is programmed to perform a road profile estimation routine illustrated in FIG. 15, several operations of which are different from corresponding operations of the road profile estimation routine illustrated in FIG. 11. The following therefore describes the different steps. Like step numbers are assigned to the remaining operations in the road profile estimation routine illustrated in FIG. 11, and to the corresponding remaining operations in the road profile estimation routine illustrated in FIG. 15.

Because the operations in steps S100 to S130, S150, and S160 of the road profile estimation routine illustrated in FIG. 15 are substantially identical to those in the same steps S100 to S130, S150, and S160 of the road profile estimation routine illustrated in FIG. 11, descriptions of the operations in steps S100 to S130, S150, and S160 of the road profile estimation routine illustrated in FIG. 15 are omitted.

In step S140A, the processor 9a of the estimation apparatus 9 serves as, for example, the line candidate extractor 27, the demarcation line selector 29, and the non-learning estimator 45 to perform the first estimation task that estimates, as a non-learning estimation result, the profile of the forward portion of the current travel road without usage of the recognition result obtained by the learning recognizer 31 in response to the affirmative determination in step S130 (see YES in step S130).

In step S140A, the processor 9a of the estimation apparatus 9 serves as, for example, the non-learning estimator 45 to calculate the fourth recognition distance set forth above. That is, the fourth recognition distance is defined as the minimum distance of the farthest point on the current travel road obtained based on the lane lines without usage of the recognition result obtained by the learning recognizer 31.

Additionally, after the parallel operations in steps S140, S150, and S160, the processor 9a of the estimation apparatus 9 serves as, for example, the estimation result selector 41 to (1) Perform a comparison among the first recognition distance, the second recognition distance, and the fourth recognition distance (2) Analyze information about the comparison to thereby select one of the first estimation result obtained in step S150, the second estimation result obtained in step S160, and the non-learning estimation result obtained in step S140; the selected one of the first estimation result, the second estimation result, and the non-learning estimation result matches a longer one of the first recognition distance, the second recognition distance, and the fourth recognition distance in step S180.

After the operation in step S180, the processor 9a of the estimation apparatus 9 terminates the road profile estimation routine.

In step S180, the processor 9a of the estimation apparatus 9 can be modified to (1) Perform a comparison between the first recognition distance and the fourth recognition distance (2) Analyze information about the comparison to thereby select one of the first estimation result obtained in step S150 and the non-learning estimation result obtained in step S140; the selected one of the first estimation result and the non-learning estimation result matches a longer one of the first recognition distance and the fourth recognition distance In this modification, the processor 9a of the estimation apparatus 9 can be programmed not to perform the operation in step S160.

The road parameter estimation apparatus 9 according to the first modification achieves the same technical benefits as those achieved by the road parameter estimation apparatus 9 according to the first embodiment.

1-8. Second Modification

Next, the following describes a second modification of the first embodiment. Because the basic configuration of a road parameter estimation apparatus according to the second modification is substantially identical to the configuration of the road parameter estimation apparatus 9 according to the first embodiment except for the following different points. The following therefore mainly describes the different points.

In each of steps S170 and S180, the processor 9a of the estimation apparatus 9 according to the second modification determines whether the profile of the forward portion of the current travel road estimated in one of steps S140, S150, and S160 is appropriate in accordance with other information. Note that the profile of the forward portion of the current travel road estimated in one of steps S140, S150, and S160 will be referred to as a first profile of the forward portion of the current travel road.

For example, the processor 9a of the estimation apparatus 9 obtains, based on the forward image captured by the vehicular camera 5, a traveled route of a preceding vehicle that is traveling in front of the own vehicle 1, and estimates, based on the traveled route of the preceding vehicle, a second profile of the forward portion of the current travel road in step S170 or S180. Then, the processor 9a determines whether the first profile of the forward portion of the current travel road is appropriate in accordance with comparison between (i) the first profile of the forward portion of the current travel and (ii) the second profile of th forward portion of the current travel road.

For example, if the first profile of the forward portion of the current travel road has a curve extending in a predetermined first direction, and the second profile of the forward portion of the current travel road has a curve extending in a predetermined second direction opposite to the first direction, the processor 9a determines that there is a possibility that the profile of the forward portion of the current travel road estimated in one of steps S140, S150, and S160 is inappropriate. This enables the processor 9a not to use the profile of the forward portion of the current travel road estimated in one of steps S140, S150, and S160.

Additionally, in each of steps S170 and S180, the processor 9a of the estimation apparatus 9 according to the second modification can estimate a third profile of the forward portion of the current travel road using a known estimation method that generates a third profile of the profile of the forward portion of the current travel road as a function of the yaw rate of the own vehicle 1 measured by the yaw rate sensor. Then, the processor 9a can determine whether the first profile of the forward portion of the current travel road is appropriate in accordance with comparison between (i) the first profile of the forward portion of the current travel and (ii) the third profile of th forward portion of the current travel road.

In each of steps S170 and S180, the processor 9a of the estimation apparatus 9 according to the second modification can determine whether the first profile of the forward portion of the current travel road is appropriate in accordance with the map information about the forward portion of the current travel road measured by the navigation system.

Like step S170, in step S180, the processor 9a of the estimation apparatus 9 according to the first modification is configured to perform a comparison among the first recognition distance, the second recognition distance, and the fourth recognition distance for selecting one of the first estimation result, the second estimation result, and the fourth estimation result. The present disclosure is however not limited to this configuration.

Specifically, in step S180, the processor 9a of the estimation apparatus 9 according to the second modification can be configured to perform a comparison among 1. The profile of the forward portion of the current travel road as the first estimation result obtained by the partial learning estimator 37

2. The profile of the forward portion of the current travel road as the second estimation result obtained by the full learning estimator 39

3. The profile of the forward portion of the current travel road as the non-learning recognition result obtained by the non-learning estimator 45

Then, the processor 9a of the estimation apparatus 9 according to the second modification can be configured to select, based on a result of the comparison, one of (i) the profile of the forward portion of the current travel road obtained by the partial learning estimator 37, (ii) the profile of the forward portion of the current travel road obtained by the full learning estimator 39, and (iii) the profile of the forward portion of the current travel road obtained by the non-learning estimator 45 in step S180.

For example, let us describe an example where the processor 9a of the estimation apparatus 9 performs a comparison between (i) the profile of the forward portion of the current travel road estimated by the full learning estimator 39 and (ii) the profile of the forward portion of the current travel road estimated by the partial learning estimator 37.

In this example, if the processor 9a can obtain map information about how the forward portion of the current travel road is curved from the navigation system, the processor 9a can obtain the information from the navigation system.

Then, the processor 9a refers to the obtained map information to accordingly perform a comparison between (i) the profile of the forward portion of the current travel road estimated by the full learning estimator 39 and (ii) the profile of the forward portion of the current travel road estimated by the partial learning estimator 37.

That is, let us assume that

1. The profile of the forward portion of the current travel road estimated by the full learning estimator 39 represents that the forward portion of the current travel road has a linear shape 2. The profile of the forward portion of the current travel road estimated by the partial learning estimator 37 represents that the forward portion of the current travel road has a curved shape At that time, if the map information obtained from the navigation system represents that the forward portion of the current travel road has a linear shape, the processor 9*a* can determine that the profile of the forward portion of the current travel road estimated by the full learning estimator 39 is appropriate, and select the profile of the forward portion of the current travel road estimated by the full learning estimator 39 in step S170 or S180.

The road parameter estimation apparatus 9 according to the second modification achieves the same technical benefits as those achieved y the road parameter estimation apparatus 9 according to the first embodiment.

2. Second Embodiment

Next, the following describes the second embodiment of the present disclosure. Because the basic configuration of a road parameter estimation apparatus 9 according to the second embodiment is substantially identical to the configuration of the road parameter estimation apparatus 9 according to the first embodiment except for the following different points. The following therefore mainly describes the different points.

The road parameter estimation apparatus 9 according to the second embodiment for example functionally includes a branch deter miner 51 installed in the demarcation line selector 29; the branch determiner 51 is configured to determine whether the forward portion of the current travel lane of the own vehicle 1 branches therefrom toward another direction (see FIG. 4).

Figure 17:
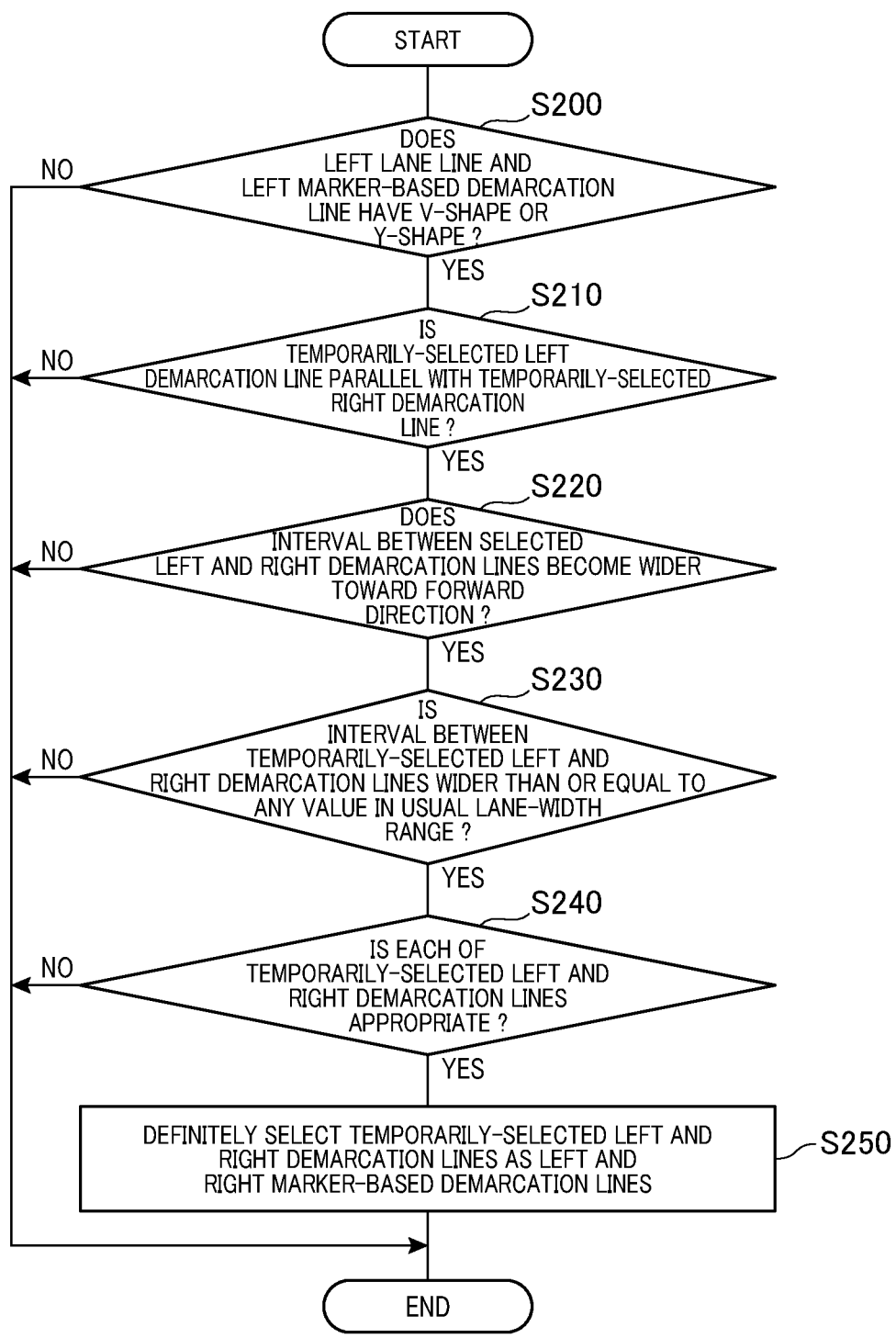
FIG. 17 is a flowchart schematically illustrating a branch determination subroutine included in step S140 of the road parameter estimation routine illustrated in FIG. 11.

The following describes how the demarcation line selector 29, i.e. the branch determiner 51, works with reference to FIGS. 16A, 16B, and 17.

As illustrated in FIGS. 16A and 16B, the forward portion (see P1 in FIG. 16A) of the current travel lane branches therefrom toward left as a curved left branch lane or a left branch road P2, so that 1. A linear marker M10, which represents the left boundary of the left branch lane P2, extends along the left branch lane P2

2. Markers M11, which represents the right boundary of the forward portion P1 of the current travel lane, are maintained on the current travel road 3. New markers, which represent the left boundary of the forward portion P1 of the current travel lane, are provided on the current travel road That is, when, for example, the head of the own vehicle 1 is located at a current place illustrated in FIG. 16A, the demarcation line selector 29 has selected a marker-based left demarcation line KL1 based on the linear marker M10, and a marker-based right demarcation line KR1 based on the markers M11 (see steps S110 and S140).

When a new forward image (see FIG. 16A) is captured by the vehicular camera 5 to be inputted to the road parameter estimation apparatus 9, the marker extractor 23 extracts, from the new forward image, the new markers (see reference character M12 in FIG. 16A) aligned in the traveling direction of the own vehicle 1 (see step S110), so that the line candidate extractor 27 extracts, from the new forward image, a left lane line KL2 based on the extracted markers M12, and also extracts, from the new forward image, a right lane line KR2 (see step S140).

At that time, the processor 9*a* of the estimation apparatus 9 performs a branch determination subroutine included in step S140 of the main routine illustrated in FIG. 11 with reference to the flowchart of FIG. 17.

When starting the branch determination subroutine, the processor 9*a* serves as, for example, the branch determiner 51 to determine whether the lane line KL2 and the marker-based left demarcation line KL1 have a substantially V-shape or Y-shape in step S200.

In response to determination that the lane line KL2 and the marker-based left demarcation line KL1 do not have a substantially V-shape or Y-shape (NO in step S200), the processor 9*a* terminates the branch determination subroutine.

Otherwise, in response to determination that the lane line KL2 and the marker-based left demarcation line KL1 have a substantially V-shape or Y-shape (YES in step S200), the branch determination subroutine proceeds to step S210.

In step S210, the processor 9*a* serves as, for example, the branch determiner 51 to temporarily select the lane line KL2, which is located at the right side of the marker-based left demarcation line KL1 as a temporarily-selected left demarcation line, and also select the lane line KR2 as a temporarily-selected right demarcation line. Note that the temporarily-selected right demarcation line KR2 is the same as the right demarcation line KR1.

In step S210, the processor 9*a* serves as, for example, the branch determiner 51 to determine whether the temporarily-selected left demarcation line KL2 is substantially parallel to the temporarily-selected right demarcation line KR2.

In response to determination that the temporarily-selected left demarcation line KL2 is not substantially parallel to the temporarily-selected right demarcation line KR2 (NO in step S210), the processor 9*a* terminates the branch determination subroutine.

Otherwise, in response to determination that the temporarily-selected left demarcation line KL2 is substantially parallel to the temporarily-selected right demarcation line KR2 (YES in step S210), the branch determination subroutine proceeds to step S220.

In step S220, the processor 9*a* serves as, for example, the branch determiner 51 to determine whether an interval between the left demarcation line KL1 and the right demarcation line KR1 becomes wider toward the forward direction of the own vehicle 1, which corresponds to the upper direction in FIG. 16A.

For example, the branch determiner 51 determines whether an interval between a predetermined first point of the left demarcation line KL1 and a corresponding predetermined second point of the right demarcation line KR1 is larger than a predetermined threshold length; each of the first and second points is located by a predetermined length away from the own vehicle 1. In response to determination that the interval between the predetermined first point of the left demarcation line KL1 and the corresponding predetermined second point of the right demarcation line KR1 is larger than the predetermined threshold length, the branch determiner 51 determines that the interval between the left demarcation line KL1 and the right demarcation line KR1 becomes wider toward the forward direction of the own vehicle 1.

In response to determination that the interval between the left demarcation line KL1 and the right demarcation line KR1 does not become wider toward the forward direction of the own vehicle 1 (NO in step S220), the processor 9a terminates the branch determination subroutine.

Otherwise, in response to determination that the interval between the left demarcation line KL1 and the right demarcation line KR1 becomes wider toward the forward direction of the own vehicle 1 (YES in step S220), the branch determination subroutine proceeds to step S230.

In step S230, the processor 9a serves as, for example, the branch determiner 51 to determine whether an interval between the temporarily-selected left demarcation line KL2 and the temporarily-selected right demarcation line KM2 is wider than or equal to any value within a usual lane-width range defined by a traffic regulation.

In response to determination that the interval between the temporarily-selected left demarcation line KL2 and the temporarily-selected right demarcation line KM2 is narrower than any value within the usual lane-width range (NO in step S230), the processor 9a terminates the branch determination subroutine.

Otherwise, in response to determination that the interval between the temporarily-selected left demarcation line KL2 and the temporarily-selected right demarcation line KM2 is wider than or equal to any value within the usual lane-width range (YES in step S230), the branch determination subroutine proceeds to step S240.

In step S240, as illustrated in FIGS. 6 and 16B, the processor 9a serves as, for example, the branch determiner 51 to superimpose the left and right learning-based demarcation lines GKL and GKR, which respectively represents the left and right boundaries of the own-lane region R1, on the forward image, and calculate a left-side gap between the temporarily-selected left demarcation line KL2 and the left learning-based demarcation line GKL, and a right-side gap between the temporarily-selected right demarcation line KR2 and the right learning-based demarcation line GKR.

In step S240, the processor 9a also serves as, for example, the branch determiner 51 to determine whether each of the left-side gap and the right-side gap is smaller than or equal to a predetermined threshold value.

In response to determination that at least one of the left-side gap and the right-side gap is larger than the predetermined threshold value (NO in step S240), the processor 9a serves as, for example, the branch determiner 51 to determine that at least one of the temporarily-selected left and right demarcation lines KL2 and KM2 is inappropriate, terminating the branch determination subroutine.

Otherwise, in response to determination that at least one of the left-side gap and the right-side gap is smaller than or equal to the predetermined threshold value (YES in step S240), the processor 9a serves as, for example, the branch determiner 51 to determine that each of the temporarily-selected left and right demarcation lines KL2 and KM2 is appropriate. Then, the branch determination subroutine proceeds to step S250.

In step S250, the processor 9a serves as, for example, the branch determiner 51 to definitely select the temporarily-selected left and right demarcation lines KL2 and KM2 respectively as marker-based left and right demarcation lines of the current travel lane of the own vehicle 1.

That is, the branch determiner 51 is programmed to determine that the temporarily-selected left and right demarcation lines KL2 and KM2 are appropriate marker-based left and right demarcation lines of the current travel lane of the own vehicle 1 only in response to all of the deter urinations in steps S200 to S240 being affirmative. In contrast, the branch determiner 51 is programmed to determine that the temporarily-selected left and right demarcation lines KL2 and KM2 are inappropriate as the marker-based left and right demarcation lines of the current travel lane of the own vehicle 1 in response to at least one of the determinations in steps S200 to S240 being negative.

The processor 9a of the estimation apparatus 9 can serve as the branch determiner 51 to randomly perform the determinations in steps S200 to S240.

As described above, the estimation apparatus 9 according to the second embodiment is configured to determine whether the forward portion of the current travel lane of the own vehicle 1 becomes wider toward the traveling direction of the own vehicle 1, and reselect, in accordance with predetermined selection conditions (see steps S200 to S240), one of the lane lines to be suitable as the marker-based left or right demarcation line in response to determination that the forward portion of the current travel lane of the own vehicle 1 becomes wider toward the traveling direction of the own vehicle 1.

Then, the estimation apparatus 9 according to the second embodiment is configured to deter mine whether the reselected one of the lane lines is appropriate as the corresponding marker-based left or right demarcation line in accordance with the learning-based left or right demarcation line.

This configuration of the estimation apparatus 9 according to the second embodiment therefore achieves the same technical benefits as those achieved by the estimation apparatus 9 according to the first embodiment.

Additionally, the estimation apparatus 9 according to the second embodiment determines whether the forward portion of the current travel lane of the own vehicle 1 branches therefrom toward another direction with higher accuracy, and properly determines the demarcation lines of the current travel lane of the own vehicle 1 even if the forward portion of the current travel lane of the own vehicle 1 branches therefrom toward another direction.

The estimation apparatus 9 according to the second embodiment makes it possible to prevent erroneous determination that the forward portion of the current travel lane of the own vehicle 1 branches therefrom toward another direction due to (i) the existence of undeleted lane lines that are unselected as demarcation lines and/or (ii) unnecessary lines generated in the forward image due to electrical noise.

3. Third Embodiment

Next, the following describes the third embodiment of the present disclosure. Because the basic configuration of a road parameter estimation apparatus 9 according to the third embodiment is substantially identical to the configuration of the road parameter estimation apparatus 9 according to the first embodiment except for the following different points. The following therefore mainly describes the different points.

3-1. Overall Configuration

The road parameter estimation apparatus 9 according to the second embodiment for example functionally includes an estimator 17A.

Figure 18:
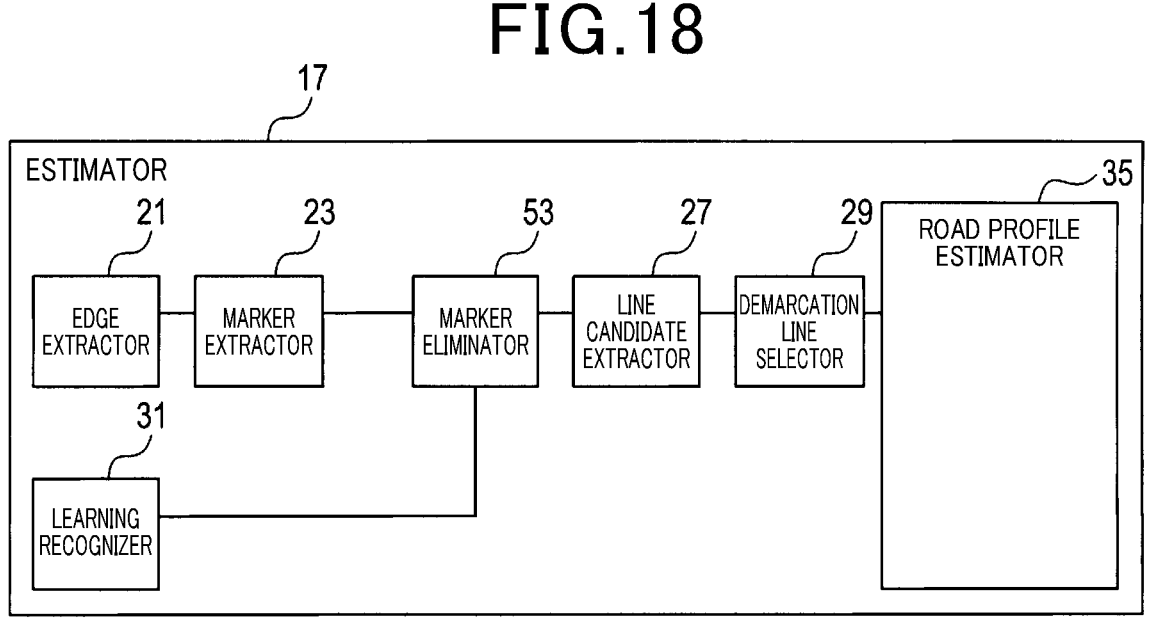
FIG. 18 is a block diagram schematically illustrating an example of the overall configuration of a vehicular system according to the third embodiment of the present disclosure.

As illustrated in FIG. 18, the estimator 17A functionally includes the edge extractor 21, the marker extractor 23, a marker eliminator 53, the line candidate extractor 27, the demarcation line selector 29, a learning recognizer 31A, and a road parameter estimator 35A.

Each of the edge extractor 21, the marker extractor 23, the line candidate extractor 27, and the demarcation line selector 29 has substantially the same functions as those of the corresponding one of the components described in the first embodiment.

The learning recognizer 31A includes the at least one prediction model PM, and has been provided with many test forward images as updatable datasets to be used to train the at least one prediction model, which are stored in, for example, the storage unit 9b.

The learning recognizer 31A is configured to use the at least one recognition model RM, which has been deeply trained in a deep learning mode based on the many test forward images, to recognize, upon a target forward image being inputted to the at least one recognition model RM, a first region, i.e. a first class, indicative of a forward region of the current travel road in the forward image, a second region, i.e. a second class, indicative of at least one other vehicle in the forward image, and a third region, i.e, a third class, except for the first and second regions.

The learning recognizer 31A can be configured to recognize one or more additional regions, i.e. classes, in a target forward image captured by the vehicular camera 5 in addition to the first to third regions; each of the additional regions represents a corresponding one of at least one traffic signal device, sky, at least one pavement, at least one guard rail, at least one pedestrian, and the own vehicle 1.

The marker eliminator 53 is configured to eliminate, from the target forward image, one or more markers extracted by the marker extractor 23; these markers are each unsuitable for constituting a corresponding lane line.

3-2. Summary of Subject Matter of Third Embodiment

Figure 19A:
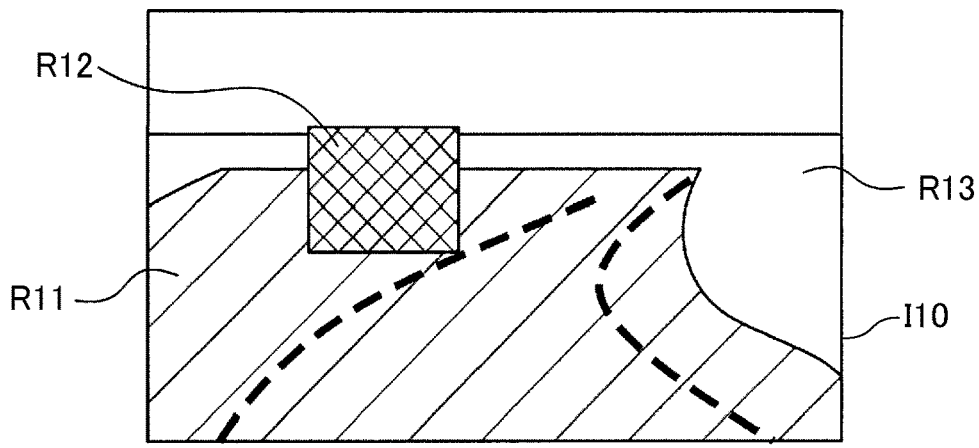
FIGS. 19A to 19C are a joint view schematically illustrating how to link markers to generate a lane line using a learning-based demarcation line according to the third embodiment.
Figure 19B:
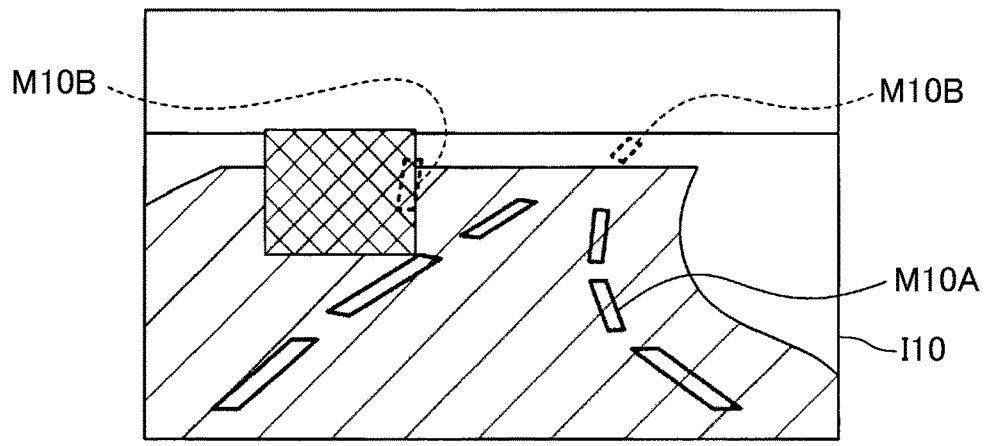
Figure 19C:
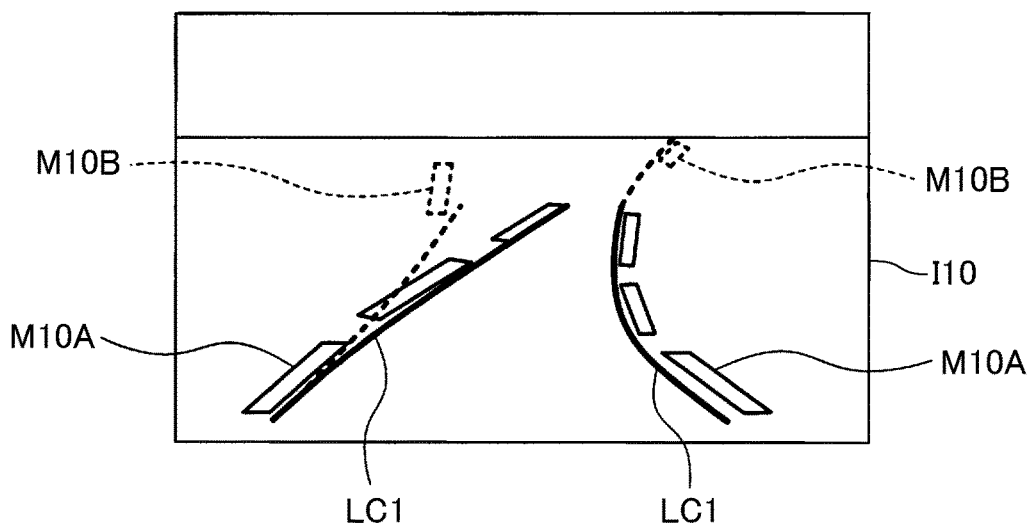

Next, the following describes the summary of the subject matter of the third embodiment with reference to FIGS. 19A to 19C.

As described in the first embodiment, the learning recognizer 31 is configured to use the trained convolution neural network as the at least one trained recognition model RM, to recognize features, upon a target forward image currently captured by the vehicular camera 5 being inputted to the trained convolution neural network, 1. A road region (see reference character R11 in FIG. 19A), which represents a region of the forward portion of the current travel road of the current travel road in the inputted target forward image 2. An other-vehicle region (see reference character R12 in FIG. 19A), which represents a region of at least one other vehicle in the inputted target forward image 3. A background region (see reference character R13 in FIG. 19A), which represents a region in the inputted target forward image except for the road region and other-vehicle region Thus, the learning recognizer 31A generates a learning-based image 110 in which the road region R11 is illustrated as a hatched region, the other-vehicle region R12 is illustrated as a crosshatched region, and the background region R13 is illustrated as a non-hatched white region (see FIG. 19A).

In FIG. 19A, for the sake of understanding of the subject matter of the third embodiment, left and right learning-based demarcation lines DL1 and DR1 are each illustrated using a thick dashed line, but these left and right learning-based demarcation lines DL1 and DR1 are actually not obtained and are for illustration purpose only.

In addition, as described above, the marker extractor 23 extracts, from the target forward image, markers, and superimposes the markers on the learning-based image 110 (see reference characters M10A and M10B in FIG. 19B).

Some of the markers are located on the road region R11 as on-road markers illustrated by solid lines, to each of which reference character M10A is assigned. The remaining markers are located at least partly outside the road region R11 as off-road markers illustrated dashed lines, to each of which reference character M10B is assigned. If a marker is located at least partly on the other-road region R12, the marker can be regarded as an off-road marker The marker eliminator 53 eliminates one or more off-road markers, i.e. unnecessary markers, from all the markers extracted by the marker extractor 23. Then, the line candidate extractor 27 selects, in all the remaining markers, plural groups of markers such that the markers of each group are aligned in the traveling direction of the own vehicle 1. Then, the line candidate extractor 27 links the selected markers of each group to thereby create, on the forward image, a virtual lane line, i.e. demarcation-line candidate, for the corresponding group as illustrated by dashed lines, to which reference character LC1 is assigned.

3-3. Road Profile Estimation Routine

Next, the following describes a road profile estimation routine carried out by the road parameter estimation apparatus 9 of the third embodiment with reference to FIG. 20. Specifically, the processor 9a of the road parameter estimation apparatus 9 is programmed to run instructions of a road profile estimation program stored in the storage unit 9b every predetermined interval to thereby perform the road profile estimation routine.

When starting the road profile estimation program, the processor 9a of the estimation apparatus 9 serves as, for example, the image obtainer 15 to obtain, like the operation in step S100, a forward image currently captured by and sent from the vehicular camera 5 as, for example, a target forward image in step S300.

Next, like the operation in step S110, the processor 9a of the estimation apparatus 9 serves as, for example, the edge extractor 21 and marker extractor 23 of the estimator 17 to extract markers from the target forward image without usage of deep machine learning in step S310 set forth above.

In parallel or sequential to the operation in step S310, the processor 9a of the estimation apparatus 9 serves as, for example, the learning recognizer 31 to use the at least one recognition model RM, which has been deeply trained in the deep learning mode based on the many test forward images, to generate, as the recognition result, a learning-based image in which the road region (see R11 in FIG. 11A), the other-vehicle region (see R12 in FIG. 11A), and the background region (see R13 in FIG. 11A) are partitioned in step S320. The processor 9a can perform the operation in step S320 first, and thereafter perform the operation in step S310.

As described above, the processor 9a can use the at least one recognition model RM. The at least one recognition model RM has been deeply trained in the deep learning mode based on the many test forward images for recognition of traffic signal devices, sky, pavements, guard rails, pedestrians, and the own vehicle 1. That is, in step S230, the processor 9a can use the deeply trained at least one recognition model RM to partition the background region R13 into 1. At least one traffic-signal region in which at least one traffic-signal device is illustrated 2. At least one sky region in which sky is present 3. At least one pavement region in which at least one pavement is present 4. At least one guard rail region in which at least one guard rail is present 5. At least one pedestrian region in which at least one pedestrian is present After the operations in steps S310 and S320, the road profile estimation routine proceeds to step S330.

In step S330, the processor 9a of the estimation apparatus 9 serves as, for example, the marker eliminator 53 to eliminate, from the markers extracted by the marker extractor 23, at least one road-off marker.

Next, the processor 9a of the estimation apparatus 9 serves as, for example, the line candidate extractor 27 to select, in the markers extracted in step S310 from which at least one road-off marker has been eliminated, plural groups of markers such that the markers of each group are aligned in the traveling direction of the own vehicle 1. Then, the processor 9a serves as, for example, the line candidate extractor 27 to link the selected markers of each group to thereby create, on the target forward image, a virtual lane line for the corresponding group in step S340.

In particular, the processor 9a can serve as, for example, the marker determiner 25 to determine whether each of the markers extracted in step S310, from which at least one road-off marker has been eliminated, is located along one of the learning-based demarcation lines GKL and GKR in step S340.

In response to determination that plural markers are each located along the left learning-based demarcation line GKL, the processor 9a can serve as, for example, the line candidate extractor 27 to link, like the operation in step S150, each pair of adjacent markers of the plural markers in the traveling direction of the own vehicle 1 with one another to thereby extract, based on the linked markers of one of the groups, a left lane line from the forward image in step S340.

Similarly, in response to determination that plural markers are each located along the right learning-based demarcation line GKR, the processor 9a can serve as, for example, the line candidate extractor 27 to link, like the operation in step S150, each pair of adjacent markers of the plural markers in the traveling direction of the own vehicle 1 with one another to thereby extract, based on the linked markers, a right lane line from the forward image in step S340.

Next, the processor 9a of the estimation apparatus 9 serves as, for example, the demarcation line selector 29 to select, from the lane lines extracted by the line candidate extractor 27, at least one pair of lane lines suitable for at least one pair of left and right marker-based demarcation lines that define the left boundary and the right boundary of the current travel lane in step S350, which is similar to the operation in step S140 or S150. Then, the processor 9a serves as, for example, the demarcation line selector 29 to set the selected at least one pair of lane lines as the left and right marker-based demarcation lines for the current travel lane in step S350, which is similar to the operation in step S140 or S150.

Following the operation in step S350, the processor 9a of the estimation apparatus 9 serves as, for example, the non-learning estimator 45 or the partial-learning estimator 39 of the road parameter estimator 35 to estimate, based on the pair of the left and right marker-based demarcation lines currently selected by the demarcation line selector 29, the profile of the forward portion of the current travel road, which includes the forward portion of the current travel lane, of the own vehicle 1 in step S360. After the operation in step S360, the processor 9a of the estimation apparatus 9 terminates the road profile estimation routine.

The estimation apparatus 9 according to the third embodiment as described above is configured to 1. Eliminate one or more off-road markers, i.e. unnecessary markers, from all the markers extracted by the marker extractor 23

2. Select, in all the remaining markers except for the one or more unnecessary markers, plural groups of markers such that the markers of each group are aligned in the traveling direction of the own vehicle 1

3. Link selected markers of each group to thereby create, on the forward image, a virtual lane line, i.e. demarcation-line candidate, for the corresponding group 4. Select, from the demarcation-line candidates, a pair of left and right maker-based demarcation lines of the current travel lane of the own vehicle 1

This configuration therefore achieves a technical benefit of estimating the left and right marker-based demarcation lines with higher accuracy. That is, this configuration of the estimation apparatus 9 prevents erroneous recognition of a side surface of at least one other vehicle as a marker, and also prevents elimination of a marker located in the road region, thus improving the accuracy of estimating the left and right marker-based demarcation lines.

4. Fourth Embodiment

Next, the following describes the fourth embodiment of the present disclosure. Because the basic configuration of a road parameter estimation apparatus 9 according to the fourth embodiment is substantially identical to the configuration of the road parameter estimation apparatus 9 according to the first embodiment except for the following different points. The following therefore mainly describes the different points.

4-1. Summary of Fourth embodiment

The road parameter estimation apparatus 9 of the fourth embodiment is configured to detect at least one temporary service section in the current travel road of the own vehicle 1 using the following traffic information items (a) to (c).

The information item (a) is that, in a temporary service section, such as a four-lane road with a temporary two-lane section that has one lane in each direction, a composite line member comprised of white and yellow lines is used as a center line of the temporary service section. This enables the estimation apparatus 9 to determine whether there is such a composite line member in a forward image captured by the vehicular camera 5, and to determine that a forward portion of the current travel road is likely to include a temporary service section in response to determination that there is such a composite line member in the forward image.

The following describes an example of such a temporary service section in a road.

In a usual two-lane road, there is a left demarcation line 61, which is a white line, located at the left side of a current travel lane, and a right demarcation line 63, which is a white line, located at the right side of the current travel lane. In particular, in a temporary service section of the two-lane road, there is a specifically configured center divider 65 between the current travel lane of the own vehicle and an oncoming lane.

The center divider 65 is comprised of a composite line member that includes (i) A first left center line 67 with a predetermined first color of, for example, yellow, located adjacent to the current travel lane (ii) A second left center line 69 with a predetermined second color of, for example, white, located adjacent to the first left center line 67

(iii) A first right center line 71 with the predetermined first color of yellow, located adjacent to the oncoming lane (iv) A second right center line 73 with the predetermined second color of white, located adjacent to the first right center line 71

The information item (b) is that a yellow line, i.e. a line with the predetermined first color, in a composite line member has a lower contrast with respect to the surface of the current travel road than a white line therein does. This may result in difficulty in extracting edges of a yellow line from an image of the current travel road. In addition, if a yellow line in a composite line member was thinner in parts or had a faint color, it would be difficult to identify whether a recognized line is a yellow line in accordance with RGB (Red, Green, Blue) luminance levels in the recognized line From this viewpoint, the estimation apparatus 9 of the fourth embodiment is configured to perform a color identification routine of identifying lines withe the predetermined first color, i.e. yellow lines, which is capable of reliably determining that a forward portion of the current travel road is likely to include a temporary service section therein, and facilitating identification of yellow lines.

Note that the vehicular camera 5 of the fourth embodiment is configured to capture color forward images, each of which is comprised of pixels; each pixel is comprised of a red luminance value, a green luminance value, and a blue luminance value.

Figure 21:
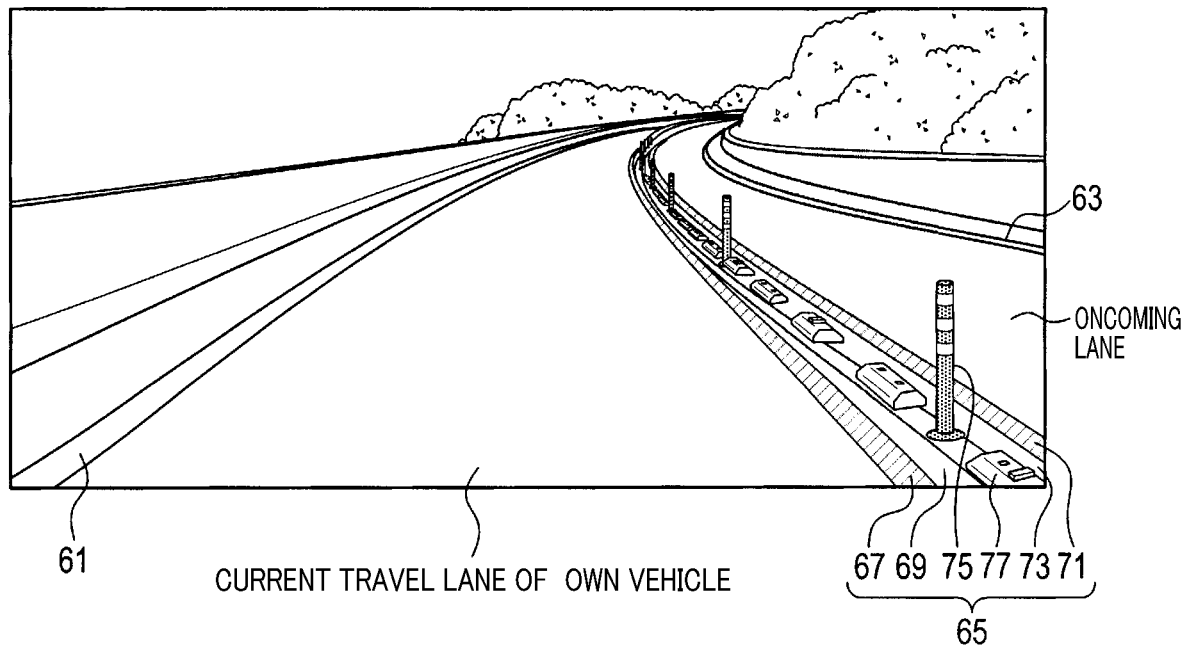
FIG. 21 is a perspective view schematically illustrating a temporary service section according to the fourth embodiment of the present disclosure.

The information item (c) is that, as illustrated in FIG. 21, in a temporary service section of the two-lane road, there may be poles 75 and/or edge stones 77 located along a composite line member comprised of plural lines 67, 69, 71, and 73. That is, there may be poles 75 and/or edge stones 77 mounted on the center divider 65 in the extending direction of the two-lane road.

From this viewpoint, the estimation apparatus 9 of the fourth embodiment is configured to deeply train the at least one recognition model RM in the deep learning mode based on the many test forward images for recognition of poles 75 and edge stones 77. Then, the estimation apparatus 9 of the fourth embodiment is configured to use the deeply trained at least one recognition model RM to thereby recognize, from the target color forward image, a region of at least one pole 75 and/or a region of each edge stone 77, thus detecting the at least one pole 75 and/or at least one edge stone 77.

That is, the estimation apparatus 9 of the fourth embodiment is configured to determine that a forward portion of the current travel road is likely to include a temporary service section therein in response to determination that there is at least one pole 75 and/or at least one edge stone 77 in the forward portion of the current travel road.

4-2. Principal of Color Identification Routine

The following describes the principal of the color identification routine associated with the information items (a) to (c). The condition adjustment routine is designed to adjust the extraction conditions required for extracting yellow lines in plural lines recognized in a forward image.

That is, the demarcation line selector 29 functionally includes a color identifier 55 and a determiner 57 installed therein (see FIG. 4).

As described above, in a temporary service section, a yellow left center line 67 and a white left center line 69 are juxtaposed along the extending direction of the temporary service section. Detection of the two center lines 67 and 69 enables a temporary service section to be determined.

For detecting both white and yellow center lines, RGB luminance threshold values are conventionally used for identifying the color of each center line. That is, if RGB luminance values of a line candidate detected in a road image satisfy respective conditions based on the RGB luminance threshold values for identifying the white color, the line candidate is identified as a while line.

In contrast, a usual yellow line in a road image has a sufficient R luminance value, but has a low G luminance value and a low B luminance value; the B luminance value is usually lower than a B luminance value of the road surface. Thus, fixed RGB luminance threshold values for identifying the yellow color are determined based on the above characteristics of such a usual yellow line, and if RGB luminance values of a line candidate detected in a road image satisfy respective conditions based on the fixed RGB luminance threshold values for identifying the yellow color, the line candidate is identified as a yellow line.

Unfortunately, as described above, a yellow line has a lower contrast with respect to the surface of the current travel road than a white line does. This may result in difficulty in extracting edges of a yellow line from an image of the current travel road in accordance with the fixed RGB luminance threshold values.

From this viewpoint, the estimation apparatus 9 of the fourth embodiment is configured to perform the color identification routine capable of adjusting the extraction conditions required for extracting yellow lines to thereby facilitate identification of yellow lines. This aims to detect a temporary service section in the forward portion of the current travel road with higher accuracy.

4-3. Color Identification Routine

Figure 22:
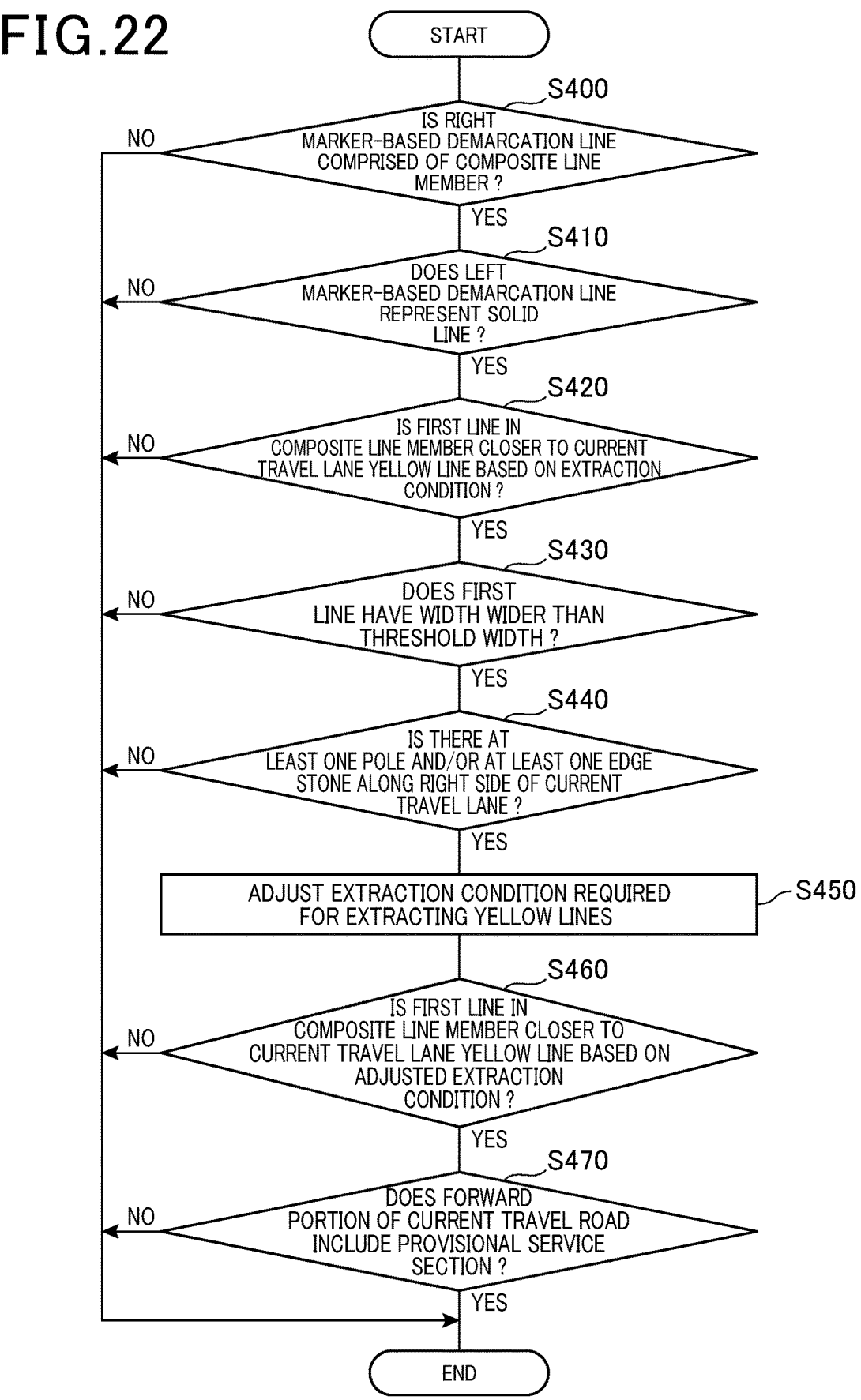
FIG. 22 is a flowchart schematically illustrating a color identification routine according to the fourth embodiment.

Next, the following describes the color identification routine carried out by the estimation apparatus 9 with reference to FIG. 22. Specifically, the processor 9a of the estimation apparatus 9 is programmed to run instructions of a color identification program stored in the storage unit 9b to thereby perform the condition adjust routine as a subroutine in the operation of each of steps S140 and S150 of the road profile estimation routine.

The color identification routine is configured to determine whether there is a temporary service section in a target forward image captured by the vehicular camera 5, and to adjust the conditions required for extracting, for example, the yellow center line 67 in response to determination that there is a temporary service section in the target forward image captured by the vehicular camera 5; adjustment of the conditions enables the yellow center line 67 to be more reliably identified.

The color identification routine is designed based on the precondition that vehicles travel on the left side of each road, which is a part of traffic regulations in various countries, such as Japan.

When starting the color identification routine, the processor 9a of the estimation apparatus 9 serves as, for example, the color identifier 55 to determine, based on the marker-based right demarcation line, whether the marker-based right demarcation line indicative of the right boundary of the current travel lane of the own vehicle 1 is comprised of a composite line member in the target forward image; the composite line member is comprised of adjacent plural lines and extends in the longitudinal direction of the current travel lane in step S400.

That is, as illustrated in FIG. 21, because four adjacent center lines 67, 69, 71, and 73 included in a center divider 65 are present in a temporary service section in a road, the processor 9a determines whether the marker-based right demarcation line indicative of the right boundary of the current travel lane of the own vehicle 1 is comprised of adjacent plural lines constituting a composite line member in the target forward image, thus determining whether the forward portion of the current travel road is likely to include a temporary service section in step S400.

For example, in response to determination that four adjacent center lines 67, 69, 71, and 73 are accurately recognized based on the marker-based right demarcation line, the processor 9a determines that the marker-based right demarcation line indicative of the right boundary of the current travel lane of the own vehicle 1 is comprised of a composite line member comprised of the four adjacent center lines 67, 69, 71, and 73 (YES in step S400).

At that time, as described above, there is a possibility that the yellow center line 67 and the adjacent white center line 69 are extracted as a single line from the target forward image. Similarly, there is a possibility that the yellow center line 71 and the adjacent white center line 73 are extracted as a single line from the target forward image.

Even if the yellow center line 67 and the adjacent white center line 69 are extracted as a single first center line (67, 69) from the target forward image, and the yellow center line 71 and the adjacent white center line 73 are extracted as a single second center line (71, 73) from the target forward image, the processor 9a can determine that the first center line (67, 69) and the second center line (71, 73) are recognized based on the marker-based right demarcation line, thus determining that the marker-based right demarcation line indicative of the right boundary of the current travel lane of the own vehicle 1 is comprised of a composite line member comprised of the first and second center lines (67, 69) and (71, 73) (YES in step S400).

In response to determination that the marker-based right demarcation line indicative of the right boundary of the current travel lane of the own vehicle 1 is comprised of a composite line member (YES in step S400), the color identification routine proceeds to step S410. Otherwise, in response to determination that the marker-based right demarcation line indicative of the right boundary of the current travel lane of the own vehicle 1 is not comprised of a composite line member (NO in step S400), the processor 9a terminates the color identification routine.

Next, the processor 9a serves as, for example, the color identifier 55 to determine, based on the marker-based left demarcation line, whether the marker-based left demarcation line indicative of the left boundary of the current travel lane of the own vehicle 1 represents a solid line in the target forward image; the solid line extends in the longitudinal direction of the current travel lane in step S410.

In response to determination that the marker-based left demarcation line indicative of the left boundary of the current travel lane of the own vehicle 1 represents a solid line in the target forward image (YES in step S410), the color identification routine proceeds to step S420. Otherwise, in response to determination that the marker-based left demarcation line indicative of the left boundary of the current travel lane of the own vehicle 1 does not represent a solid line in the target forward image (NO in step S410), the processor 9a terminates the color identification routine.

Next, in step S420, the processor 9a serves as, for example, the color identifier 55 to determine whether a first selected line in the composite line member, which is closer to the current travel lane of the own vehicle 1, is a yellow line based on (1) The RGB luminance values of the respective pixels corresponding to the first selected line (2) Red, green, and blue luminance-value conditions That is, the processor 9a serves as, for example, the color identifier 55 to determine whether each of the RGB luminance values of the first selected line satisfies a corresponding one of the red luminance-value condition for yellow lines, the green luminance-value condition for yellow lines, and the blue luminance-value condition for yellow lines in step S420. For example, the color identifier 55 determines whether each of the RGB luminance values of the first selected line is equal to or higher than a corresponding one of a red luminance-value threshold for yellow lines, a green luminance-value threshold for yellow lines, and a blue luminance-value threshold for yellow lines.

In response to determination that each of the RGB luminance values of the first selected line satisfies a corresponding one of the red luminance-value condition for yellow lines, the green luminance-value condition for yellow lines, and the blue luminance-value condition for yellow lines, the processor 9a determines that the first selected line in the composite line member, which is closer to the current travel lane of the own vehicle 1, is a yellow line (YES in step S420). Then, the processor 9a terminates the color identification routine.

Otherwise, in response to determination that at least one of the RGB luminance values of the first selected line does not satisfy a corresponding at least one of the red luminance-value condition for yellow lines, the green luminance-value condition for yellow lines, and the blue luminance-value condition for yellow lines, the processor 9a determines that the first selected line in the composite line member, which is closer to the current travel lane of the own vehicle 1, is not a yellow line (NO in step S420).

That is, the negative determination in step S420 represents a situation where the first selected line, which is closer to the current travel lane of the own vehicle 1 in the composite line member, is not identified as a yellow line. Then, the color identification routine proceeds to step S430.

In response to the negative determination in step S420, the processor 9a determines whether the first selected line has a width longer than a predetermined threshold width in step S430.

As described above, in a temporary service section, as illustrated in FIG. 21, the first left center line 67 with yellow color and the second left center line 69 with white color are adjacently located to each other. This may result in the first and second left center lines 67 and 69 being extracted as a single center line. If the first and second left center lines 67 and 69 are extracted as a single center line, the determination in step S430 is affirmative, so that the color identification routine proceeds to step S440. Otherwise, if the determination in step S430 is negative, the color identification routine is terminated.

That is, the affirmative determination in step S430 represents a situation where, because the first left center line 67 with yellow color and the second left center line 69 with white color are extracted as the first selected line, the first selected line, i.e. the first center line (67, 69) has a width longer than the predetermined threshold width (YES in step S430).

In step S440, the processor 9a serves as, for example, the color identifier 55 to determine whether there is a structural object comprised of at least one pole 75 and/or at least one edge stone 77, which represents the right boundary, along the right side of the current travel lane of the own vehicle 1 in accordance with the recognition result obtained by the learning recognizer 31 in step S440.

In response to determination that there is not a structural object comprised of at least one pole 75 and/or at least one edge stone 77, which represents the right boundary, along the right side of the current travel lane of the own vehicle 1 (NO in step S440), the color identification routine is terminated.

Otherwise, in response to determination that there is a structural object comprised of at least one pole 75 and/or at least one edge stone 77, which represents the right boundary, along the right side of the current travel lane of the own vehicle 1 (YES in step S440), the color identification routine proceeds to step S450.

In step S450, the processor 9a serves as, for example, the color identifier 55 to adjust at least one of the red, green, and blue luminance-value conditions for yellow lines to thereby facilitate identification of yellow lines. That is, the processor 9a serves as, for example, the color identifier 55 to adjust at least one of the red, green, and blue luminance-value conditions for yellow lines to be relaxed. For example, the color identifier 55 reduces at least one of the red luminance-value threshold, the green luminance-value threshold, and the blue luminance-value threshold for yellow lines to be lower value.

In step S450, if the first selected line in the composite line member, which is closer to the current travel lane of the own vehicle 1, satisfies both (i) the RGB luminance-value conditions for white lines and (ii) the RGB luminance-value conditions for yellow lines, the color identifier 55 can determine that the first selected line in the composite line member, which is closer to the current travel lane of the own vehicle 1, is a yellow line.

Specifically, the RGB luminance-value conditions for white lines and (ii) the RGB luminance-value conditions for yellow lines can be set to be partially overlapped with each other. In this setting, the first selected line in the composite line member, which is closer to the current travel lane of the own vehicle 1, can satisfy both (i) the RGB luminance-value conditions for white lines and (ii) the RGB luminance-value conditions for yellow lines. In this case, therefore, the color identifier 55 can determine that the first selected line in the composite line member, which is closer to the current travel lane of the own vehicle 1, is a yellow line.

Note that the color identifier 55 can determine whether a width of the forward portion of the current travel lane of the own vehicle 1 recognized in step S140 or S150 satisfies a width condition for temporary service sections in the color identification routine. At that time, if the marker-based right demarcation line is determined to include a yellow line in a current cycle of the color identification routine, it is possible to omit the determination of whether the width of the forward portion of the current travel lane of the own vehicle 1 recognized in step S140 or S150 satisfies the width condition for temporary service sections in the following cycles of the color identification routine.

As described above, the color identifier 55 adjusts at least one of the red, green, and blue luminance-value conditions for yellow lines to thereby facilitate identification of yellow lines in response to determination that all the conditions described in respective steps S400 to S440 are satisfied in step S450, but can adjust at least one of the red, green, and blue luminance-value conditions for yellow lines to thereby facilitate identification of yellow lines in response to determination that all the conditions described in respective steps S400 to S430 are satisfied in step S450.

After the operation in step S450, the processor 9a serves as, for example, the color identifier 55 to determine whether the first selected line in the composite line member, which is closer to the current travel lane of the own vehicle 1, is a yellow line based on (i) the RGB luminance values of the respective pixels corresponding to the first selected line and (ii) the adjusted red, green, and blue luminance-value conditions in step S460.

In response to determination that the first selected line in the composite line member, which is closer to the current travel lane of the own vehicle 1, is not a yellow line (NO in step S460), the color identification routine is terminated.

Otherwise, in response to determination that the first selected line in the composite line member, which is closer to the current travel lane of the own vehicle 1, is a yellow line (YES in step S460), the processor 9a serves as, for example, the color identifier 55 to determine whether a second selected line in the composite line member, which is farther from the current travel lane of the own vehicle 1, is a white line based on (i) the RGB luminance values of the respective pixels corresponding to the second selected line (ii) red, green, and blue luminance-value conditions for white lines in step S470.

In response to determination that the second selected line in the composite line member, which is farther from the current travel lane of the own vehicle 1, is not a white line (NO in step S470), the color identification routine is terminated.

Otherwise, in response to determination that the second selected line in the composite line member, which is farther from the current travel lane of the own vehicle 1, is a yellow line (YES in step S470), the processor 9a serves as, for example, the determiner 57 to determine that the forward portion of the current travel road includes a temporary service section in step S470, and thereafter, terminates the color identification routine.

The above configuration of the estimation apparatus 9 according to the fourth embodiment therefore achieves the same technical benefits as those achieved by the estimation apparatus 9 according to the first embodiment.

Additionally, the estimation apparatus 9 according to the fourth embodiment more reliably determines whether the marker-based right demarcation line includes a yellow line, making it possible to determine whether the forward portion of the current travel road includes a temporary service section with higher accuracy.

5. Fifth Embodiment

Next, the following describes the fifth embodiment of the present disclosure. Because the basic configuration of a road parameter estimation apparatus 9 according to the fifth embodiment is substantially identical to the configuration of the road parameter estimation apparatus 9 according to the first embodiment except for the following different points. The following therefore mainly describes the different points.

The road parameter estimation apparatus 9 of the fifth embodiment is configured to extract lane lines, i.e. demarcation line candidates, earlier in a forward portion of the current travel lane of the own vehicle 1 upon the forward portion of the current travel lane including a branch section in which a branch lane branches from the forward portion of the current travel lane. Note that the current travel road of the own vehicle 1, which has a branch lane branching therefrom, will be also referred to as a main lane. This early extraction of lane lines aims to estimate the profile of the forward portion of the current travel road earlier.

5-1. Principal of Early Extraction Routine

Figure 23A:
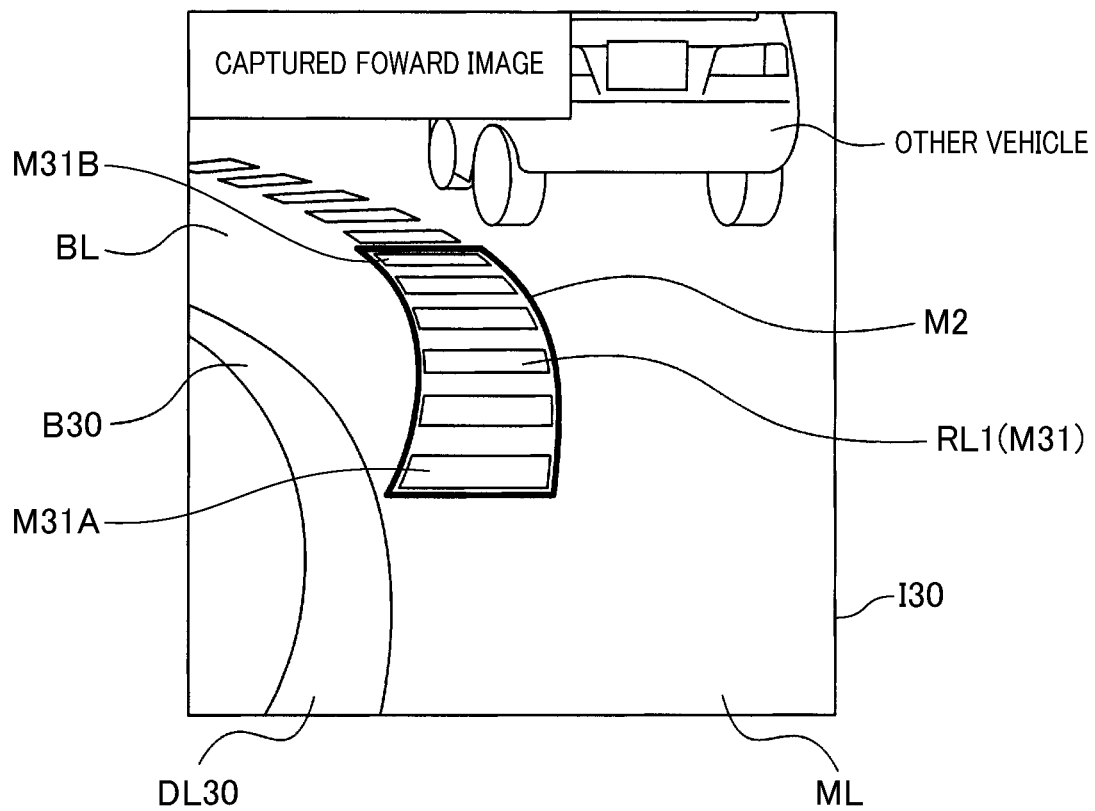
FIG. 23A is a view of a captured forward image according to the fifth embodiment of the present disclosure.

As illustrated in FIG. 23A, let us consider an example where the forward portion of a main lane (see reference character ML) of a current travel road, which is a left-hand traffic road, branches from a predetermined branch point of the forward portion of the main lane toward a left direction as a branch lane (branch road) BL.

As illustrated in FIG. 23A, a marker-based left demarcation line (see reference character DL30) based on a solid branch marker M30, which represents the left boundary of the main lane ML, curves leftward along the branch lane BL in a forward image 130 captured by the vehicular camera 5. That is, the marker-based left demarcation line DL30 serves as a branch lane line B30.

As described in the second embodiment, new dashed branch markers M31, which represent the left boundary of the main lane ML, are located between the main lane ML and the branch lane BL and aligned to partition the main lane ML from the branch lane BL.

As described above, the marker extractor 23 extracts, from the forward image 130, the dashed branch markers M31, so that the line candidate extractor 27 links each pair of adjacent markers of the new markers M31 in the longitudinal direction of the main lane ML to thereby extract, based on the linked markers M31, a right lane line RL1 from the forward image 130.

In FIG. 23A, a part of the right lane line RL1, which is generated based on linking of a marker train from the closest marker M31A to a predetermined marker M31B placed by several markers away from the closest marker M31A in the longitudinal direction of the current travel road; the marker train is enclosed by a heavy rectangular box as a close marker section MZ.

When using lane marker recognition, which recognizes white solid lane markers and white dashed lane markers, for the above situation, a comparative example of a lane marker recognition apparatus can focus on the fact that the solid branch marker M30 and the dashed branch markers M31 substantially have a Y-shape or V-shape and/or focus on the characteristics of each of the markers M30 and M31. This aims to reduce false recognition of the branch lane BL as the main lane ML. The lane marker recognition apparatus can also determine whether there is a branch section in front of an own vehicle in accordance with the result of the lane marker recognition, and fails to use the solid branch marker M30, which is located outside of the right lane line R11, for lane keeping control, which generates steering torque to keep the own vehicle in the current travel lane, making it possible to prevent erroneous execution of the lane keeping control.

The comparative example of the lane marker recognition apparatus can be configured to extract the right lane line RL1 based on the closest marker M31A of the markers M31 when the closest marker M31A is located at a predetermined minimum distance of, for example, 20 meters from the head of the own vehicle. Note that the distance of 20 meters is an actual distance can be calculated based on the corresponding number of pixels in the forward image. This aims to improve recognition accuracy of white lane markers.

Recently, the lane keeping control needs to generate the large amount of steering torque required when the own vehicle is turning a sharp curve. Even temporary misrecognition of a branch marker may result in erroneous execution of the lane keeping control.

From this viewpoint, the road parameter estimation apparatus 9 of the fifth embodiment is configured to use the recognition result obtained by the learning recognizer 31 to thereby recognize the left and right boundaries of the current travel lane of the own vehicle 1, making it possible to extract lane lines in a branch section earlier as demarcation-line candidates.

As described in the first embodiment, the learning recognizer 31 is configured to use the trained convolution neural network as the at least one trained recognition model RM, to recognize, upon a target forward image currently captured by the vehicular camera 5 being inputted to the trained convolution neural network, 1. An own-lane region (see reference character R51 in FIG. 23B), which represents a region of the forward portion of the current travel lane of the current travel road in the inputted target forward image 2. An other-vehicle region (see reference character R52 in FIG. 23B), which represents a region of at least one other vehicle in the inputted target forward image 3. A background region (see reference character R53 in FIG. 23B), which represents a region in the inputted target forward image except for the own-lane region and other-vehicle region Thus, the learning recognizer 31 generates a learning-based image 150 in which the own-lane region R51 is illustrated as a hatched region, the other-vehicle region R52 is illustrated as a crosshatched region, and the background region R53 is illustrated as a non-hatched white region (see FIG. 23B).

Figure 23B:
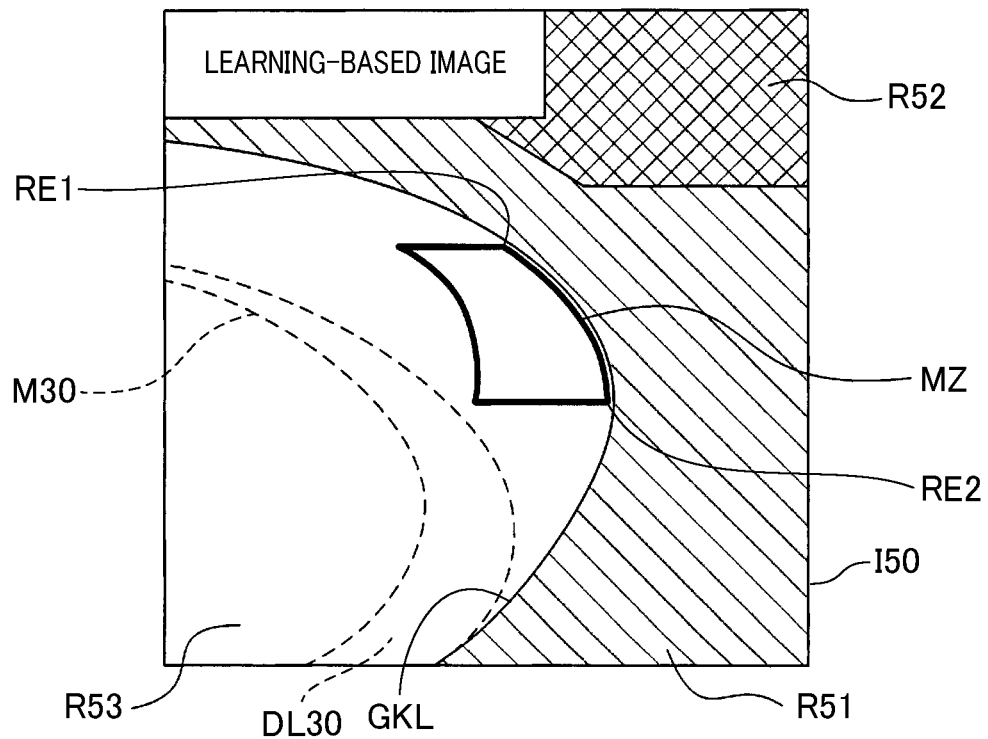
FIG. 23B is a view of a learning-based image according to the fifth embodiment.

In FIG. 23B, the marker-based left demarcation line DL30 and the branch lane line B30 (solid branch marker M30) illustrated in FIG. 23A are also superimposed on the background region R53 using dashed lines. In addition, the close marker section MZ comprised of the closest marker M31A to the predetermined marker M31B placed by several markers away from the closest marker M31A is also superimposed on the background region R53.

Specifically, the estimation apparatus 9 of the fifth embodiment is configured to determine whether both (1) A first requirement is satisfied, the first requirement representing that the length of the marker train in the dashed branch markers M31 obtained from the captured forward image, i.e. the length of the close marker section MZ along the current travel road of the own vehicle 1 is longer than a predetermined threshold length (2) A second requirement is satisfied, the second requirement representing that the close marker section MZ is located along the left boundary of the current travel lane of the own vehicle 1, which is obtained from the learning-based image The estimation apparatus 9 of the fifth embodiment is configured to perform early extraction of lane lines in response to determination that both the first and second requirements are satisfied.

This enables extraction of a left lane line along the dashed branch markers M31 to be carried out earlier.

Figure 24:
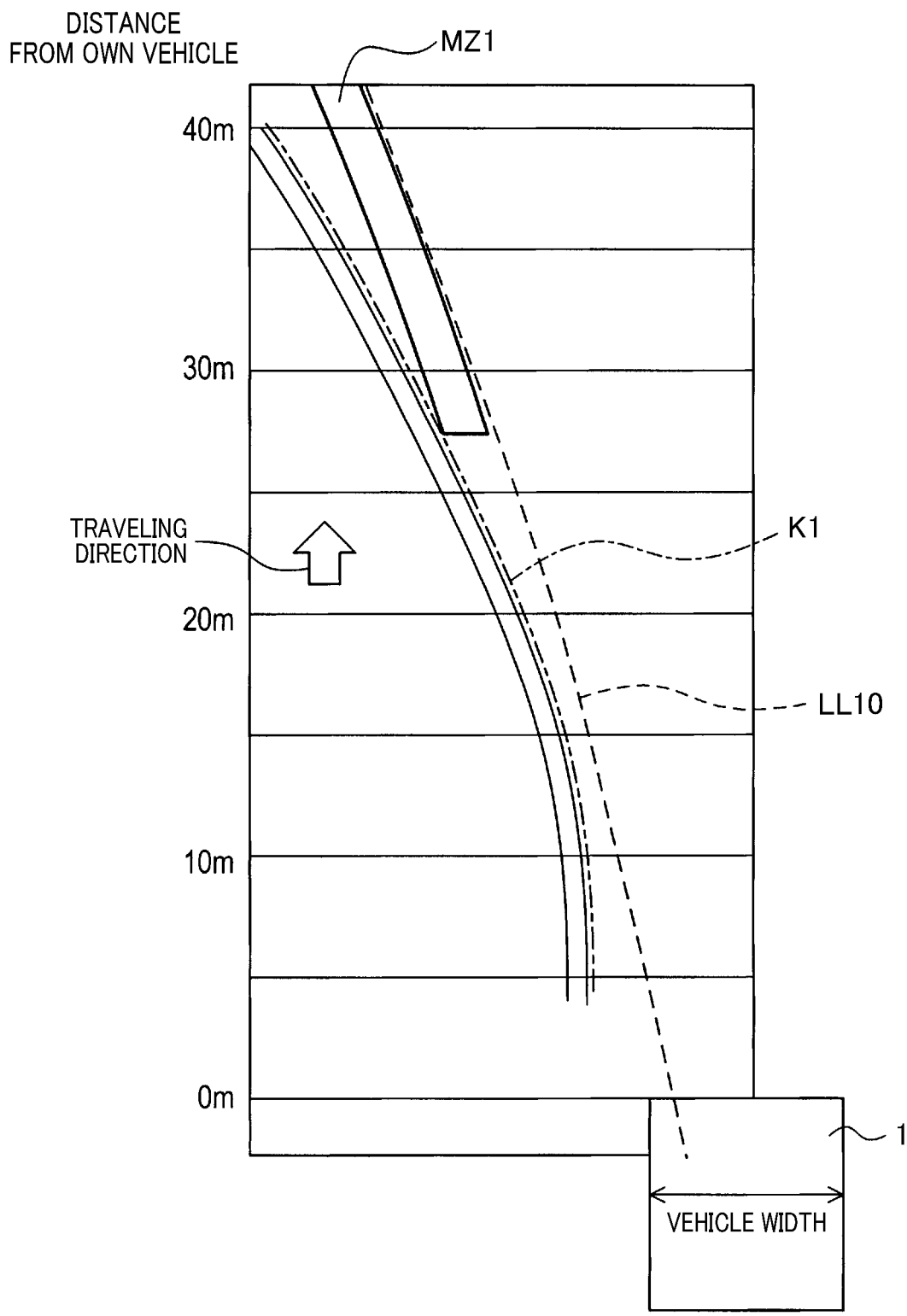
FIG. 24 is an enlarged view schematically illustrating a bird's eye view of the view illustrated in FIG. 23A according to the fifth embodiment.

For example, as illustrated in a bird's eye view of a current travel road of the own vehicle 1 illustrated in FIG. 24 when the head of the own vehicle 1 is located at a reference position, when determining that a close marker section MZ1 satisfies the first and second requirements, the estimation apparatus 9 performs early extraction of a lane line (see a dashed line LL10) that extends along the right side of the close marker section MZ1 toward the own vehicle 1. In FIG. 24, a line along the left marker-based demarcation line is illustrated as K1.

This enables the estimation apparatus 9 to estimate the profile of the forward portion of the current travel road earlier, that is, estimate the road parameters of the forward portion of the current travel road.

Figure 25A:
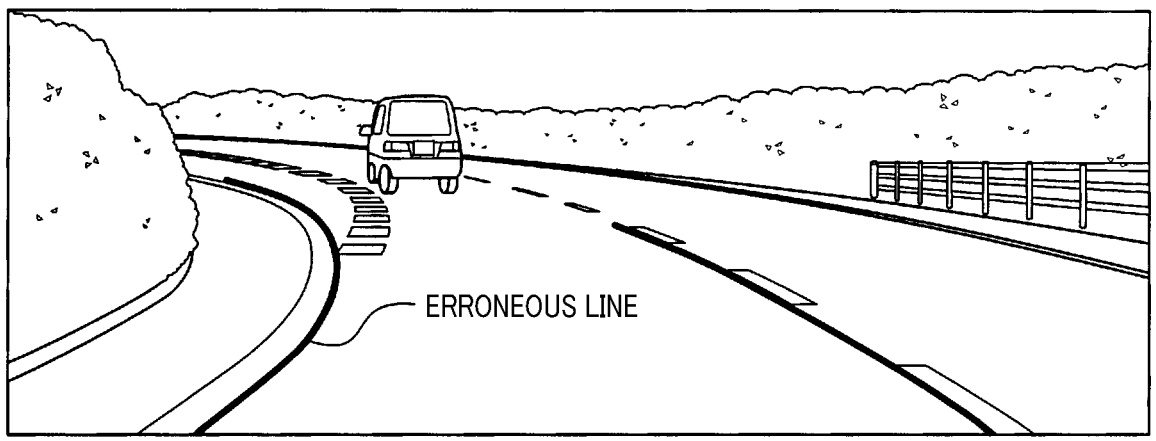
FIGS. 25A and 25B is a joint view schematically illustrating an erroneous line generated without usage of early extraction and a proper line generated based on usage of the early extraction.

The earlier estimation of the road parameters of the forward portion of the current travel road achieves, for example, the following technical benefits:

For example, FIG. 25A, in which the estimation apparatus 9 does not perform early extraction of lane lines, illustrates that a left marker-based demarcation line is definitely determined as an erroneous line that does not indicate a line extending along the left boundary of the current travel lane (main lane) of the own vehicle 1; the erroneous line is curved leftward along a solid branch marker M30.

Figure 25B:
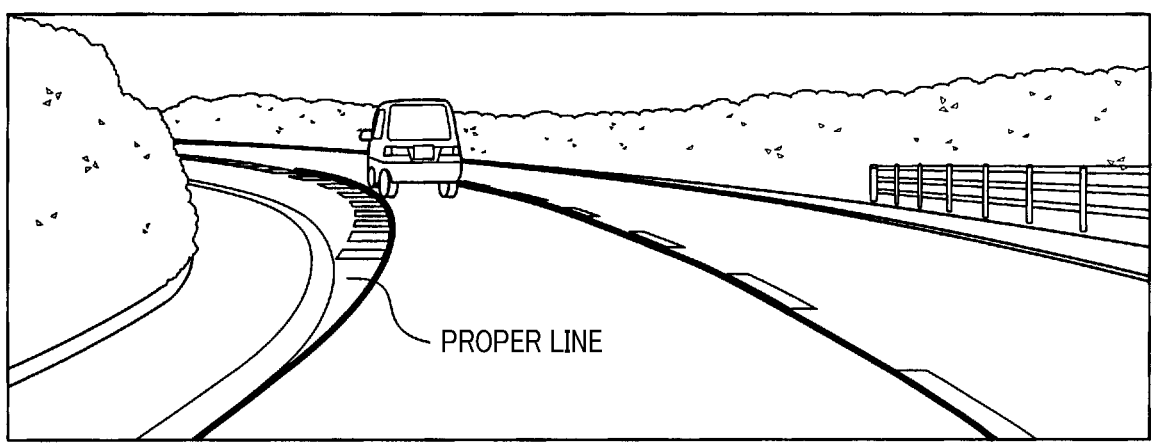

In contrast, FIG. 25B, in which the estimation apparatus 9 performs early extraction of lane lines, illustrates that a left marker-based boundary line is definitely determined as a proper line that indicates a line extending along the left boundary of the current travel lane (main lane) of the own vehicle 1

Even if the road parameters of the current travel road are obtained based on early estimated lane lines, the obtained road parameters may be inappropriate depending on an actual situation of the current travel road.

For example, as illustrated in FIG. 24, if an extension line of an early extracted lane line LL10 passes through the own vehicle 1 to cross its width direction, it may be unsuitable to use the early extracted lane line LL10 as a lane line that the lane keeping control employs.

Similarly, if the forward portion of the current travel road is specifically shaped, such as shaped to have a sharp curve, it may be unsuitable to use an early extracted lane line as a lane line that the lane keeping control employs. That is, if at least one of the road parameters for the forward portion of the current travel road is changed rapidly, it may be unsuitable to use an early extracted lane line as a lane line that the lane keeping control employs.

From this viewpoint, the estimation apparatus 9 of the fifth embodiment is capable of preventing previous values of the road parameters used for the lane keeping control from being replaced with those obtained based on an early extracted lane line.

Figure 26A:
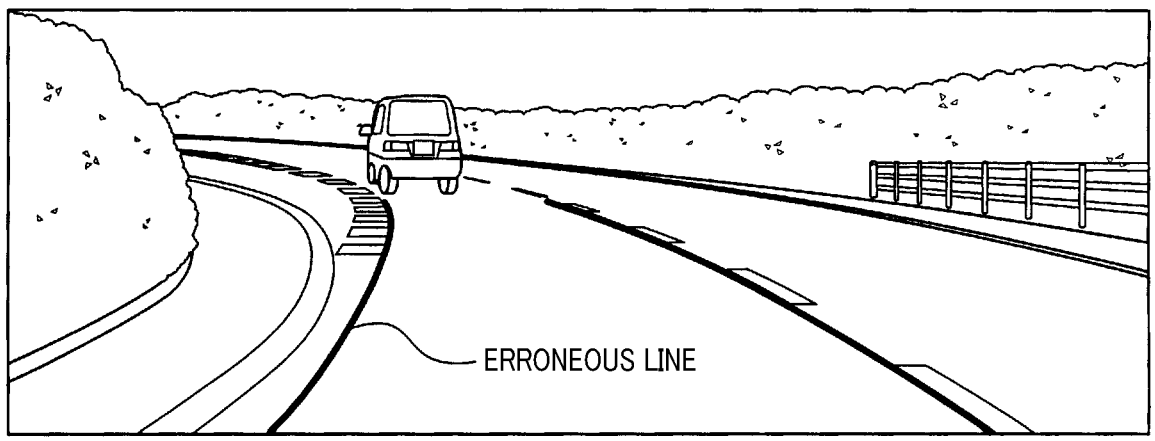
FIGS. 26A and 26B is a joint view schematically illustrating an erroneous line generated without usage of road parameter estimation and a proper line generated based on usage of the road parameter estimation.

For example, FIG. 26A, in which the estimation apparatus 9 employs the road parameters obtained based on an early extracted lane line in place of road parameters for the forward portion of the current travel road, illustrates that the profile of a marker-based demarcation line before the branch point may be deviated as an erroneous marker-based demarcation line (see a heavy solid line in FIG. 26A) from an actual marker-based left demarcation line.

Figure 26B:
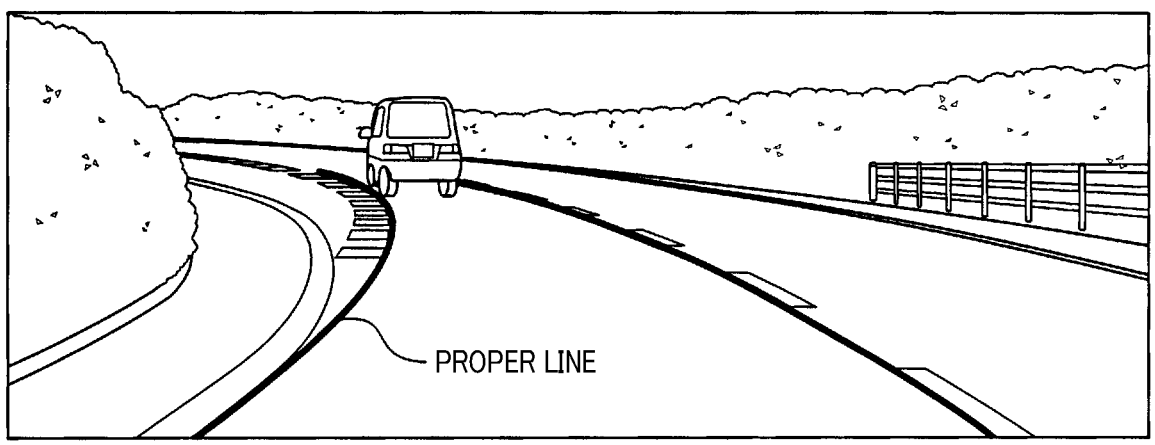

In contrast, FIG. 26B, in which the estimation apparatus 9 prevents employment of the road parameters obtained based on an early extracted lane line as road parameters for the forward portion of the current travel road, illustrates that the profile of a marker-based demarcation line accurately extends as a proper demarcation line (see a heavy solid line in FIG. 26B) along an actual marker-based left demarcation line and dashed branch markers before and after the branch point.

5-2. Overall Configuration

The road parameter estimation apparatus 9 according to the fifth embodiment for example functionally includes an estimator 17B.

Figure 27:
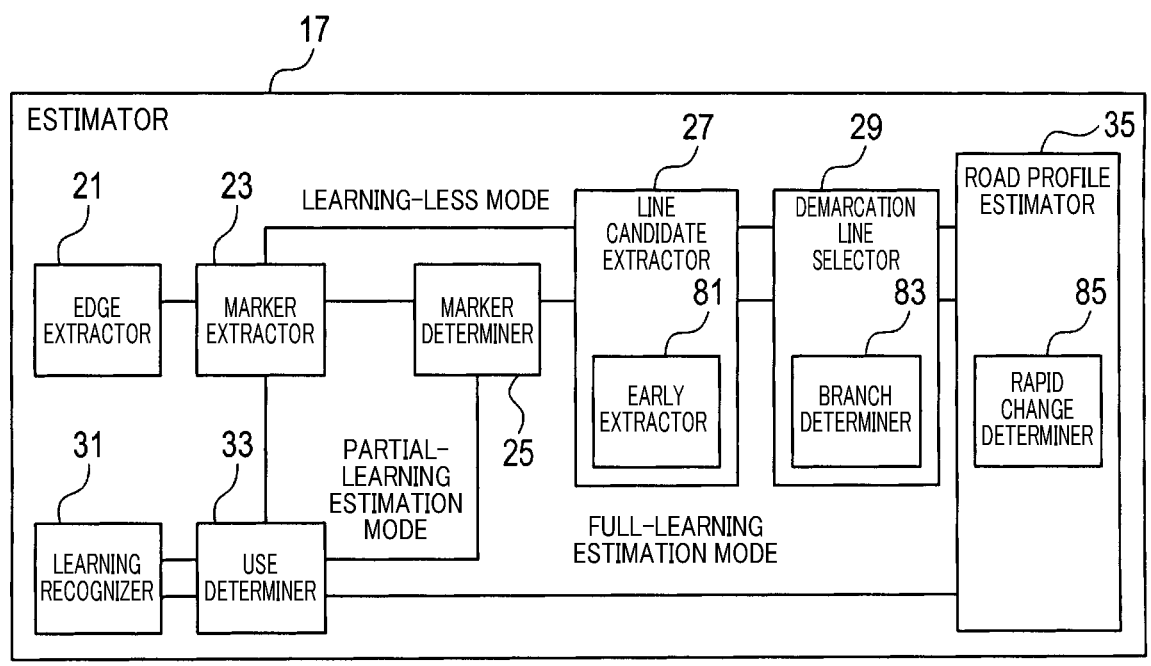
FIG. 27 is a block diagram schematically illustrating an example of the overall configuration of an estimator according to the fifth embodiment.

As illustrated in FIG. 27, the estimator 17B functionally includes the edge extractor 21, the marker extractor 23, the marker determiner 25, a line candidate extractor 27B, a demarcation line selector 29B, the learning recognizer 31, the use determiner 33, and a road parameter estimator 35B.

Each of the edge extractor 21, the marker extractor 23, the marker determiner 25, the line candidate extractor 27B, the demarcation line selector 29B, the learning recognizer 31, the use determiner 33, and the road parameter estimator 35B has substantially the same functions as those of the corresponding one of the components described in the first embodiment.

Additionally, the line candidate extractor 27B includes an early extractor 81, the demarcation line selector 29B includes a branch determiner 83, and the road parameter estimator 35B includes a rapid change determiner 85.

The line candidate extractor 27B is configured to extract, based on the markers extracted by the marker extractor 23, lane lines as demarcation-line candidates from the forward image, each of which extends in the traveling direction of the own vehicle 1 to partition the forward portion of the current travel road in its width direction.

The early extractor 81 is configured to

1. Determine whether the extracted markers include a close marker section comprised of a marker train from a closest marker to a predetermined marker placed by several markers away from the closest marker;

2. Determine whether the close marker section satisfies predetermined first to third early extraction conditions described later in response to determination that the extracted markers include the close marker section comprised of the marker train from the closest marker to the predetermined marker placed by several markers away from the closest marker;

3. Extract a lane line, i.e., a demarcation line candidate, based on the close marker section in response to determination that the close marker section satisfies the first to third early extraction conditions The branch determiner 83 is configured to determine whether the forward portion of the current travel lane or current travel road of the own vehicle 1 includes a branch section that branches therefrom toward another direction. The branch determiner 83 can be configured to be identical to the branch determiner 51 described in the second embodiment or configured to employ a selected one of known configurations or methods for determining whether there is a branch section in front of the own vehicle 1. For example, the branch determiner 83 can be configured to employ a known configuration or method for determining whether there is a branch section in front of the own vehicle 1, which is disclosed in Japanese Patent Application Publication NO. 2011-198110, the disclosure of which is incorporated in its entirety herein by reference.

The demarcation line selector 29B is configured to select, from the lane lines extracted by the line candidate extractor 27, at least one pair of lane lines suitable for at least one pair of left and right marker-based demarcation lines that define a left boundary and a right boundary of at least one target lane, such as the current travel lane. The demarcation line selector 29B is also configured to set the selected at least one pair of lane lines as the at least one pair of left and right marker-based demarcation lines for the at least one target lane.

In particular, the demarcation line selector 29B is configured to select at least one pair of lane lines, one of which is extracted by the early extractor 81, as at least one pair of left and right marker-based demarcation lines for the current travel lane when the branch determiner 83 determines that the forward portion of the current travel lane or current travel road of the own vehicle 1 includes the branch section that branches therefrom toward another direction.

The rapid change determiner 85 is configured to determine whether at least one of the road parameters obtained in a current cycle of a road profile estimation routine has been rapidly changed from that obtained in an immediately previous cycle of the road profile estimation routine.

The road parameter estimator 35B is configured to prevent replacement of a previous value of the at least one of the road parameters obtained in the immediately previous cycle of the road profile estimation routine with a current value of the at least one of the road parameters obtained in the current cycle of the road profile estimation routine in response to determination that the at least one of the road parameters obtained in the current cycle of the road profile estimation routine has been rapidly changed from that obtained in an immediately previous cycle of the road profile estimation routine.

5-3. Road Profile Estimation Routine

Next, the following describes the road profile estimation routine according to the fifth embodiment carried out by the road parameter estimation apparatus 9 with reference to FIG. 28. Specifically, the processor 9a of the estimation apparatus 9 is programmed to run instructions of the road profile estimation program stored in the storage unit 9b every predetermined interval to thereby perform the road profile estimation routine.

When starting the road profile estimation program, the processor 9a of the estimation apparatus 9 performs, in step S490, the operations in steps S100, S110, and S120, so that the markers are extracted from a target forward image captured by the vehicular camera 5, and a learning-based image is generated. In particular, in step S110, the close marker section comprised of a marker train from the closest marker to a predetermined marker placed by several markers away from the closest marker in the current travel road.

After the operation in step S490, the processor 9a serves as, for example, the early extractor 81 of the line candidate extractor 27B to determine whether all the first to third early extraction conditions, which are required to perform an early extraction operation, are satisfied in step S500.

In response to determination that all the first to third early extraction conditions are satisfied (YES in step S500), the road profile estimation routine proceeds to step S510. Otherwise, in response to determination that at least one of the first to third early extraction conditions is not satisfied (NO in step S500), the road profile estimation routine is terminated.

The following describes the first to third early extraction conditions.

The first early extraction condition is that the actual length of the close marker section MZ in the longitudinal direction of the current travel road is longer than or equal to 20 meters. Note that the actual length of the close marker section MZ can be calculated based on the number of pixels in the forward image corresponding to the length of the close marker section MZ in the forward image.

The second early extraction condition is that

1. A first minimum gap distance between the right edge (see reference character RE1 in FIG. 23B) of the farthest marker in the close marker section and a left learning-based demarcation line GKL (see FIG. 23B) is shorter than a threshold gap distance 2. A second minimum gap distance between the right edge (see reference character RE2 in FIG. 23B) of the closest marker in the close marker section and the left learning-based demarcation line GKL is shorter than the threshold gap distance The third early extraction condition is that the first and second early extraction conditions have been satisfied for continuous three cycles of the road profile estimation routine, i.e. the continuous three frame forward images.

Note that, as described above, after the negative determination in step S500, the processor 9a serves as, for example, the line candidate extractor 27B to 1. Extend a right edge of the close marker section toward the own vehicle 1 to extract a left lane line in response to when the closest marker M31A is located at a predetermined minimum distance of, for example, 20 meters from the head of the own vehicle 1

2. Select the extracted left lane line as a left marker-based demarcation line in response to determination that an extension line extending along the left lane line toward the own vehicle 1 is located outside the own vehicle 1, i.e. the left side of the own vehicle 1 in FIG. 24B 3. Select a right marker-based demarcation line based on a right lane line that is paired to the right lane line 4. Extract, from the pair of marker-based left and right demarcation lines, the road parameters of the forward portion of the current travel road In step S510, because the first to third early extraction conditions are satisfied, the processor 9a serves as, for example, the early extractor 81 to 1. Immediately extend a right edge of the close marker section toward the own vehicle 1 to extract a left lane line 2. Select the extracted left lane line as a left marker-based demarcation line in response to determination that an extension line extending along the left lane line toward the own vehicle 1 is located outside the own vehicle 1, i.e. the left side of the own vehicle 1 in FIG. 24B 3. Select a right marker-based demarcation line based on a right lane line that is paired to the right lane line 4. Extract, from the pair of marker-based left and right demarcation lines, the road parameters of the forward portion of the current travel road The early extractor 81 can be configured to immediately extend a closest right corner of the close marker section to the own vehicle 1 along a tangent line at the closest right corner thereof.

Following the operation in step S510, the processor 9a serves as, for example, the branch determiner 83 to determine whether the forward portion of the current travel lane or current travel road of the own vehicle 1 includes a branch section that branches therefrom toward another direction. The branch determiner 83 can be configured to be identical to the branch determiner 51 described in the second embodiment or configured to employ a selected one of known configurations or methods for determining whether there is a branch section in front of the own vehicle 1.

In response to determination that the forward portion of the current travel lane or current travel road of the own vehicle 1 includes the branch section (YES in step S520), the road profile estimation routine proceeds to step S530. Otherwise, in response to determination that the forward portion of the current travel lane or current travel road of the own vehicle 1 does not include a branch section (NO in step S520), the road profile estimation routine proceeds to step S130 set forth above.

Next, the processor 9a serves as, for example, the demarcation line selector 29B to select at least one pair of lane lines, one of which is extracted in step S510, as at least one pair of left and right marker-based demarcation lines for the current travel lane; the one of the lane lines extracted in step S510 serves as the left marker-based demarcation line that partitions the current travel lane (main lane) and the branch lane.

Following the operation in step S530, the processor 9a serves as, for example, the road parameter estimator 35B to estimate, based on the left and right marker-based demarcation lines for the current travel lane, the various road parameters in step S540.

Next, the processor 9a serves as, for example, the rapid change determiner 85 to determine whether at least one of the road parameters obtained in step S540 of the current cycle of the road profile estimation routine has been rapidly changed from that obtained in step S540 of the immediately previous cycle of the road profile estimation routine in step S550.

That is, the determination in step S550 represents determination of whether the profile of the forward portion of the current travel road obtained in step S540 of the current cycle of the road profile estimation routine has been rapidly changed from that obtained in step S540 of the immediately previous cycle of the road profile estimation routine in step S550. For example, the forward portion of the current travel road has been sharply curved.

In step S550, the rapid change determiner 85 can be configured to determine whether a level of change between at least one of the road parameters obtained in step S540 of the current cycle of the road profile estimation routine and that obtained in step S540 of the immediately previous cycle of the road profile estimation routine is larger than or equal to a predetermined threshold level during a predetermined period in step S550.

In response to determination that the road parameters obtained in step S540 of the current cycle of the road profile estimation routine have not been rapidly changed from those obtained in step S540 of the immediately previous cycle of the road profile estimation routine (NO in step S550), the processor 9a replaces values of the road parameters obtained in step S540 of the immediately previous cycle of the road profile estimation routine with those obtained in step S540 of the current cycle of the road profile estimation routine in step S555. Thereafter, the processor 9a terminates the current cycle of the road profile estimation routine.

Otherwise, in response to determination that at least one of the road parameters obtained in step S540 of the current cycle of the road profile estimation routine has been rapidly changed from that obtained in step S540 of the immediately previous cycle of the road profile estimation routine (YES in step S550), the current cycle of the road profile estimation routine proceeds to step S560.

In step S560, the processor 9a serves as, for example, the road parameter estimator 35B to prevent replacement of a value of the at least one of the road parameters obtained in step S540 of the immediately previous cycle of the road profile estimation routine with that obtained in step S540 of the current cycle of the road profile estimation routine. Thereafter, the processor 9a terminates the current cycle of the road profile estimation routine.

The road parameters, each of which represents a corresponding feature of the forward portion of the current travel road, can include, as described above, the curvature of the forward portion of the current travel lane, and the width of the forward portion of the current travel lane, and other pieces of feature information about the forward portion of the current travel road. For example, the road parameters of the forward portion of the current travel road can include the above fitting errors.

Specifically, the rapid change determiner 85 can be configured to determine whether the number of boundary points BP in the forward portion of the current travel road, whose fitting errors FE are each larger than the predetermined reference value, obtained in the current cycle of the road profile estimation routine has been changed from that obtained in the immediately previous cycle of the road profile estimation routine.

Then, in response to determination that the number of boundary points BP obtained in the current cycle of the road profile estimation routine has been changed from that obtained in the immediately previous cycle of the road profile estimation routine, the road parameter estimator 35B can prevent replacement of a value of the at least one of the road parameters obtained in step S540 of the immediately previous cycle of the road profile estimation routine with that obtained in the current cycle of the road profile estimation routine.

Similarly, the rapid change determiner 85 can be configured to determine whether the average of the fitting errors FE in the forward portion of the current travel road obtained in the current cycle of the road profile estimation routine has been changed from that in the immediately previous cycle of the road profile estimation routine. Then, in response to determination that the average of the fitting errors FE in the forward portion of the current travel road obtained in the current cycle of the road profile estimation routine has been changed from that in the immediately previous cycle of the road profile estimation routine, the road parameter estimator 35B can prevent replacement of a value of the at least one of the road parameters obtained in step S540 of the immediately previous cycle of the road profile estimation routine with that obtained in step S540 of the current cycle of the road profile estimation routine.

Additionally, the rapid change determiner 85 can be configured to determine whether the sum of the fitting errors FE in the current cycle of the road profile estimation routine has been changed from that in the immediately previous cycle of the road profile estimation routine. Then, in response to determination that the sum of the fitting errors FE in the forward portion of the current travel road obtained in the current cycle of the road profile estimation routine has been changed from that in the immediately previous cycle of the road profile estimation routine, the road parameter estimator 35B can prevent replacement of a value of the at least one of the road parameters obtained in step S540 of the immediately previous cycle of the road profile estimation routine with that obtained in step S540 of the current cycle of the road profile estimation routine.

As described above, in response to determination that continuous usage of at least one of the road parameters obtained in step S540 of the current cycle of the road profile estimation routine may reduce the controllability of the own vehicle 1, the road parameter estimator 35B can prevent replacement of a value of the at least one of the road parameters obtained in step S540 of the immediately previous cycle of the road profile estimation routine with that obtained in step S540 of the current cycle of the road profile estimation routine.

5-4. Road Parameter

The following briefly describes the road parameters.

The road parameters, which include, for example, the curvature of a current travel road or a current travel lane, can be calculated using 1. A known Kalman filter, i.e. an extended Kalman filter
2. Sampled points, i.e. measurement points, on a demarcation line or lane line along the longitudinal direction of the current travel road Each of the sampled points represents positional data indicative of a corresponding location of the forward portion of the current travel lane in its longitudinal direction and/or its width direction.

That is, it is possible to estimate a current value of at least one road parameter in accordance with the sampled points and a predicted value of the at least one road parameter, which is predicted based on a previously estimated value of the at least one road parameter. In other words, it is possible to calculate a current estimated value of the at least one road parameter in accordance with a previously estimated value of the at least one road parameter and the sampled points on the boundary line or lane line.

How to estimate the road parameters using a Kalman filter is disclosed in, for example, Japanese Patent Application Publication NO. 2016-199196 or 2013-196341. The disclosure of each of these patent publications NO. 2016-199196 or 2013-196341 is incorporated in its entirety herein by reference.

That is, in response to determination that replacement of the at least one road parameter is maintained, replacement of data items of all the respective sampled points on a used demarcation line with data items of all the respective sampled points on a newly extracted lane line enables a current value of the at least one road parameter to be obtained.

Otherwise, in response to determination that replacement of the at least one road parameter is prevented, sequential replacement of data items of the respective sampled points on a used demarcation line with data items of the respective sampled points on a newly extracted lane line enables the at least one road parameter to be gradually changed as described below.

For example, the processor 9a uses data d1 at a sampled point on a demarcation line at time t1 and a value p1 of a road parameter predicted based on a previously estimated value of the road parameter to thereby estimate a value p2 of the road parameter at time t2.

Next, the processor 9a uses data d2 at a sampled point on the demarcation line at time t2 and the value p2 of the road parameter estimated at the previous time t1 to thereby estimate a value p3 of the road parameter at time t3.

Subsequently, for replacement of data on the demarcation line with data on a newly extracted lane line, the processor 9a uses data d3 at a sampled point on the newly extracted lane line at time t3 and the value p3 of the road parameter estimated at the previous time t2 to thereby estimate a value p4 of the road parameter at time t4.

Next, the processor 9a uses data d4 at a sampled point on the newly extracted lane line at time t4 and the value p4 of the road parameter estimated at the previous time t3 to thereby estimate a value p5 of the road parameter at time t5.

For replacement of a recognized demarcation line with an early extracted lane line, the processor 9a makes it possible to gradually change the at least one road parameter if the at least one road parameter is rapidly changed.

5-5. Technical Benefit

The above configuration of the estimation apparatus 9 according to the fifth embodiment therefore achieves the same technical benefits as those achieved by the estimation apparatus 9 according to the first embodiment.

The above configuration of the estimation apparatus 9 according to the fifth embodiment also enables early extraction of a lane line in the forward portion of a current travel road, making it possible to more stably perform control of the traveling of the own vehicle 1, such as lane keeping control of the own vehicle 1.

Additionally, the above configuration of the estimation apparatus 9 according to the fifth embodiment prevents replacement of a previous value of a road parameter with a currently estimated value thereof if the road parameter has been rapidly changed, making it possible to prevent inappropriate control of the traveling of the own vehicle 1, such as rapid change of the traveling direction of the own vehicle 1, based on the current value of th rapidly changed road parameter

6. Modification

The exemplary embodiments of the present disclosure have been described above. The present disclosure is however not limited to the above exemplary embodiments, and can be variably modified.

Each of the estimation apparatuses 9 can be applied to countries where vehicles travel on the right side of each road.

Each of the partial learning estimator 37 or the full learning estimator 39 is capable of estimating the road parameters of the forward portion of the current travel road using the recognition result obtained by the learning recognizer 31.

That is, if the partial learning estimator 37 determines that markers extracted by the marker extractor 23 are markers located along a learning-based demarcation line representing a corresponding boundary of the own-lane region obtained by the learning recognizer 31, the partial learning estimator 37 can obtain a lane line based on the extracted markers, thus estimating, based on the lane line, the road parameters of the forward portion of the current travel road.

Additionally, the full learning estimator 39 can estimate the road parameters of the forward portion of the current travel road in accordance with a learning-based demarcation line representing a corresponding boundary of the own-lane region obtained by the learning recognizer 31.

The road parameter estimation apparatuses and methods described in the present disclosure can be implemented by a dedicated computer including a memory and a processor programmed to perform one or more functions embodied by one or more computer programs.

The road parameter estimation apparatuses and methods described in the present disclosure can also be implemented by a dedicated computer including a processor comprised of one or more dedicated hardware logic circuits.

The road parameter estimation apparatuses and methods described in the present disclosure can further be implemented by a processor system comprised of a memory, a processor programmed to perform one or more functions embodied by one or more computer programs, and one or more hardware logic circuits.

The one or more programs can be stored in a non-transitory storage medium as instructions to be carried out by a computer or a processor.

The road parameter estimation apparatuses and methods described in the present disclosure One or more functions included in the road parameter estimation apparatuses and methods described in the present disclosure can be implemented by one or more hardware devices without using software programs.

The functions of one element in each embodiment can be distributed as plural elements, and the functions that plural elements have can be combined into fewer elements. At least part of the structure of each embodiment can be replaced with a known structure having the same function as the at least part of the structure of the corresponding embodiment. A part of the structure of each embodiment can be eliminated. At least part of each embodiment can be added to the structure of another embodiment, or can be replaced with a corresponding part of another embodiment.

The functions of each road parameter estimation apparatus can be implemented by various embodiments; the various embodiments include road parameter estimation systems, programs for serving a computer as the functions, storage media, such as non-transitory media, storing the programs, and road shape estimation methods.

While illustrative embodiments of the present disclosure have been described herein, the present disclosure is not limited to the embodiments and their modifications described herein, but includes any and all embodiments having modifications, omissions, combinations (e.g., of aspects across various embodiments), adaptations and/or alterations as would be appreciated by those in the art based on the present disclosure within the scope of the present disclosure.

What is claimed is:

1. A road parameter estimation apparatus comprising:
an image obtainer configured to obtain a forward image of a vehicle captured by a vehicular camera;
a recognizer configured to use a trained recognition model and the forward image to accordingly recognize, as a recognition result, a lane region and at least one model-based demarcation line indicative of a corresponding boundary of the lane region, the lane region representing a forward portion of a lane in a road on which the vehicle is located;
a marker extractor configured to extract, from the forward image, markers painted on the road;
a marker-based estimator configured to:
extract, based on the markers extracted by the marker extractor, at least one lane line that demarcates the road into plural regions in a width direction of the road; and
estimate, based on the extracted at least one lane line, a value of at least one feature parameter of the road as a marker-based estimation result, the at least one feature parameter of the road representing at least one feature of the road; and
a model-based estimator configured to estimate, based on the at least one model-based demarcation line, a value of the at least one feature parameter of the road as a model-based estimation result; and
a determiner configured to compare the at least one lane line with the model-based demarcation line to accordingly determine whether to use the marker-based estimation result or the model-based estimation result.

2. A road parameter estimation apparatus comprising:
an image obtainer configured to obtain a forward image of a vehicle captured by a vehicular camera;
a recognizer configured to use a trained recognition model and the forward image to accordingly recognize, as a recognition result, a lane region and at least one model-based demarcation line indicative of a corresponding boundary of the lane region, the lane region representing a forward portion of a lane in a road on which the vehicle is located;
a use determiner configured to determine whether to use the recognition result for estimating at least one feature parameter of the road, the at least one feature parameter of the road representing a feature of the road;
a lane information obtainer configured to obtain, from the forward image, lane information about the lane of the road; and
an estimator configured to:
estimate, based on the recognition result, a value of the at least one feature parameter of the road in response to determination to use the recognition result; and
estimate, based on the lane information about the lane of the road, a value of the at least one feature parameter of the road in response to determination not to use the recognition result.

3. The road parameter estimation apparatus according to claim 1, wherein:
the marker-based estimator comprises:
a first estimator configured to:
extract, based on the markers extracted by the marker extractor, a first lane line as the at least one lane line without usage of the recognition result; and
estimate, based on the extracted first lane line, a first value of the at least one feature parameter of the road as a first estimation result;
a second estimator configured to:
determine whether the markers extracted by the marker extractor are located on the at least one model-based demarcation line;
extract, based on the markers extracted by the marker extractor, a second lane line as the at least one lane line in response to determination that the markers extracted by the marker extractor are located on the at least one model-based demarcation line; and
estimate, based on the extracted second lane line, a second value of the at least one feature parameter of the road as a second estimation result; and
the determiner is configured to:
perform a comparison among first information about the first lane line, second information about the second lane line, and third information about the model-based demarcation line; and
analyze a result of the comparison to accordingly determine whether to use one of the first estimation result, the second estimation result, and the model-based estimation result.

4. The road parameter estimation apparatus according to claim 2, wherein:
the lane information obtainer is configured to obtain, from the forward image, at least one lane line that demarcates the road into plural regions in a width direction of the road as the lane information; and
the use determiner is configured to determine whether to use the recognition result in accordance with any one of a first determination condition, a second determination condition, a third determination condition, a fourth determination condition, and a fifth determination condition, the first determination condition representing fitting errors, each of the fitting errors representing an absolute deviation between a fitting curve and a corresponding one of boundary points located on the model-based demarcation line, the fitting curve being drawn to fit an arrangement of the boundary points;

the second determination condition representing a positional gap between the fitting curve and the at least one lane line;

the third determination condition representing road information about the forward portion of the road being unsuitable for using the recognition result, the road information being obtained by scene recognition based on the forward image obtained by the image obtainer;

the fourth determination condition representing
  the number of selected points in the boundary points within a predetermined range located to enclose the selected points on the fitting curve, each of the selected points having a smaller error with respect to the fitting curve, or
  a ratio of the number of the selected points to all the boundary points; and the fifth determination condition representing an absolute difference between:
  a first recognition distance of the road obtained based on the fitting curve, and
  a second recognition distance of the road obtained based on the at least one lane line without usage of the recognition result.

5. The road parameter estimation apparatus according to claim 2, wherein:
  the estimator further comprises:
    a marker extractor configured to extract, from the forward image, markers painted on the road without usage of the recognition result; and
    a marker determiner configured to determine whether the markers extracted by the marker extractor are located on the at least one model-based demarcation line.

6. The road parameter estimation apparatus according to claim 5, wherein:
  the lane information obtainer is configured to obtain, from the forward image, at least one lane line that demarcates the road into plural regions in a width direction of the road as the lane information; and
  the estimator comprises:
    a first estimator configured to:
      extract, based on the markers extracted by the marker extractor, a first lane line as the at least one lane line without usage of the recognition result; and
      estimate, based on the extracted first lane line, a first value of the at least one feature parameter of the road as a first estimation result; and
    a second estimator configured to:
      determine whether the markers extracted by the marker extractor are located on the at least one model-based demarcation line;
      extract, based on the markers extracted by the marker extractor, a second lane line as the at least one lane line in response to determination that the markers extracted by the marker extractor are located on the at least one model-based demarcation line; and
      estimate, based on the extracted second lane line, a second value of the at least one feature parameter of the road as a second estimation result; and
    a model-based estimator configured to estimate, based on the at least one model-based demarcation line, a third value of the at least one feature parameter of the road parameter as a model-based estimation result,
  the road parameter estimation apparatus further comprising:
    a determiner is configured to:
      perform a comparison among first information about the first lane line, second information about the second lane line, and third information about the model-based demarcation line; and
      analyze a result of the comparison to accordingly determine whether to use one of the first estimation result, the second estimation result, and the model-based estimation result.

7. The road parameter estimation apparatus according to claim 2, wherein:
  the estimator further comprises a marker extractor configured to extract, from the forward image, markers painted on the road, and
  the estimator is configured to:
    select, based on the markers extracted by the marker extractor, a plurality of lane line candidates for at least one lane line that demarcates the road into plural regions in a width direction of the road;
    determine, based on the forward image, whether a width of the forward portion of the road becomes wider toward a traveling direction of the vehicle;
    reselect, in the plurality of lane line candidates, one of the lane line candidates to be suitable as a determination line of the lane in response to determination that the width of the forward portion of the road becomes wider toward the traveling direction of the vehicle; and
    determine, based on the lane region, whether the reselected one of the lane line candidates is appropriate as the determination line of the lane.

8. The road parameter estimation apparatus according to claim 2, wherein:
  the estimator further comprises a marker extractor configured to extract, from the forward image, markers painted on the road, and
  the road parameter estimation apparatus further comprising:
  a line candidate extractor configured to extract, based on the markers extracted by the marker extractor, at least one lane line candidate that demarcates the road into plural regions in a width direction of the road;
  an early extractor configured to:
    determine whether the markers extracted by the marker extractor satisfy at least one early extraction condition required to extract the at least one lane line candidate earlier; and
    extract the at least one lane line candidate earlier in response to determination that the markers extracted by the marker extractor satisfy the at least one early extraction condition than that the markers extracted by the marker extractor do not satisfy the at least one early extraction condition; and
  a branch determiner configured to determine whether the forward portion of the road includes a branch section so that the lane branches therefrom toward another direction, the lane information obtainer being configured to select the at least one lane line candidate extracted by the early extractor as a demarcation line representing a boundary of the lane.

9. The road parameter estimation apparatus according to claim 8, wherein:
the estimator is configured to repeatedly estimate the value of the at least one feature parameter of the road,
the road parameter estimation apparatus further comprising:
a rapid change determiner configured to determine whether a current one of the repeatedly estimated values of the at least one feature parameter of the road estimated by the estimator has been rapidly changed from an immediately previous one of the repeatedly estimated values of the at least one feature parameter of the road estimated by the estimator; and
a prevention unit configured to prevent replacement of the immediately previous one of the repeatedly estimated values of the at least one feature parameter of the road with the current one of the repeatedly estimated values of the at least one feature parameter of the road in response to determination that the current one of the repeatedly estimated values of the at least one feature parameter of the road has been rapidly changed from an immediately previous one of the repeatedly estimated values of the at least one feature parameter of the road.

10. The road parameter estimation apparatus according to claim 1, further comprising:
a temporary service section determiner configured to determine whether the forward portion of the road includes a temporary service section in accordance with at least one marker of a predetermined color located at a center of the road along a longitudinal direction of the road.

11. The road parameter estimation apparatus according to claim 10, further comprising:
a condition adjuster configured to adjust at least one condition required to detect the at least one marker with the predetermined color in accordance with first to fifth detection conditions being satisfied,
the first detection condition being that there is a composite line member located at a right side of the lane, the composite line member being comprised of plural lines and extending along the road,
the second detection condition being that there is a solid line located at a left side of the lane, the solid line extending along the road,
the third detection condition being that there are no lines with the predetermined color located at the right side of the lane, the lines with the predetermined color each extending along the road,
the fourth detection condition being that there is at least one structure including at least one pole or at least one edge stone located at the right side of the lane.

12. The road parameter estimation apparatus according to claim 11, wherein:
the temporary service section determiner is configured to:
determine whether there is the at least one marker with the predetermined color; and
determine that the forward portion of the road includes the temporary service section in response to determination that there is the at least one marker with the predetermined color in accordance with the at least one condition adjustable by the condition adjuster.

* * * * *